(12) United States Patent
Kim

(10) Patent No.: US 10,166,746 B2
(45) Date of Patent: Jan. 1, 2019

(54) RESILIENT PAD COMPOSITE AND PROCESS FOR MAKING SAME WITHOUT A DIE

(71) Applicant: Applied FT Composite Solutions Inc., Las Vegas, NV (US)

(72) Inventor: Daniel Kim, Busan (KR)

(73) Assignee: Applied FT Composite Solutions Inc., Las Vegas, NV (US)

( * ) Notice: Subject to any disclaimer, the term of this patent is extended or adjusted under 35 U.S.C. 154(b) by 599 days.

(21) Appl. No.: 13/922,102

(22) Filed: Jun. 19, 2013

(65) Prior Publication Data

US 2014/0004322 A1 Jan. 2, 2014
US 2018/0001610 A9 Jan. 4, 2018

Related U.S. Application Data

(63) Continuation of application No. PCT/US2011/066308, filed on Dec. 20, 2011, and a continuation-in-part of application No. 12/624,881, filed on Nov. 24, 2009, now Pat. No. 8,980,412.

(Continued)

(51) Int. Cl.
*B32B 37/02* (2006.01)
*B32B 38/04* (2006.01)
(Continued)

(52) U.S. Cl.
CPC ............ *B32B 37/02* (2013.01); *B32B 3/18* (2013.01); *B32B 5/02* (2013.01); *B32B 38/0004* (2013.01); *B32B 38/04* (2013.01); *F16F 3/0876* (2013.01); *A41D 31/005* (2013.01); *B32B 37/12* (2013.01); *B32B 2038/047* (2013.01); *B32B 2305/022* (2013.01); *B32B 2305/18* (2013.01);
(Continued)

(58) Field of Classification Search
CPC ............ A41D 13/0015; A41D 13/0512; A41D 13/0518; A41D 13/0543; A41D 13/0537; A41D 13/065; A41D 31/00; A41D 31/0005; A41D 2600/102; A41D 2600/104; A42B 3/00; A42B 5/00; A63B 2243/005; A63B 2243/0037; A63B 2243/0008; A63B 2243/0045; A63B 71/1225; A63B 71/1291; B32B 37/02; B32B 2038/042; B32B 2038/047; B32B 2305/02; B32B 2571/00; Y10T 156/1056; Y10T 156/1057; Y10T 156/1075; Y10T 156/12; Y10T 156/13; Y10T 156/1304
See application file for complete search history.

(56) References Cited

U.S. PATENT DOCUMENTS 1,922,228 A * 8/1933 Brown .................... A47C 7/74
267/145
2,604,642 A * 7/1952 Marco ................. A47C 27/144
5/655.9

(Continued)

*Primary Examiner* — Linda L Gray
(74) *Attorney, Agent, or Firm* — JHK Law; Joseph Hyosuk Kim

(57) ABSTRACT

The present application describes making a resilient pad composite that includes a substrate bonded to a plurality of discrete, spaced-apart, resilient elements engaged to at least one reinforcing structure. The reinforcing structure may include a lattice of reinforcing material. The one or more lattices of reinforcing material may engage at least some of the resilient elements.

18 Claims, 66 Drawing Sheets

Related U.S. Application Data

(60) Provisional application No. 61/425,193, filed on Dec. 20, 2010, provisional application No. 61/200,188, filed on Nov. 24, 2008, provisional application No. 61/145,009, filed on Jan. 15, 2009.

(51) Int. Cl.
*B32B 38/00* (2006.01)
*F16F 3/087* (2006.01)
*B32B 3/18* (2006.01)
*B32B 5/02* (2006.01)
*A41D 31/00* (2006.01)
*B32B 37/12* (2006.01)

(52) U.S. Cl.
CPC ....... *B32B 2307/56* (2013.01); *B32B 2571/00* (2013.01); *Y10T 156/1056* (2015.01); *Y10T 156/1062* (2015.01); *Y10T 156/1075* (2015.01); *Y10T 156/1304* (2015.01); *Y10T 428/24851* (2015.01)

(56) References Cited

U.S. PATENT DOCUMENTS

| | | | | |
|---|---|---|---|---|
| 2,775,998 A * | 1/1957 | Osborn | A47C 27/144 | 264/45.3 |
| 2,815,515 A * | 12/1957 | McKinley | A47C 27/144 | 428/101 |
| 3,020,186 A * | 2/1962 | Lawrence | B32B 27/00 | 156/248 |
| 3,310,819 A * | 3/1967 | Morrison | A47C 27/15 | 267/143 |
| 3,876,493 A * | 4/1975 | Gilmore | B26D 3/006 | 156/252 |
| 4,194,255 A * | 3/1980 | Poppe | A47C 27/065 | 267/153 |
| 4,513,449 A * | 4/1985 | Donzis | A41D 13/0153 | 2/22 |
| 4,538,301 A * | 9/1985 | Sawatzki | A41D 13/0156 | 2/411 |
| 4,600,623 A * | 7/1986 | Horn | A41D 31/02 | 428/151 |
| 4,686,724 A * | 8/1987 | Bedford | A47C 27/146 | 5/652.1 |
| 5,325,537 A * | 7/1994 | Marion | A41D 13/0153 | 2/102 |
| 5,360,653 A * | 11/1994 | Ackley | A47C 27/146 | 428/122 |
| 5,766,720 A * | 6/1998 | Yamagishi | F16F 1/37 | 428/119 |
| 5,836,027 A * | 11/1998 | Leventhal | A47C 27/18 | 5/654 |
| 6,018,832 A * | 2/2000 | Graebe | A47C 7/022 | 5/652 |
| 6,347,423 B1 * | 2/2002 | Stumpf | A47C 27/053 | 5/655.9 |
| 6,519,781 B1 * | 2/2003 | Berns | A41D 13/0153 | 2/267 |
| 8,231,756 B2 * | 7/2012 | Kim | | 156/247 |
| 2010/0206472 A1 * | 8/2010 | Kim | | 156/247 |

* cited by examiner

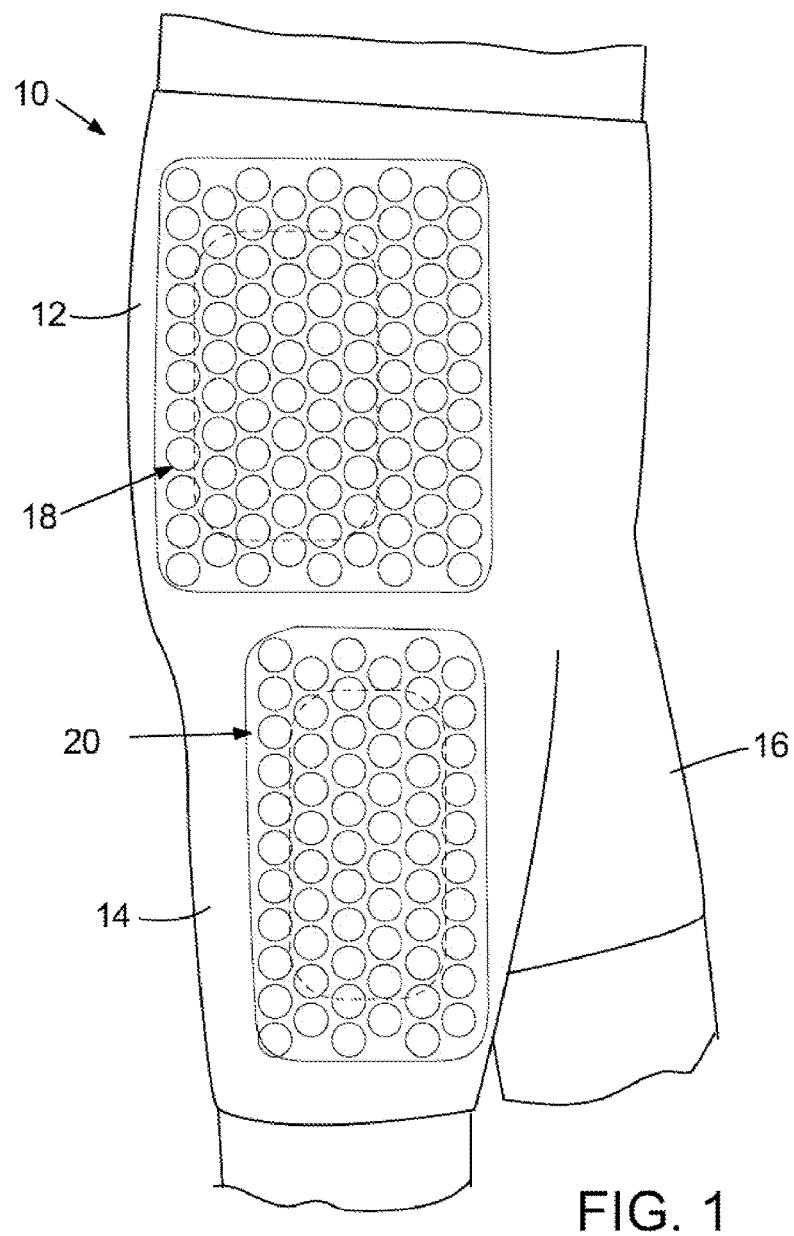

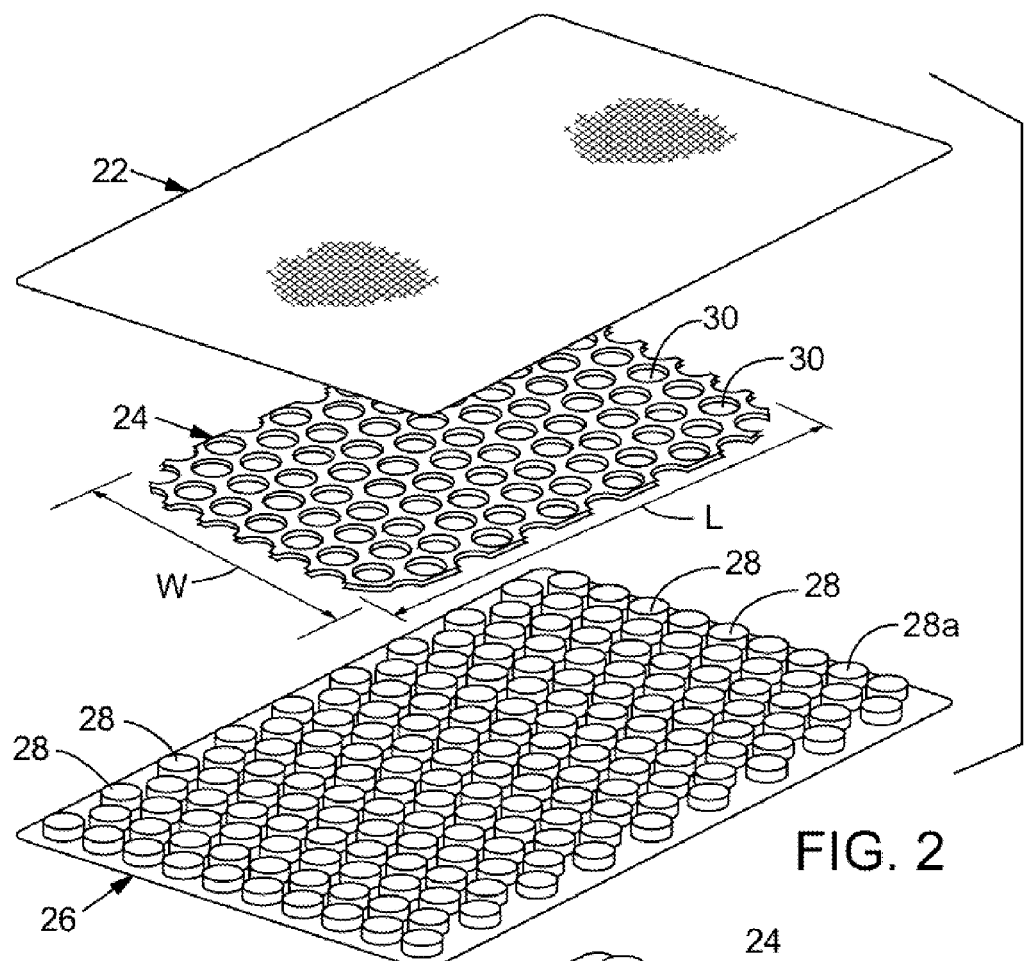
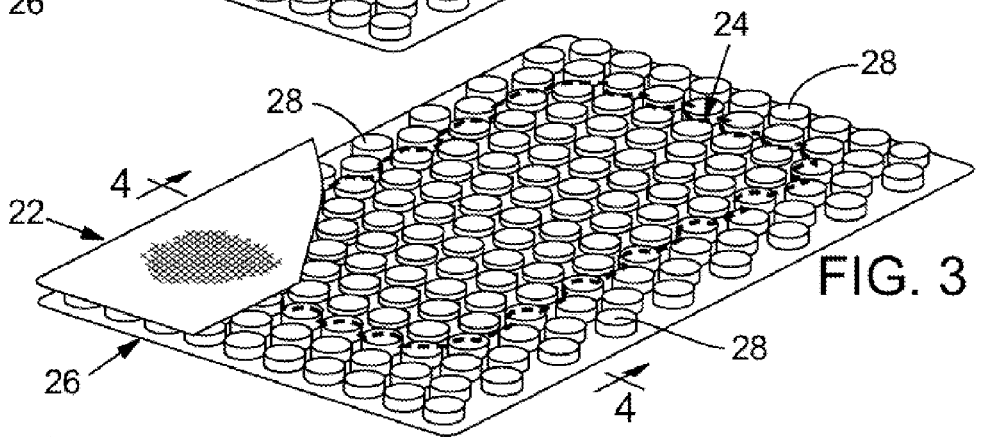
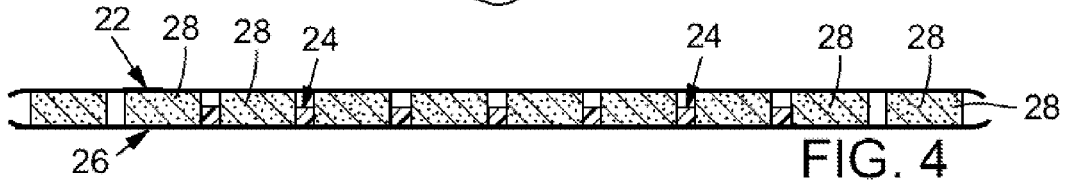

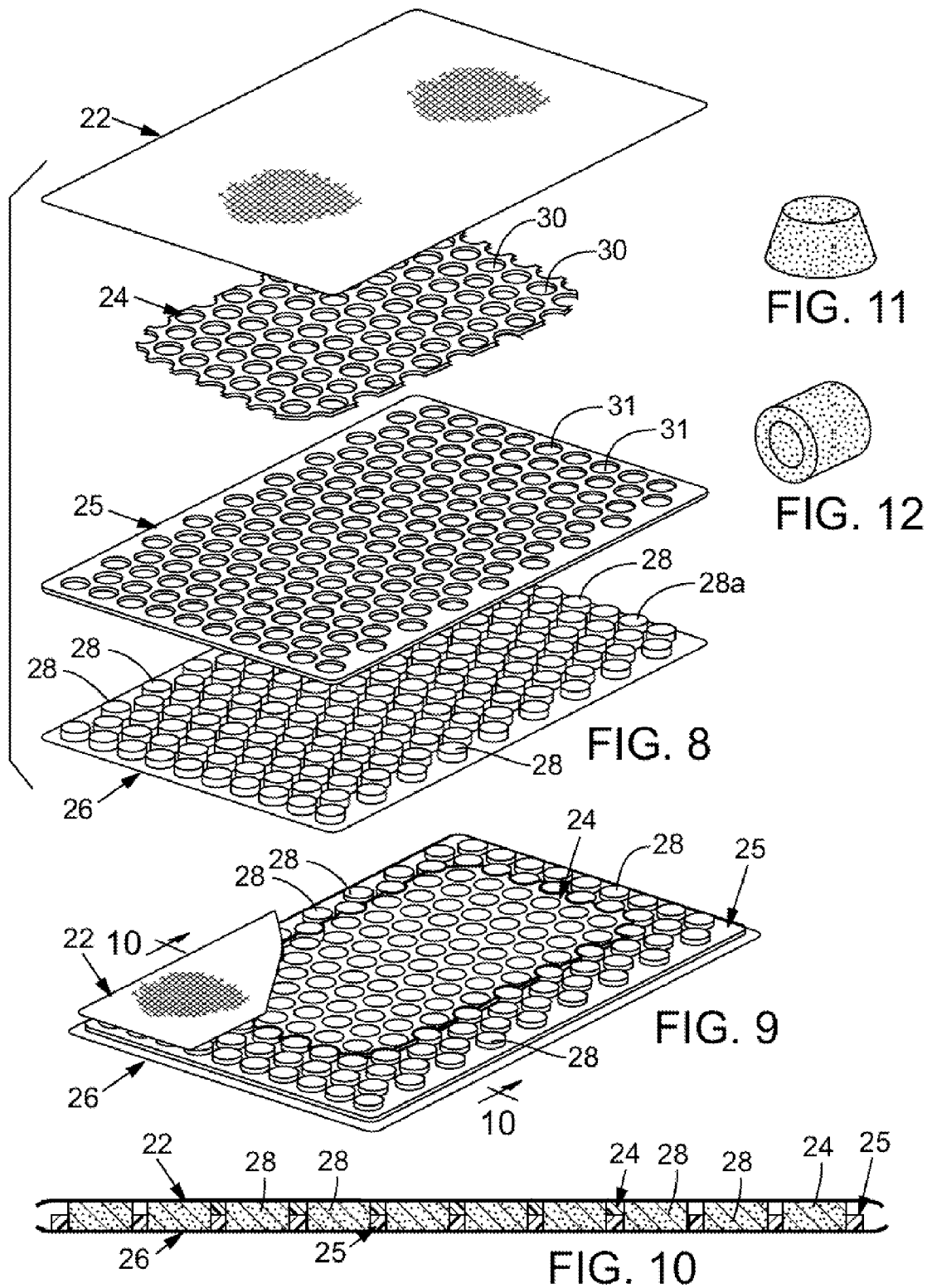

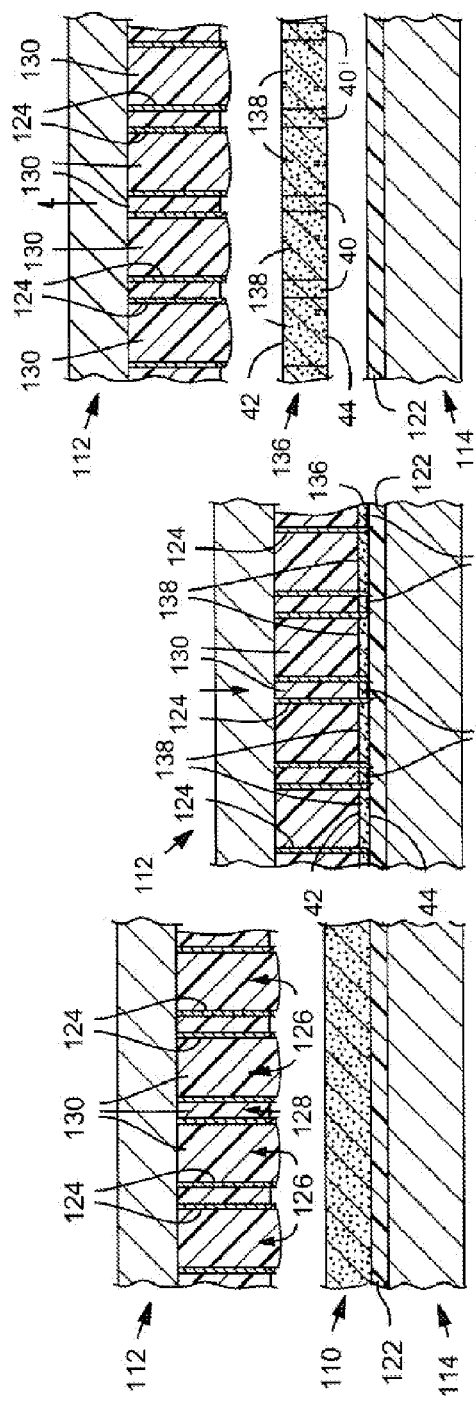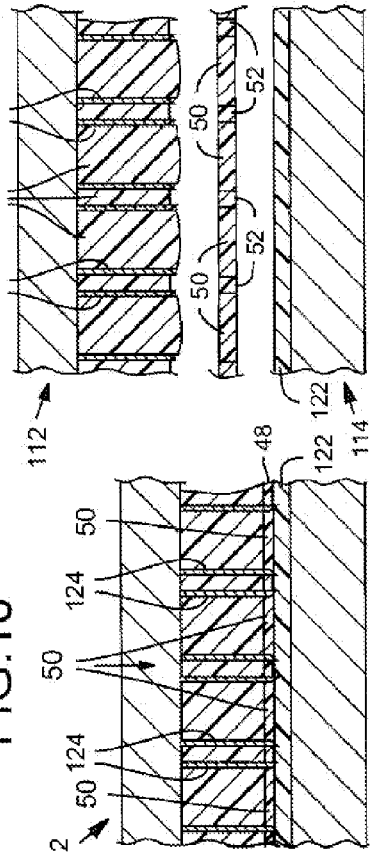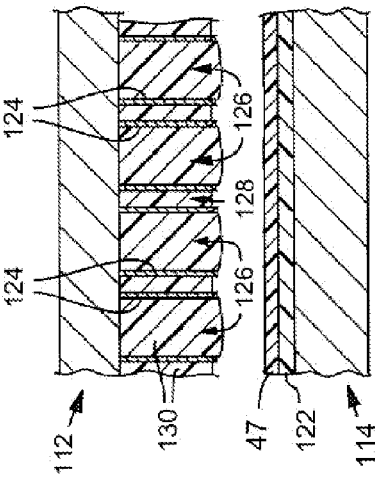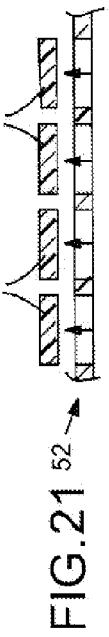

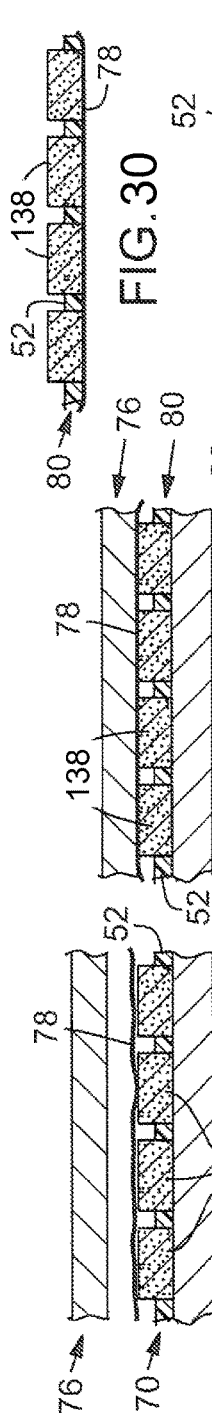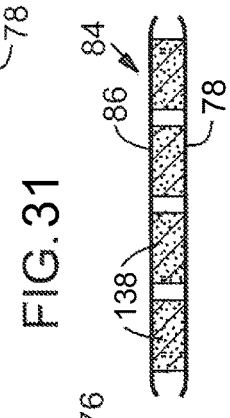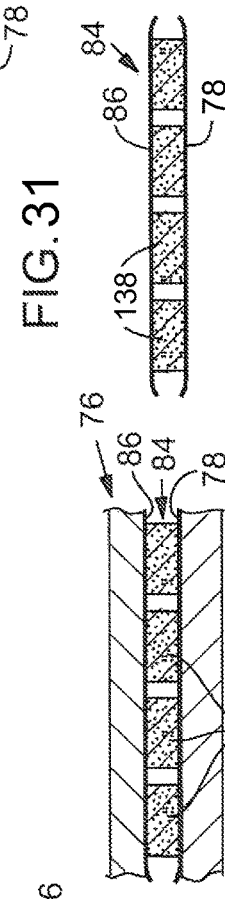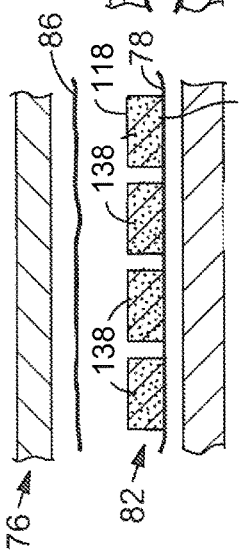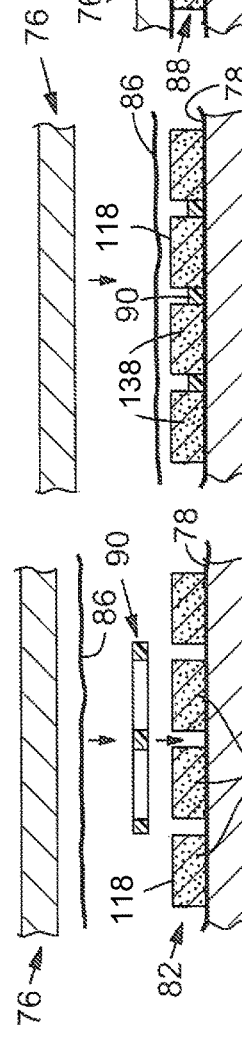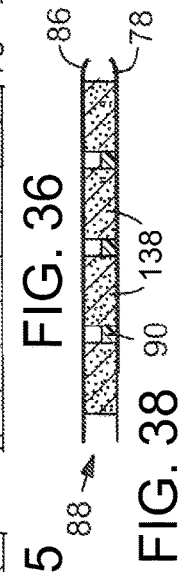

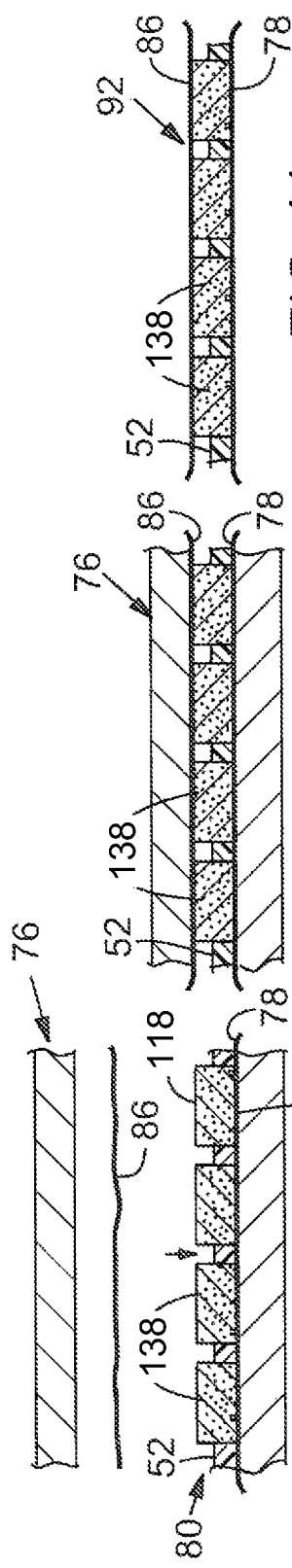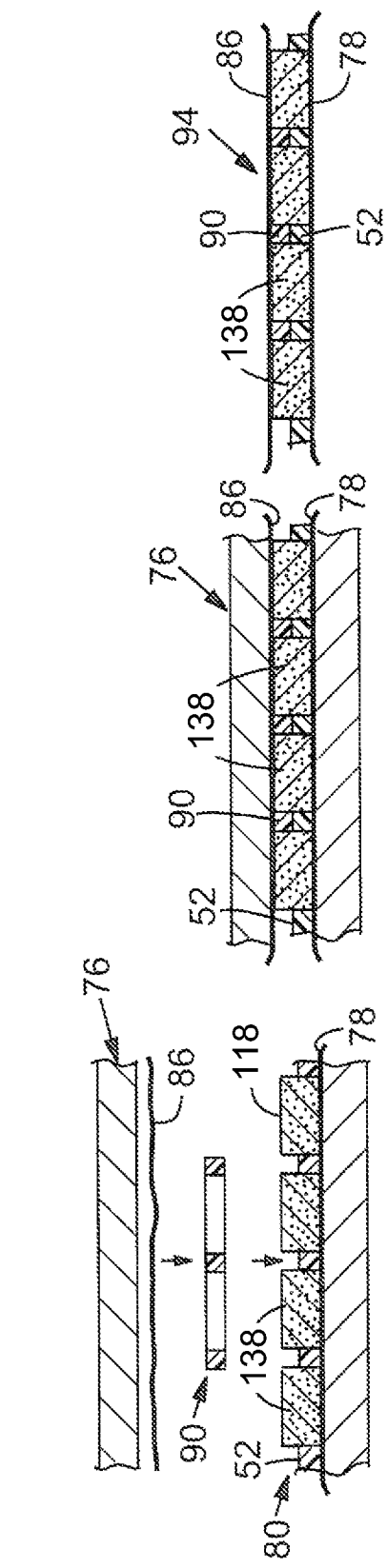

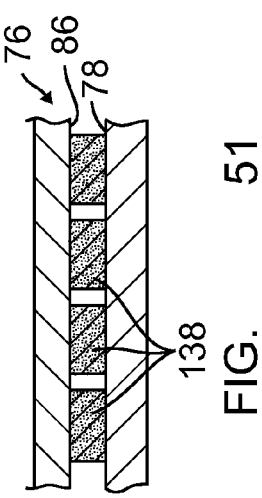
FIG. 46
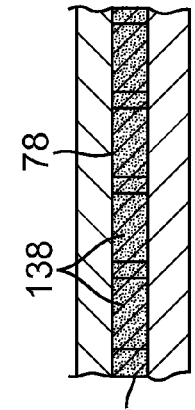
FIG. 47
FIG. 48
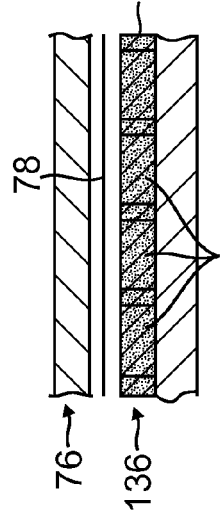
FIG. 49
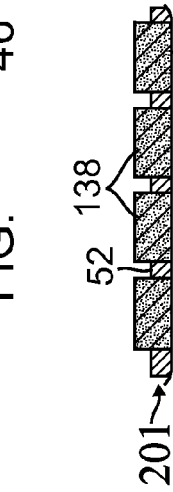
FIG. 50
FIG. 51
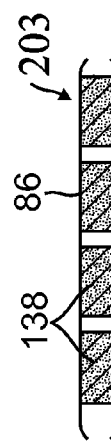
FIG. 52
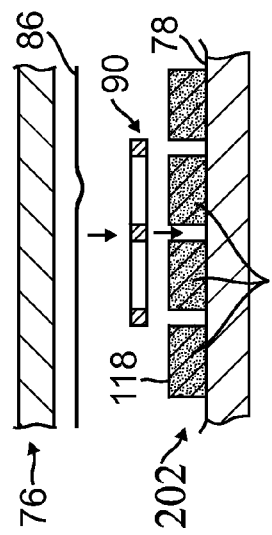
FIG. 53

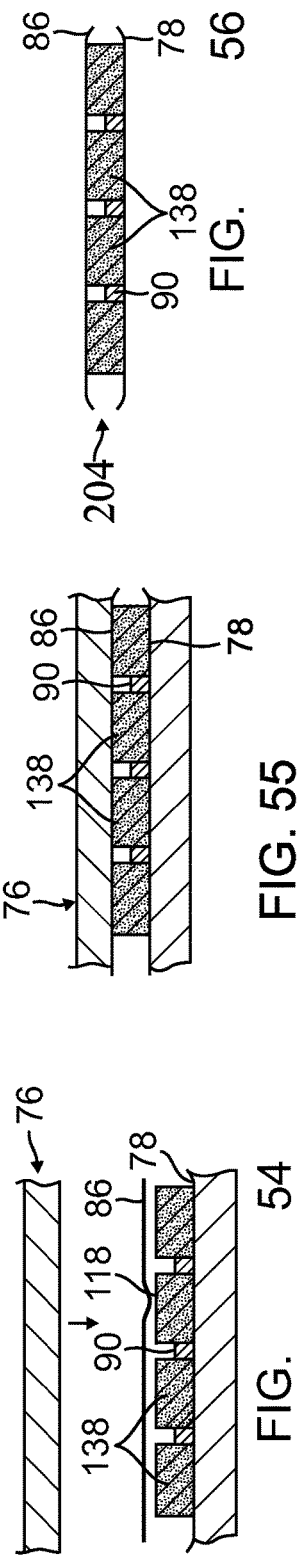
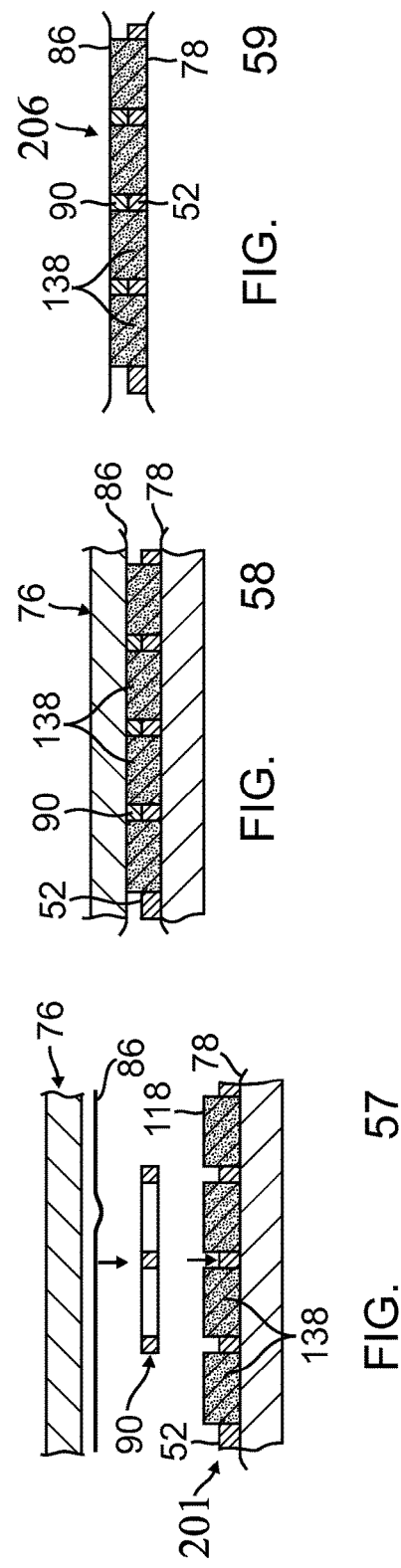

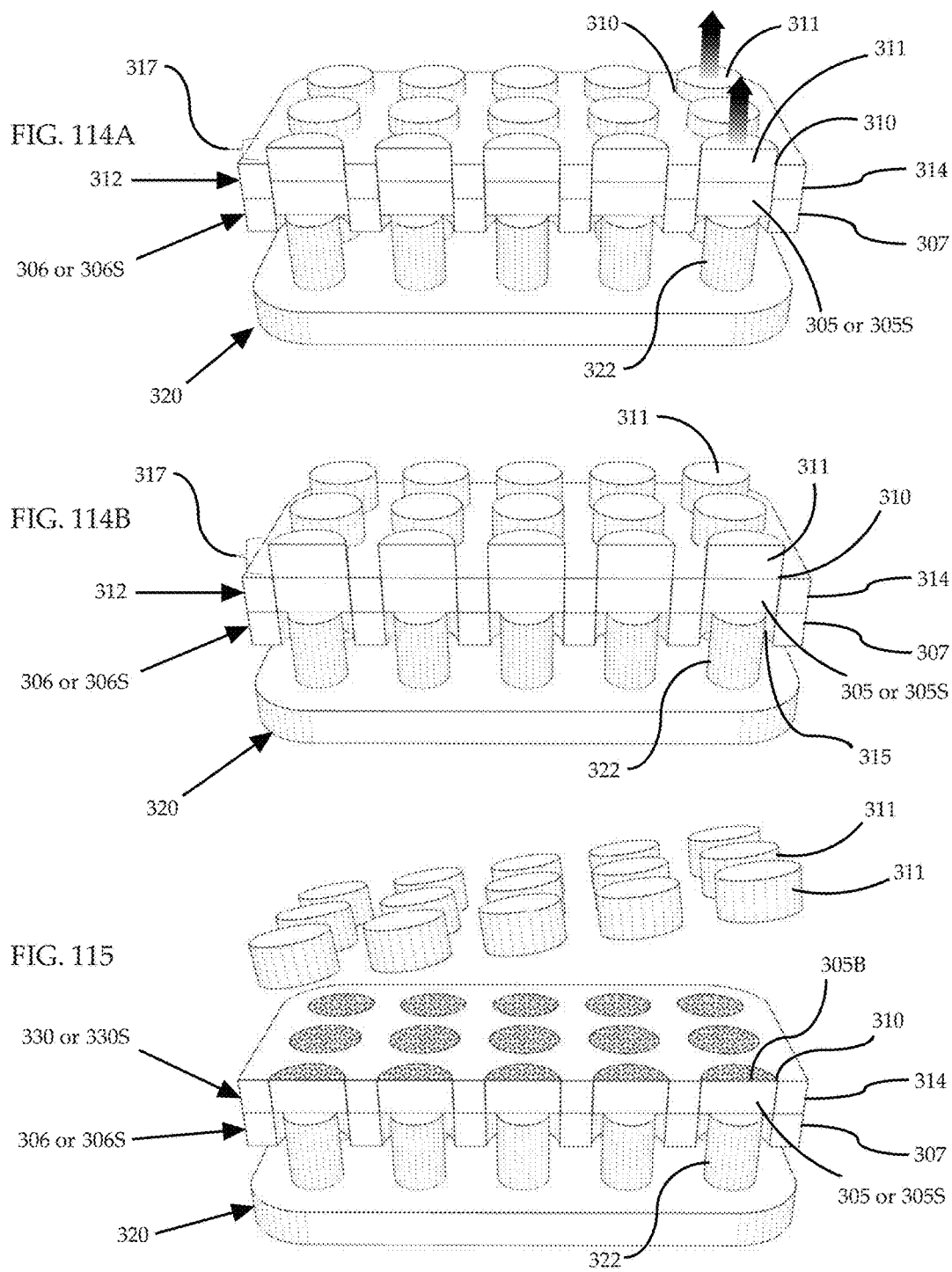

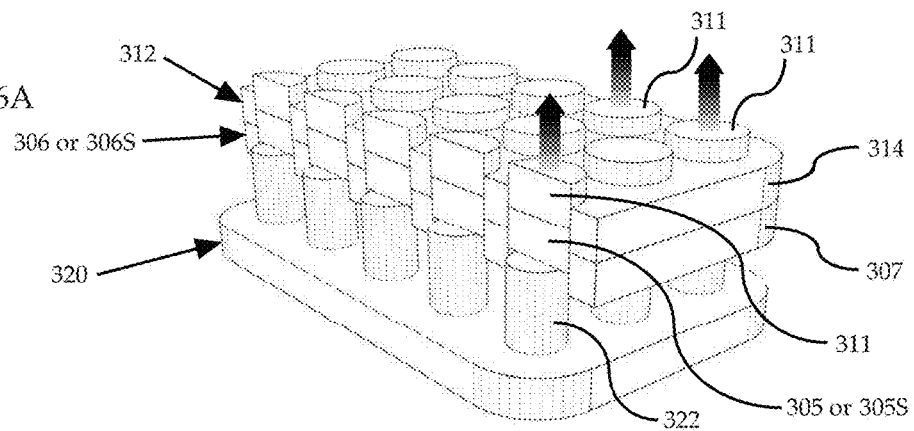
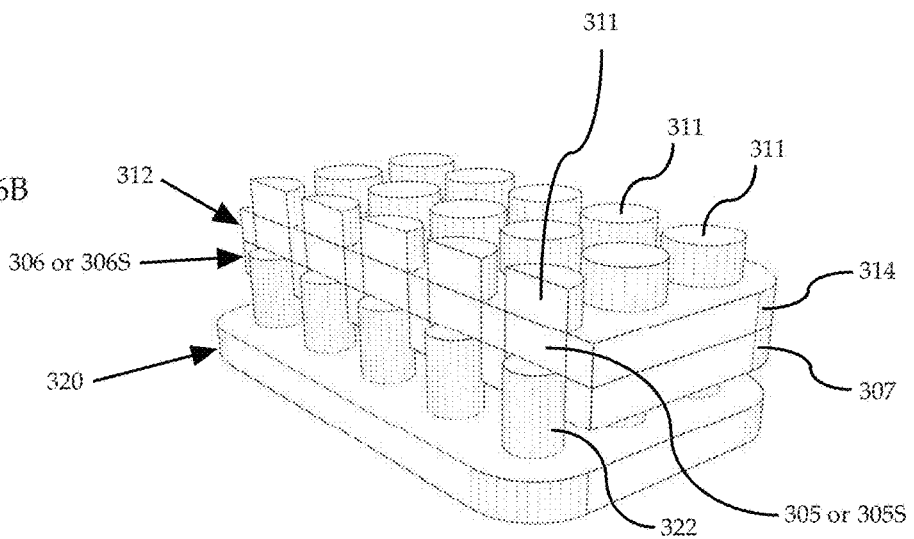

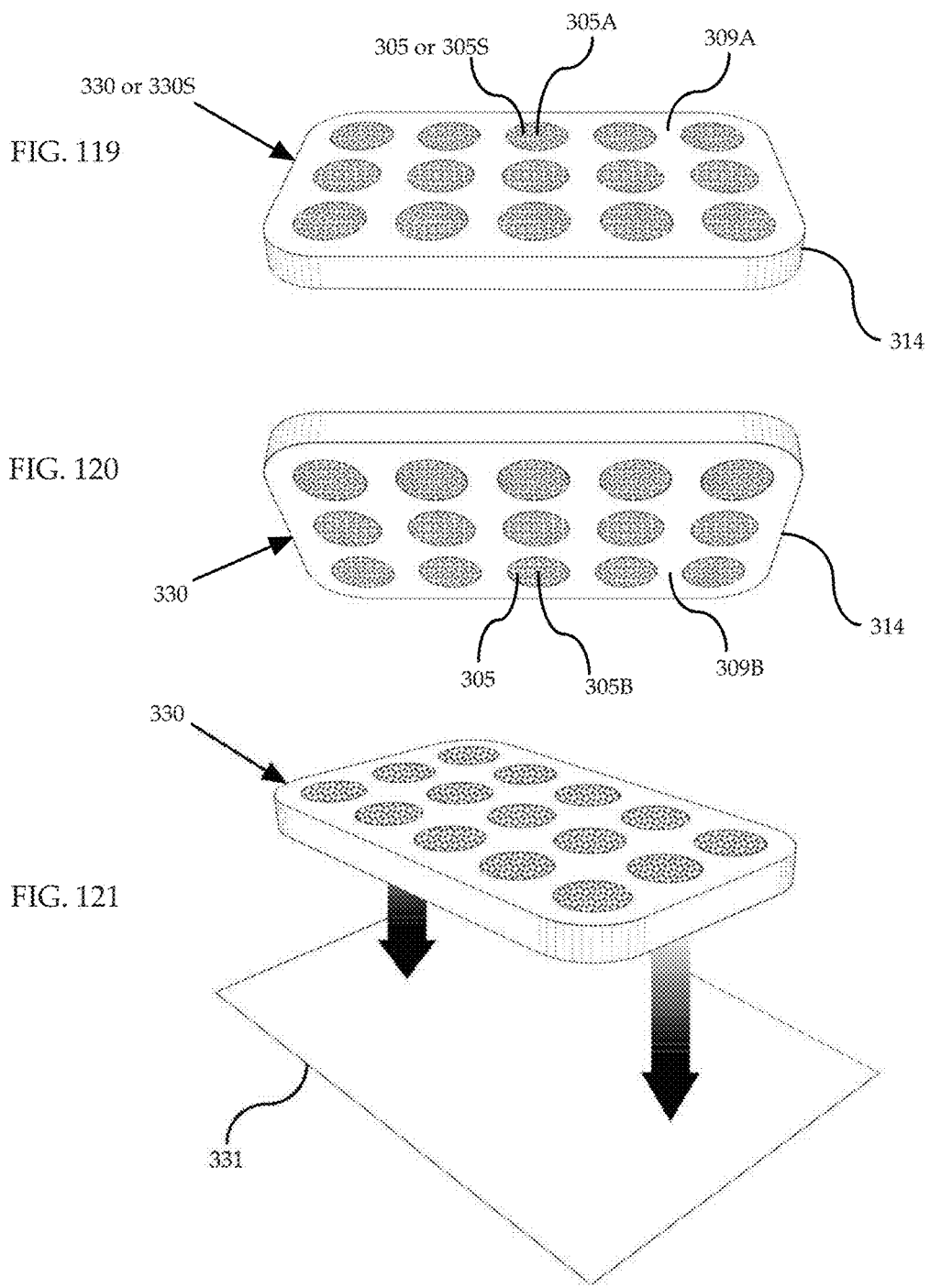

RESILIENT PAD COMPOSITE AND PROCESS FOR MAKING SAME WITHOUT A DIE

CROSS-REFERENCE TO RELATED APPLICATIONS

The present patent application is a continuation-in-part application of U. S. application Ser. No. 12/624,881, filed Nov. 24, 2009 (now U.S. Pat. No. 8,980,412), which claims the benefit of priority to U. S. Provisional Application Nos. 61/200,188, filed Nov. 24, 2008, 61/120,758, filed Dec. 8, 2008, and 61/145,009, filed Jan. 15, 2009. The present application is also a continuation application of PCT/US11/66308, filed Dec. 20, 2011, which is a non-provisional of 61/425,193, filed Dec. 20, 2010.

FIELD AND BACKGROUND OF THE INVENTION

The present invention relates to a composite material. The composite material comprises at least one layer of a plurality of discrete, spaced-apart elements and one or more reinforcing structure for surrounding the elements, and at least one layer of sheeting structure contacting either side of the layer that includes the elements and reinforcing structure surrounding the elements. The present invention also relates to methods of making the resilient pad composite.

Protective materials are often used by people to protect themselves from bumps, contusions, cuts, abrasions, and traumatic injury in sports and other activities. The present invention relates to resilient protective materials and methods for producing protective materials for use in products such as shoulder and chest pads, thigh and leg pads, elbow pads, shin guards, helmets, baseball chest protectors, bicycle seats, vehicles seats, chairs, carry bag straps, sports bras, etc. These protective materials may be used as Padding material is typically worn in many sports activities such as baseball, ice hockey, lacrosse, football, basketball and so on. Protection from impact is highly desirable for an athlete. However, protective padding material may be used in applications other than athletic garments. By way of example only, they are desirably used in headgear, body armor, footwear component, sacks, padded linings for bags and backpacks, padding on seats, and other uses where light weight, flexible, and breathable shock absorption to protect the body is needed. The advantages of the present technology will be understood more readily after consideration of the drawings and the detailed description of the preferred embodiments.

U.S. Pat. No. 4,513,449 discloses a shock absorbing athletic equipment which absorbs shock by controlled transfer of air from within an enclosure to an outside enclosure. Open-celled foam material is used to act as an exhaustible reservoir of air. However, this patent does not disclose the foam composite padding as disclosed in the present application.

U.S. Pat. No. 6,743,325 discloses a flexible material that includes resilient elements joined to a flexible, stretchable substrate. However, this patent does not disclose any lattice of reinforcing material.

U.S. Pat. No. 7,235,291 discloses an exapandable thermoplastic resin foam which has compressive strength and low flexural modulus of elasticity. However, this patent does not disclose any reinforcing structure to the foam material.

U.S. Pat. No. 5,435,765 discloses a surfboard pad which includes a non-slip padding system. A plurality of pad members are placed on the surfboards. However, there are no reinforcing elements that are used with these surfboard pads.

U.S. Pat. No. 6,519,781 discloses an energy absorbing protective pad for protection of areas of articulation, such as joints of human body. However, no reinforcing structure is disclosed.

U.S. Pat. No. 5,766,720 discloses an elastomer absorber of impact-caused vibrations attached to a part of the device causing the vibration. However, no reinforcing structure is disclosed.

U.S. Pat. No. 5,052,053 discloses an elastic garment for aquatic activities such as a wet suit or dry suit that provides thermal insulation. The garment includes stretch areas having grooves with a depth dimension to increase the elasticity of the garment. However, this patent does not disclose a resilient element surrounded with reinforcing structure.

U.S. Pat. No. 5,836,027 discloses an integrated matrix bedding system which includes an air-foam matrix assembly that has foam elements surrounded by other structures. However, this patent deals with bedding systems, which lies outside of the padding art of the present application.

SUMMARY OF THE INVENTION

In one aspect, the present invention is drawn to a composite pad structure comprising a substrate bonded to a plurality of discrete, spaced-apart, resilient elements engaged to at least one reinforcing structure. The reinforcing structure may include a lattice of reinforcing material. The one or more lattices of reinforcing material may engage at least some of the resilient elements. Optionally, at least one lattice of reinforcing material may engage all of the resilient elements, and additional lattice of reinforcing material engages some of the resilient elements. A second substrate may be bonded on opposite side of the resilient elements. The resilient elements that are engaged to the reinforcing structure may be positioned between the first and second substrates.

In another aspect, the invention is drawn to a garment that includes the composite described above. The garment may be an athletic garment or athletic safety wear, but may include industrial or military equipment such as headgear and body armor. Footwear, sacks, padded linings for bags and backpacks, padding on seats and other uses where light weight, flexible, and breathable shock absorption to protect the body are also contemplated for use with the inventive composite material.

In yet another aspect, the invention is drawn to a method for fabricating a composite structure for use as a resilient cushion, comprising: (i) mounting a plurality of discrete, spaced-apart, resilient elements on a first expanse of material; (ii) engaging at least some of the resilient elements with at least one reinforcing structure; and (iii) mounting a second expanse of material to the resilient elements opposite the first expanse of material to form the composite structure, wherein the at least one reinforcing structure is positioned between the first and second expanses of material in the composite structure.

The step of engaging at least some of the resilient elements with a reinforcing structure includes engaging the resilient elements with a first lattice of reinforcing material and optionally engaging at least some of the resilient elements with a second lattice of reinforcing material. Further, the first and second lattices of reinforcing material may be positioned between the first and second expanses of material in the composite structure. A cutter may be used to cut a sheet of resilient material into a cut sheet of resilient material that includes the plurality of resilient elements and additional resilient material that maintains the plurality of resilient elements in a pattern. The cutter may include a plurality of cutting elements, each defining a space containing a biasing material, wherein after a cutting element has been used to cut a corresponding resilient element, the biasing material may urge the corresponding resilient element away from the space. The step of engaging at least some of the resilient elements with a reinforcing structure may occur before or after the step of mounting the plurality of resilient elements on the first expanse of material. The reinforcing structure may be a lattice of reinforcing material that includes a plurality of holes, and wherein the step of engaging at least some of the resilient elements with a reinforcing structure comprises pushing the plurality of resilient elements out of a cut sheet of resilient material and into the plurality of holes in the lattice of reinforcing material. An adhesive may be used to mount the plurality of resilient elements to either the first expanse of material, the second expanse of material or both the first and second expanse of material. The adhesive may be a heat activated adhesive that is activated by a heat platen.

In still another aspect, the invention is drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and an excess resilient material; (e) withdrawing the cutter from the cut sheet of resilient material; (f) providing a sheet of reinforcing material; (g) pressing the cutter, which need not necessarily be the same cutter used to cut the resilient material, into the sheet of reinforcing material, thereby forming a cut sheet of reinforcing material comprising a plurality of reinforcing elements and one or more lattices of reinforcing material; (h) withdrawing the cutter from the cut sheet of reinforcing material; (i) separating the lattice of reinforcing material from the reinforcing elements, whereby the lattice of reinforcing material is left with a plurality of holes through the reinforcing material where the reinforcing elements used to be; (j) placing the cut sheet of resilient material on top of the lattice of reinforcing material, and aligning the cut sheet of resilient material so that the plurality of resilient elements are positioned above the plurality of holes in the lattice of reinforcing material; (k) providing a pusher having a plurality of push elements that form a pattern corresponding to the pattern of the resilient elements in the cut sheet of resilient material; (l) aligning the plurality of push elements with the plurality of resilient elements, and using the pusher to push the resilient elements out of the cut sheet of resilient material, whereby the plurality of resilient elements are pushed into the plurality of holes in the lattice of reinforcing material, thereby forming a resilient material assembly comprising the plurality of resilient elements at least partially surrounded by at least one lattice of reinforcing material; (m) placing the resilient material assembly next to a heat platen, if heat-activated adhesive material is applied to a side of the resilient material; (n) placing a first sheet of fabric or mesh substrate onto one side of the resilient material assembly, wherein steps (m) and (n) may be optionally reversed in order; and (o) heating the fabric or mesh sheet substrate with the heat platen to activate the adhesive on the plurality of resilient elements, whereby the first fabric or mesh sheet substrate adheres to the plurality of resilient elements to form the composite material.

The invention is also directed to other embodiments, wherein in step (p), optionally removing the lattice of reinforcing material so as to result in a first fabric or mesh sheet substrate bonded to resilient elements. Alternatively, the sheet of reinforcing material may be pre-cut so as to create several lattices of reinforcing material that may be processed using steps (g) through (o), wherein in the alternative step (p), some of the lattices of reinforcing material may be removed and discarded as waste material, so as to result in a first fabric or mesh sheet substrate bonded to resilient elements, only some of which resilient elements are surrounded by at least one lattice of reinforcing material. Furthermore, as an alternative to steps (g) through (i), the lattice of reinforcement material may be created without the steps employed above and simply cut with by means whereby the lattice of reinforcing material is left with a plurality of holes through the reinforcing material where the reinforcing elements used to be, and combined with the resilient elements so that the holes in the lattice fit around the resilient elements.

The invention is also directed to still other embodiments to include steps (q) placing a second sheet of fabric or mesh substrate onto the opposite side of the resilient material assembly; and (r) heating the second sheet of fabric or mesh substrate with the heat platen to activate the adhesive on the plurality of resilient elements on the opposite side, whereby the second sheet of fabric or mesh substrate adheres to the plurality of resilient elements on the opposite side.

Or, alternatively, the method may include the following steps: (p) placing a second sheet of fabric or mesh substrate onto the opposite side of the resilient material assembly; and (q) heating the second sheet of fabric or mesh substrate with the heat platen to activate the adhesive on the plurality of resilient elements on the opposite side, whereby the second sheet of fabric or mesh substrate adheres to the plurality of resilient elements on the opposite side.

In another aspect, the invention is also drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and excess resilient material; (e) withdrawing the cutter from the cut sheet of resilient material; (f) removing adhesive layer from the excess resilient material on the first side of the cut sheet of resilient material, leaving adhesive layer on the resilient elements; (g) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

The above process may optionally include additional steps (i) placing a second sheet of fabric or mesh substrate onto the second side of the resilient material assembly; and (j) heating the second sheet of fabric or mesh substrate with the heat platen to activate the adhesive on the plurality of resilient elements on the second side, whereby the second sheet of fabric or mesh substrate adheres to the plurality of resilient elements on the second side.

Alternatively, the above process may include additional steps of (i) providing a sheet of reinforcing material; (j) pressing a cutter into the sheet of reinforcing material, thereby forming a cut sheet of reinforcing material comprising a plurality of reinforcing elements and at least one partial or full lattice of reinforcing material (k) withdrawing the cutter from the cut sheet of reinforcing material; (l) separating the lattice of reinforcing material from the reinforcing elements, whereby the lattice of reinforcing material is left with a plurality of holes through the reinforcing material where the reinforcing elements used to be; and (m) engaging at least one partial or full lattice of reinforcing material to the resilient elements in (h).

Optionally, after engaging at least one partial or full lattice of reinforcing material to the resilient elements in (h) as described in step (m), at least one partial lattice of reinforcing material may be removed, leaving at least one partial lattice of reinforcing material engaged to the resilient elements.

Optionally, the above method may include the following additional steps: (n) placing a second sheet of fabric or mesh substrate onto the second side of the resilient material assembly; and (o) heating the second sheet of fabric or mesh substrate with the heat platen to activate the adhesive on the plurality of resilient elements on the second side, whereby the second sheet of fabric or mesh substrate adheres to the plurality of resilient elements to form the composite material, wherein the at least one partial or full lattice of reinforcing material is positioned between the first and second sheets of fabric or mesh substrate.

In another aspect, the invention is also drawn to a method of making a composite structure for use as resilient cushion comprising: (a) providing a sheet of resilient material having opposing sides; (b) applying an adhesive to either or both sides of the sheet of resilient material; (c) providing a cutter having a surface and a plurality of cutting elements extending from the surface in a predetermined pattern; (d) pressing the cutter into the sheet of resilient material, thereby forming a cut sheet of resilient material comprising a plurality of resilient elements and excess resilient material; (e) withdrawing the cutter from the cut sheet of resilient material; (f) covering the excess resilient material with a blocking sheet of a substrate with a pattern so that only the resilient elements are free to bond to any other substrate; (g) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

In yet another aspect, the invention includes a method of making a composite structure for use as resilient cushion comprising: (a) providing a sheet of resilient material having opposing sides; (b) providing a cutter having a surface and a plurality of cutting elements extending from the surface in a predetermined pattern; (c) pressing the cutter into the sheet of resilient material, thereby forming a cut sheet of resilient material comprising a plurality of resilient elements and excess resilient material; (d) withdrawing the cutter from the cut sheet of resilient material; (e) coating resilient elements selectively with adhesive; (f) bonding a first fabric or mesh substrate to the first side of the cut sheet of resilient material resulting in bonding between the resilient elements to the first substrate; and (h) separating the excess resilient material from the cut sheet of resilient material, leaving the plurality of resilient elements bound to the first substrate.

Regarding any of the resilient pad production method described in the present application, it will be understood from the present disclosure that the thickness of the resilient pad from which the resilient elements are cut out may be thicker or thinner or the same thickness as the reinforcing material from which the lattice of reinforcing material is cut and which engages the resilient elements.

In one aspect, an "intermediary" lattice of reinforcing material may be used as a "die" to hold and stabilize the resilient elements. Once the resilient material assembly is stabilized such as by the resilient elements having been fixed to a substrate such as by being glued to a substrate, the intermediary lattice of reinforcing material may be removed and replaced with a second lattice of reinforcing material, which may be incorporated into the final product.

In one aspect, the thickness of the reinforcing material from which the intermediary lattice of reinforcing material is cut may have the same or greater thickness than the resilient material from which the resilient elements are cut out such that the resilient elements do not stand proud of the lattice of reinforcing material when they are engaged to each other.

In another aspect, when the lattice of reinforcing material is used as a die or a stabilizer when engaging the resilient elements, the resilient elements may stand proud or not stand proud. Preferably, the resilient elements do not stand proud of the lattice of reinforcing material.

It is also recognized that using any of the production methods disclosed in the present application, the lattice of reinforcing material may be adhered to a substrate such as a fabric or mesh material on either or both sides of the lattice of reinforcing material. The lattice of reinforcing material may be adhered to the fabric or mesh material on either or both sides of the lattice of reinforcing material alone or while engaged to at least one resilient element.

In the adhesive activating process of the resilient material assembly, resilient elements, or the lattice of reinforcing material, heat platen may be used as with pressing-and-microwaving, pressing-and-radiofrequency (RF) or other methods to activate the adhesive.

In another aspect, the present invention is directed to the following:

In one embodiment, the present application is directed to a method of making a composite structure for use as resilient cushion comprising:

(a) providing on a surface at least one sheet of resilient material of defined thickness having opposing sides;

(b) applying an adhesive to either or both sides of the sheet of resilient material;

(c) providing a first cutter having a surface and a plurality of cutting elements extending from the surface in a predetermined pattern;

(d) pressing the first cutter into the sheet of resilient material, thereby forming a cut sheet of resilient material comprising a plurality of resilient elements having defined height and width;

(e) withdrawing the cutter from the cut sheet of resilient material;

(f) providing at least one sheet of reinforcing material having a defined thickness;

(g) pressing a second cutter into the sheet of reinforcing material, thereby forming a cut sheet of reinforcing material comprising a plurality of reinforcing elements and a lattice of reinforcing material;

(h) withdrawing the cutter from the cut sheet of reinforcing material;

(i) separating the lattice of reinforcing material from the reinforcing elements, whereby the lattice of reinforcing material is left with a plurality of holes through the reinforcing material where the reinforcing elements used to be;

(j) placing the cut sheet of resilient material adjacent to the lattice of reinforcing material, and aligning the cut sheet of resilient material so that the plurality of resilient elements are positioned adjacent to the plurality of holes in the lattice of reinforcing material;

(k) pushing the resilient elements out of the cut sheet of resilient material, whereby the plurality of resilient elements are pushed into the plurality of holes in the lattice of reinforcing material, thereby forming a resilient material assembly comprising the plurality of resilient elements at least partially surrounded by at least one lattice of reinforcing material;

(l) placing the resilient material assembly next to a heat platen, if heat-activated adhesive material is applied to a side of the resilient material;

(m) placing a first sheet of fabric or mesh substrate onto either side of the resilient material assembly, wherein steps (l) and (m) are optionally reversible in order; and (n) pressing the first sheet of fabric or mesh substrate or the resilient assembly with the heat platen to activate the adhesive on the plurality of resilient elements, whereby the first sheet of fabric or mesh substrate adheres to the plurality of resilient elements thereby forming a first composite structure.

The height of the plurality of resilient elements may be level with or less than the thickness of the lattice of reinforcing material on the resilient material assembly, such that the resilient elements do not stand proud of the lattice of reinforcing material. The lattice of reinforcing material may be made of more compressible material than the resilient elements. There may be no spacing present between the lattice of reinforcing material and the first fabric or mesh sheet substrate. In step (f), the reinforcing material may be coated with a heat activatable adhesive on either or both sides, so that the lattice of reinforcing material may be adhered to the first fabric or mesh sheet substrate after the pressing step (n). In step (a), the surface may be a holding tray with a plurality of apertures. The apertures may be adapted to pass reinforcing elements through. In step (k), a pusher, having a plurality of push elements that form a pattern corresponding to the pattern of the resilient elements in the cut sheet of resilient material, may be provided to push out resilient elements The sheet of resilient material or sheet of reinforcing material may comprise a single sheet or multiple sheets glued together. The resilient material may be composed of foam, rubber, elastomer, or plastic, ethyl vinyl acetate ("EVA") foam, polyurethane ("PU") foam, or olefin or polyolefin based foam. The reinforcing material may be composed of foam, neoprene, natural leather, synthetic leather, plastic, rubber, latex, silicone, synthetic fabric, EVA foam, PU foam, olefin or polyolefin based foam, or thermoplastic foam or any combination thereof.

The above method may also comprise cutting the first composite structure into a wearable padding. The padding may be a footwear, a footwear component, a footwear midsole, a footwear outsole, a footwear sockliner, or a footwear upper, and at least one resilient element may be cut.

The above method may also comprise:

(o) placing a second sheet of fabric or mesh substrate onto the opposite side of the resilient material assembly if heat-activated adhesive material is applied to both sides of the resilient material; and (p) pressing the second sheet of fabric or mesh substrate with the heat platen to activate the adhesive on the plurality of resilient elements on the opposite side, whereby the second sheet of fabric or mesh substrate adheres to the plurality of resilient elements on the opposite side forming a second composite structure.

There may be no spacing present between the lattice of reinforcing material and the second fabric or mesh sheet substrate. In step (p), the height of the resilient elements may be level with or less than the thickness of the lattice of reinforcing material on the resilient material assembly, such that the resilient elements do not stand proud of the lattice of reinforcing material during heating process. In step (f), the reinforcing material may be coated with a heat activatable adhesive on either or both sides, so that the lattice of reinforcing material may be adhered to the second fabric or mesh sheet substrate after the heating step (p).

The above method may also comprise cutting the first composite structure into a wearable padding.

The above method may also replace steps (i), (j), (k) with steps (i-1) and (j-1) as follows:

(i-1) placing the cut sheet of resilient material adjacent to the lattice of reinforcing material, and aligning the cut sheet of resilient material so that the plurality of resilient elements are positioned adjacent to the plurality of reinforcing elements in the lattice of reinforcing material;

(j-1) pushing the resilient elements out of the cut sheet of resilient material, whereby the plurality of resilient elements are pushed into the plurality of reinforcing elements in the lattice of reinforcing material, thereby dislodging the reinforcing elements and forming a resilient material assembly comprising the plurality of resilient elements at least partially surrounded by at least one lattice of reinforcing material.

In the above method, the cutter may comprise a plurality of cutting elements, each defining a space containing a biasing material, wherein after a cutting element has been used to cut a corresponding resilient element, the biasing material urges the corresponding resilient element away from the space.

In another aspect, the present invention is directed to a composite pad structure comprising a substrate bonded to a plurality of discrete, spaced-apart, resilient elements engaged to at least one reinforcing structure, wherein there is no space between the reinforcing structure and the substrate.

The reinforcing structure may be adhered to the substrate and may comprise a lattice of reinforcing material, which may engage some or all of the resilient elements. At least one lattice of reinforcing material may engage all of the resilient elements, and an additional lattice of reinforcing material may engage some of the resilient elements. A second substrate may be bonded on opposite side of the resilient elements. The resilient elements engaged to the reinforcing structure may be positioned between the first and second substrates. There may be no space between the second substrate and the reinforcing structure. The reinforcing structure may be adhered to the second substrate.

The above composite pad structure may be a support. The support may be an athletic garment, footwear, bag, sock liner, backpack, sack, seating pads, or athletic equipment. The above composite pad structure may also be an athletic safety wear.

The resilient element may be more dense or less dense than the lattice of reinforcing material. The height of the resilient element may be greater than the thickness of the lattice of reinforcing material.

In another aspect, the present invention may be shaped into a sockliner. At least one of the resilient elements may be cut. The height of the resilient elements may be level with or less than the thickness of the lattice of reinforcing material.

In another aspect, the present invention may be directed to a method of making a composite structure for use as resilient cushion comprising:

(a) providing on a surface at least one sheet of resilient material of defined thickness having opposing sides;

(b) applying an adhesive to either or both sides of the sheet of resilient material;

(c) providing a first cutter having a surface and a plurality of cutting elements extending from the surface in a predetermined pattern;

(d) pressing the first cutter into the sheet of resilient material, thereby forming a cut sheet of resilient material comprising a plurality of resilient elements having defined height and width;

(e) withdrawing the cutter from the cut sheet of resilient material;

(f) providing at least one sheet of first reinforcing material having a defined thickness;

(g) pressing a second cutter into the sheet of first reinforcing material, thereby forming a cut sheet of reinforcing material comprising a plurality of reinforcing elements and a first lattice of reinforcing material;

(h) withdrawing the cutter from the cut sheet of reinforcing material;

(i) providing at least one sheet of second reinforcing material having a defined thickness;

(j) pressing a third cutter into the sheet of second reinforcing material, thereby forming a cut sheet of reinforcing material comprising a plurality of reinforcing elements and a second lattice of reinforcing material;

(k) withdrawing the cutter from the cut sheet of reinforcing material;

(l) separating the first lattice of reinforcing material from the reinforcing elements, whereby the first lattice of reinforcing material is left with a plurality of holes through the reinforcing material where the reinforcing elements used to be;

(m) placing the cut sheet of resilient material adjacent to the first lattice of reinforcing material, and aligning the cut sheet of resilient material so that the plurality of resilient elements are positioned adjacent to the plurality of holes in the first lattice of reinforcing material;

(n) pushing the resilient elements out of the cut sheet of resilient material, whereby the plurality of resilient elements are pushed into the plurality of holes in the first lattice of reinforcing material, thereby forming a first resilient material assembly comprising the plurality of resilient elements at least partially surrounded by at least one lattice of reinforcing material;

(o) placing the first resilient material assembly next to a heat platen, if heat-activated adhesive material is applied to a side of the resilient material;

(p) placing a first sheet of fabric or mesh substrate onto either side of the resilient material assembly, wherein steps (o) and (p) are optionally reversible in order; and (q) heating the first fabric or mesh sheet substrate or the resilient material assembly with the heat platen to activate the adhesive on the plurality of resilient elements, whereby the first fabric or mesh sheet substrate adheres to the plurality of resilient elements thereby forming a first composite structure;

(r) separating the first lattice of reinforcing material from the first composite structure; and (s) replacing the first lattice of reinforcing material with the second lattice of reinforcing material to engage at least one resilient element, thereby forming the first composite structure comprising the second lattice of reinforcing material.

The height of the plurality of resilient elements may be level with or less than the thickness of the first or second lattice of reinforcing material on the resilient material assembly, such that the resilient elements do not stand proud of the first or second lattice of reinforcing material. The first or second lattice of reinforcing material may be made of more compressible material than the resilient elements. There may be no spacing present between the second lattice of reinforcing material and the first fabric or mesh sheet substrate. The cutter may comprise a plurality of cutting elements, each defining a space containing a biasing material, wherein after a cutting element has been used to cut a corresponding resilient element, the biasing material urges the corresponding resilient element away from the space.

The sheet of resilient material or sheet of reinforcing material may comprise a single sheet or multiple sheets glued together. The resilient material may be composed of foam, rubber, elastomer, plastic, ethyl vinyl acetate ("EVA") foam, polyurethane ("PU") foam, or olefin or polyolefin based foam. The reinforcing material may be composed of foam, neoprene, natural leather, synthetic leather, plastic, rubber, latex, silicone, synthetic fabric, EVA foam, PU foam, olefin or polyolefin based foam, or thermoplastic foam or any combination thereof.

The above method may further comprise cutting the first composite structure comprising the second lattice of reinforcing structure into a wearable padding. The padding may be a footwear, a footwear component, a footwear midsole, a footwear outsole, a footwear sockliner, or a footwear upper, and at least one resilient element may be cut.

In step (a), the surface may be a holding tray with a plurality of apertures. The apertures may be adapted to pass reinforcing elements through In step (i), the reinforcing material may be coated with a heat activatable adhesive on either or both sides, so that the second lattice of reinforcing material may adhere to the first fabric or mesh sheet substrate. In step (n), a pusher, having a plurality of push elements that form a pattern corresponding to the pattern of the resilient elements in the cut sheet of resilient material, may be provided to push out resilient elements.

In the above method, steps (l), (m), (n) may be replaced with steps (l-1) and (m-1) as follows:

(l-1) placing the cut sheet of resilient material adjacent to the first lattice of reinforcing material, and aligning the cut sheet of resilient material so that the plurality of resilient elements are positioned adjacent to the plurality of reinforcing elements in the first lattice of reinforcing material;

(m-1) pushing the resilient elements out of the cut sheet of resilient material, whereby the plurality of resilient elements are pushed into the plurality of reinforcing elements in the first lattice of reinforcing material, thereby dislodging the reinforcing elements and forming a first resilient material assembly comprising the plurality of resilient elements at least partially surrounded by at least one lattice of reinforcing material.

The above method may further comprise:

(t) placing a second sheet of fabric or mesh substrate onto the opposite side of the resilient material assembly if heat-activated adhesive material is applied to both sides of the resilient material; and (u) heating the second sheet of fabric or mesh substrate with the heat platen to activate the adhesive on the plurality of resilient elements on the opposite side, whereby the second sheet of fabric or mesh substrate adheres to the plurality of resilient elements on the opposite side forming a second composite structure.

There may be no spacing present between the second lattice of reinforcing material and the second fabric or mesh sheet substrate. In step (u), the height of the resilient elements may be level with or less than the thickness of the second lattice of reinforcing material on the resilient material assembly, such that the resilient elements do not stand proud of the second lattice of reinforcing material during heating process.

The above method may further comprise cutting the first composite structure into a wearable padding. The padding may be footwear component, and at least one resilient element may be cut.

These and other objects of the invention will be more fully understood from the following description of the invention, the referenced drawings attached hereto and the claims appended hereto.

BRIEF DESCRIPTION OF THE DRAWINGS

The present invention will become more fully understood from the detailed description given herein below, and the accompanying drawings which are given by way of illustration only, and thus are not limitative of the present invention, and wherein;

FIG. 1 is a drawing of an application of the resilient pad composite used in an undergarment.

FIG. 2 is an exploded view of the resilient pad assembly, which includes the resilient elements, the partial reinforcement lattice and a support.

FIG. 3 is a partial cut away view of the resilient pad assembly, which includes the resilient elements, the partial reinforcement lattice and a support.

FIG. 4 is a side view of the resilient pad assembly, which includes the resilient elements, the partial reinforcement lattice and a support.

FIG. 8 is an exploded view of the resilient pad assembly, which includes the resilient elements, the full and partial reinforcement lattice and a support FIG. 9 is a partial cut away view of the resilient pad assembly, which includes the resilient elements, the full and partial reinforcement lattice and a support.

FIG. 10 is a side view of the resilient pad assembly, which includes the resilient elements, the full and partial reinforcement lattice and a support.

FIG. 11 is an embodiment of the invention where the resilient element is cone shaped.

FIG. 12 is an embodiment of the invention where the resilient element is cored cylinder shaped.

FIG. 15 is a sectional side view of a sheet of resilient material positioned beneath a cutter on a work surface.

FIG. 16 is a sectional side view of a cutter cutting a sheet of resilient material on a work surface.

FIG. 17 is a sectional side view of a cut sheet of resilient material positioned between a cutter and a work surface.

FIG. 18 is a sectional side view of a sheet of reinforcing material positioned beneath a cutter on a work surface.

FIG. 19 is a sectional side view of a cutter cutting a sheet of reinforcing material on a work surface.

FIG. 20 is a sectional side view of a cut sheet of reinforcing material positioned between a cutter and a work surface.

FIG. 21 is a sectional side view of reinforcing elements being removed from a cut sheet of reinforcing material to form a lattice of reinforcing material.

FIG. 28 is a sectional side view of the resilient material assembly and an expanse of cloth or mesh material positioned between a work surface and a heat platen.

FIG. 29 is a sectional side view of a first composite material being formed with a heat platen.

FIG. 30 is a sectional side view of the first composite material.

FIG. 31 is a sectional side view of a second composite material formed from the first composite material.

FIG. 32 is a sectional side view of the second composite material and an expanse of cloth or mesh material positioned between a work surface and a heat platen.

FIG. 33 is a sectional side view of a third composite material being formed from the second composite material with a heat platen.

FIG. 34 is a sectional side view of the third composite material.

FIG. 35 is a sectional side view of the second composite material, a lattice of reinforcing material and an expanse of cloth or mesh material positioned between a work surface and a heat platen.

FIG. 36 is a sectional side view of an intermediate step in forming a fourth composite material with a heat platen.

FIG. 37 is a sectional side view of the fourth composite material being formed with a heat platen.

FIG. 38 is a sectional side view of the fourth composite material showing partial reinforcement.

FIG. 39 is a sectional side view of the first composite material and an expanse of cloth or mesh material positioned between a work surface and a heat platen.

FIG. 40 is a sectional side view of a fifth composite material being formed with a heat platen.

FIG. 41 is a sectional side view of the fifth composite material.

FIG. 42 is a sectional side view of the first composite material, a lattice of reinforcing material and an expanse of cloth or mesh material positioned between a work surface and a heat platen.

FIG. 43 is a sectional side view of a sixth composite material being formed from with a heat platen.

FIG. 44 is a sectional side view of the sixth composite material showing full reinforcement.

FIG. 46 is a sectional side view of the cut resilient material and an expanse of cloth or mesh material positioned between a work surface and a heat platen.

FIG. 47 is a sectional side view of resilient material/ substrate composite material being formed with a heat platen.

FIG. 48 is a sectional side view of the second composite material.

FIG. 49 is a sectional side view of the first composite material formed from the second composite material.

FIG. 50 is a sectional side view of the second composite material and an expanse of cloth or mesh material positioned between a work surface and a heat platen.

FIG. 51 is a sectional side view of a third composite material being formed from the second composite material with a heat platen.

FIG. 52 is a sectional side view of the third composite material.

FIG. 53 is a sectional side view of the second composite material, a lattice of reinforcing material and an expanse of cloth or mesh material positioned between a work surface and a heat platen.

FIG. 54 is a sectional side view of an intermediate step in forming a fourth composite material with a heat platen.

FIG. 55 is a sectional side view of the fourth composite material being formed with a heat platen.

FIG. 56 is a sectional side view of the fourth composite material.

FIG. 57 is a sectional side view of the first composite material, a lattice of reinforcing material and an expanse of cloth or mesh material positioned between a work surface and a heat platen.

FIG. 58 is a sectional side view of a sixth composite material being formed with a heat platen.

FIG. 59 is a sectional side view of the sixth composite material.

FIG. 114A is a side partial cutaway view of the pusher as it presses against a cut sheet of resilient material next to a cut sheet of reinforcing material, such that the resilient elements dislodge and replace the reinforcing elements. FIG. 114B is a side partial cutaway view of the pusher after it has completely pressed against a cut sheet of resilient material next to a cut sheet of reinforcing material, such that the resilient elements have dislodged and replaced the reinforcing elements.

FIG. 115 is a side partial cutaway view of the pusher after it has completely pressed against a cut sheet of resilient material next to a cut sheet of reinforcing material, such that the resilient elements have dislodged and replaced the reinforcing elements, so that the reinforcing elements might be removed and optionally discarded.

FIG. 116A is a perspective partial cutaway view of the pusher as it presses against a cut sheet of resilient material next to a cut sheet of reinforcing material, such that the resilient elements dislodge and replace the reinforcing elements. FIG. 116B is a perspective partial cutaway view of the pusher after it has completely pressed against a cut sheet of resilient material next to a cut sheet of reinforcing material, such that the resilient elements have dislodged and replaced the reinforcing elements.

FIG. 119 is a side perspective view of resilient material assembly, where both sides of the resilient elements, but not the lattice of reinforcing material, are covered with adhesive.

FIG. 120 is a side perspective view of the second side of resilient material assembly, where both sides of the resilient elements, but not the lattice of reinforcing material, are covered with adhesive.

FIG. 121 is a perspective view of resilient material assembly, being positioned next to a substrate.

FIG. 123 is a perspective view of the lattice of reinforcing material being extracted and removed, leaving behind a plurality of spaced apart resilient elements bonded to first substrate.

FIG. 124A is a perspective view of single substrate layer composite material. FIG. 124B is a perspective view of alternative single substrate layer composite material.

FIG. 125 is a perspective view of second substrate being positioned next to single substrate layer composite material.

FIG. 126 is a perspective view of second substrate being positioned next to single substrate layer composite material.

FIG. 127 is a perspective view of dual substrate layer composite material.

FIG. 128 is a side perspective view of dual substrate layer composite material.

FIG. 129 is a side view of dual substrate layer composite material.

FIG. 130 is a perspective view of alternative single substrate layer composite material.

FIG. 131 is a perspective view of reinforcing lattice material being positioned next to alternative single substrate layer composite material.

FIG. 132 is a perspective view of seventh composite material.

FIG. 133 is a side perspective view of seventh composite material

FIG. 134 is a perspective view of single substrate layer composite material.

Figure 135:
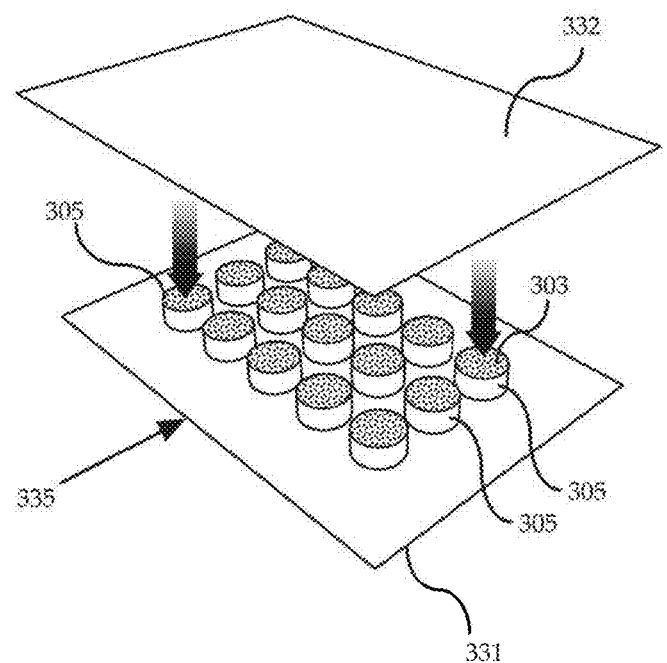

FIG. 135 is a perspective view of second substrate being positioned next to single substrate layer composite material.

Figure 136A:
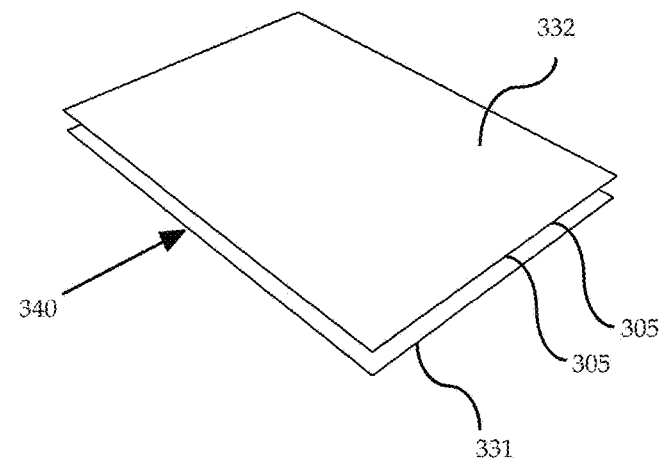
Figure 136B:
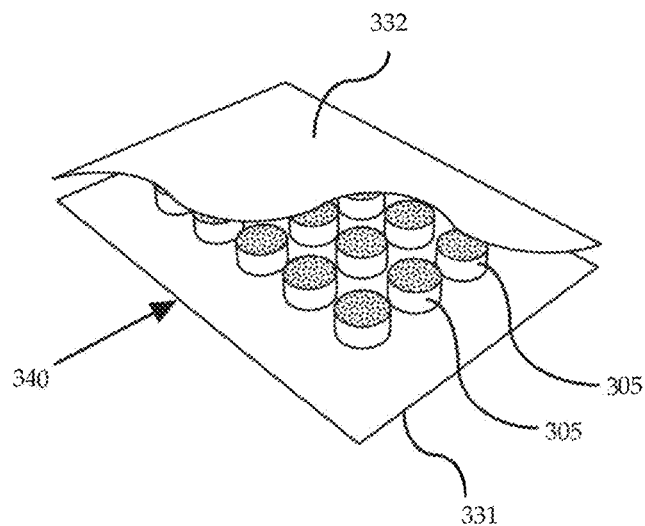

FIG. 136A is a perspective view of dual substrate layer composite material. FIG. 136B is a perspective partial cutaway view of dual substrate layer composite material.

Figure 137A:
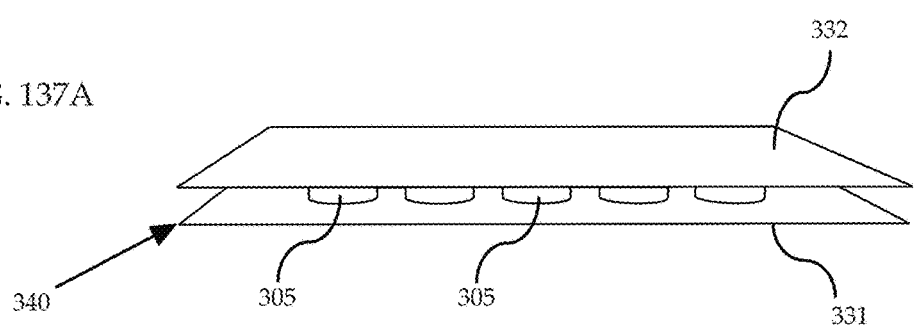

FIG. 137A is a side perspective view of dual substrate layer composite material.

Figure 137B:
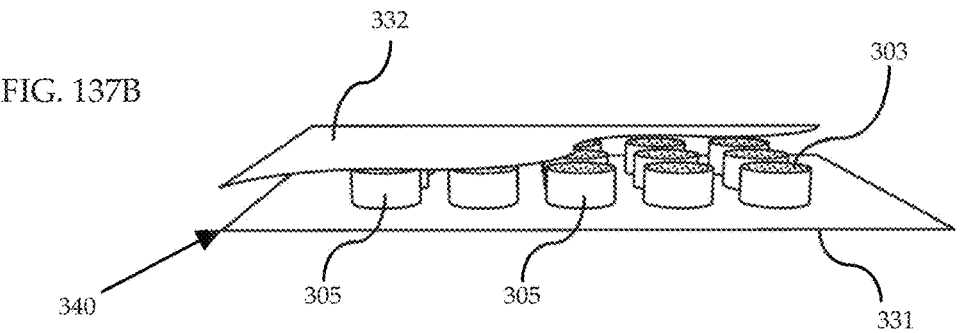
Figure 138:
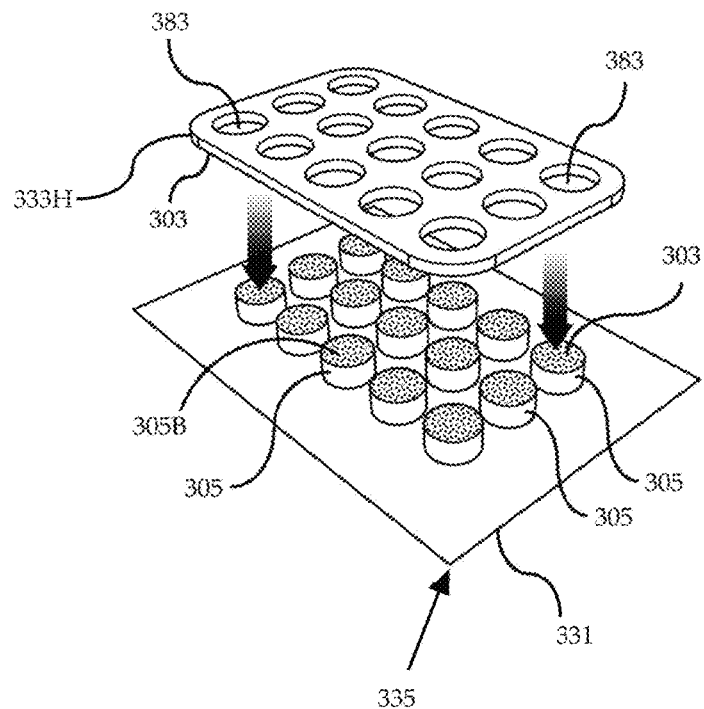

FIG. 137B is a side perspective partial cutaway view of dual substrate layer composite material, FIG. 138 is a perspective view of reinforcing material lattice being positioned next to single substrate layer composite material.

Figure 139:
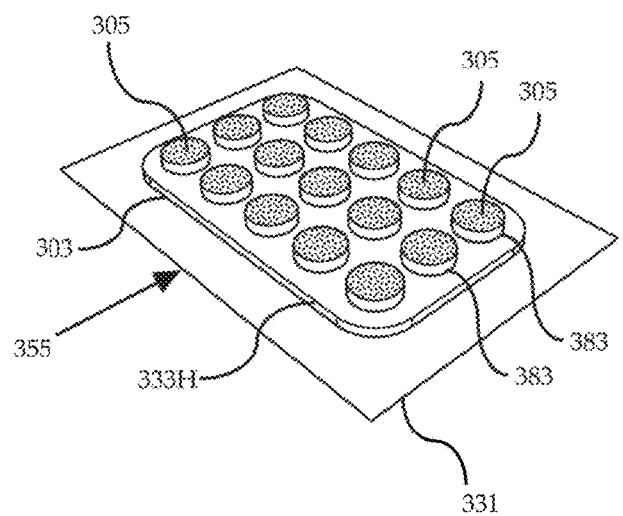

FIG. 139 is a perspective view of reinforcing material lattice positioned such that the holes of reinforcing material lattice align with and engage the resilient elements of single substrate layer composite material.

Figure 140:
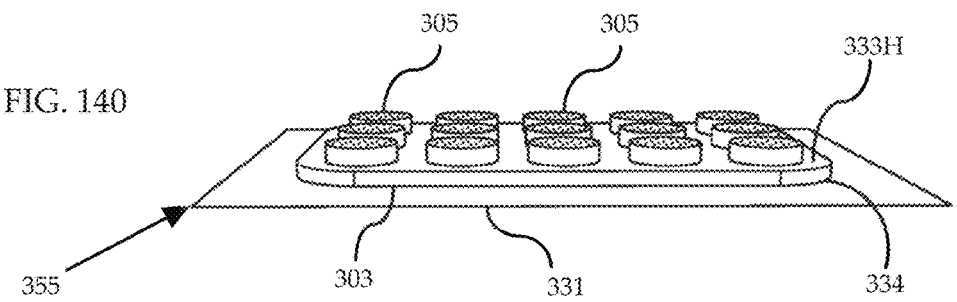

FIG. 140 is a side perspective view of reinforcing material lattice positioned such that the holes of reinforcing material lattice align with and engage the resilient elements of single substrate layer composite material.

Figure 141:
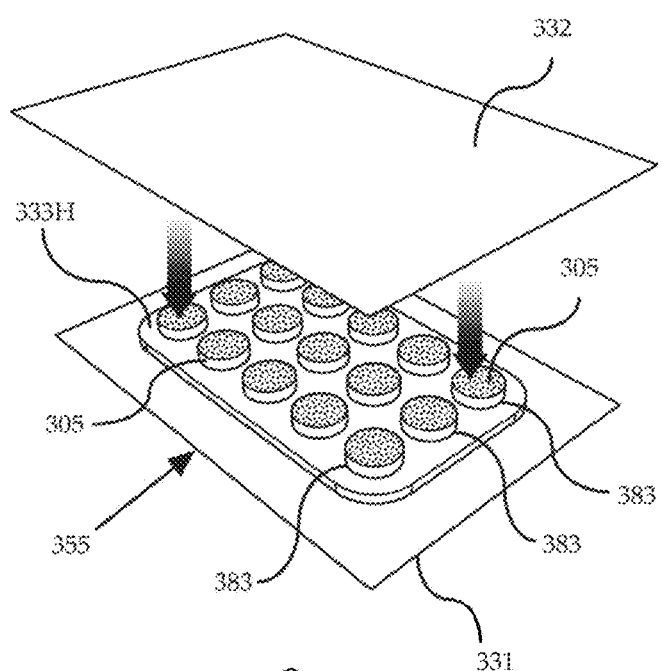

FIG. 141 is a perspective view of second substrate being positioned next to reinforcing material lattice engaged with single substrate layer composite material.

Figure 142A:
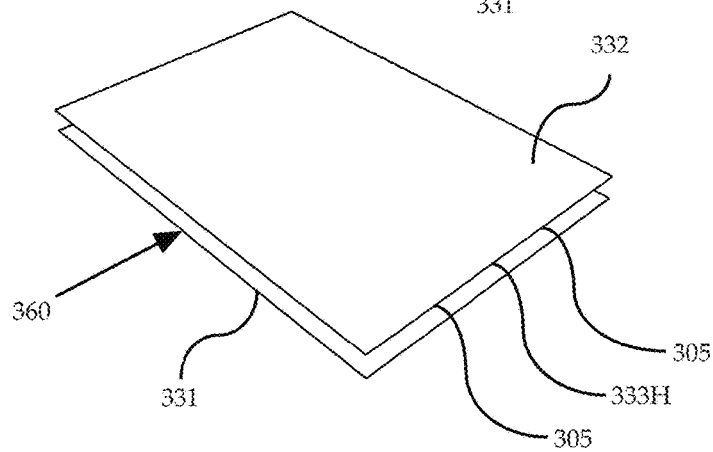
Figure 142B:
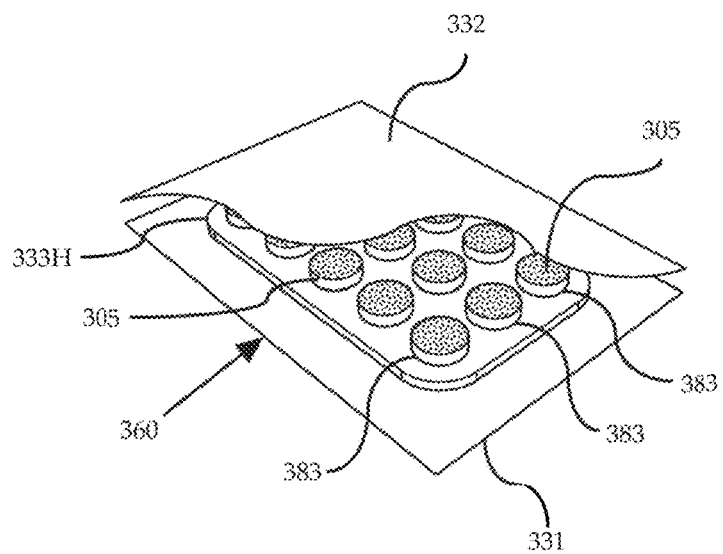

FIG. 142A is a perspective view of eighth composite material. FIG. 142B is a perspective partial cutaway view of eighth composite material.

Figure 143A:
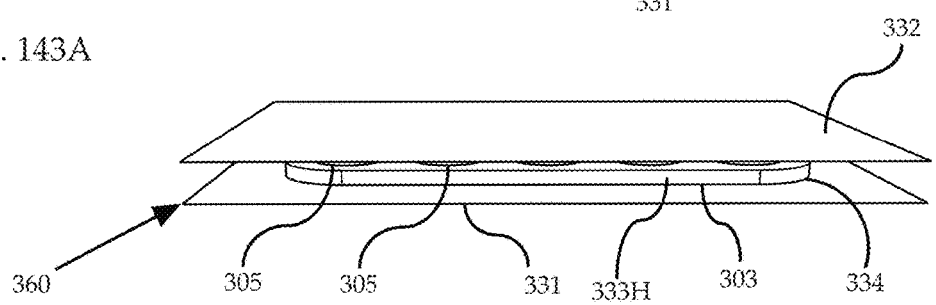
Figure 143B:
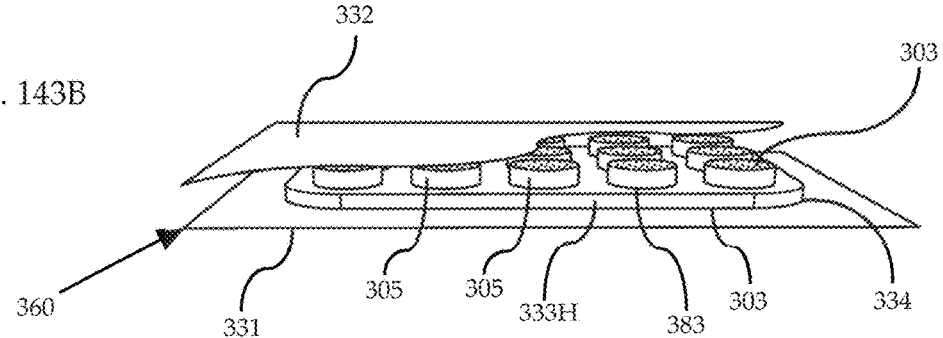

FIG. 143A is a side perspective view of eighth composite material. FIG. 143B is a side perspective partial cutaway view of eighth composite material.

Figure 144:
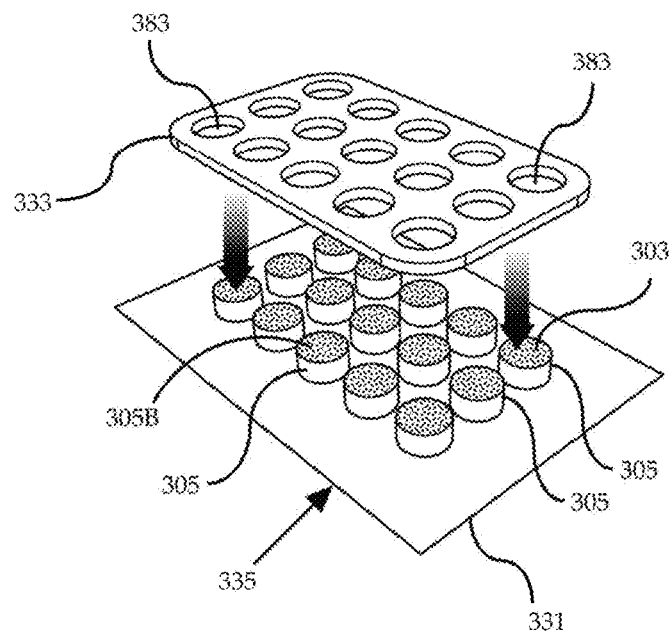

FIG. 144 is a perspective view of uncoated reinforcing material lattice being positioned next to single substrate layer composite material.

Figure 145:
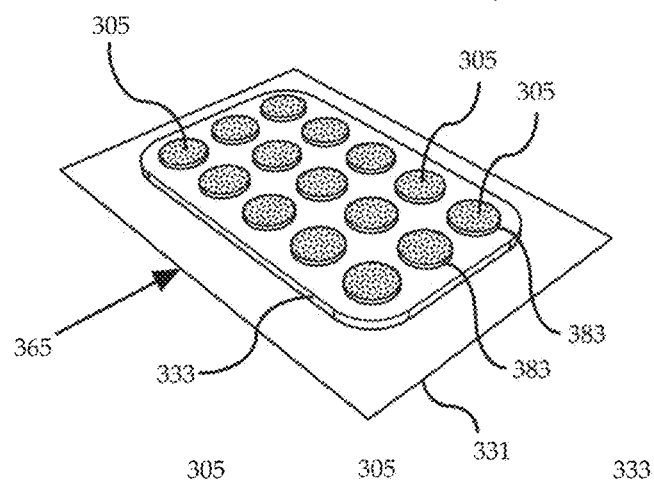

FIG. 145 is a perspective view of single substrate layer composite material with frame.

Figure 146:
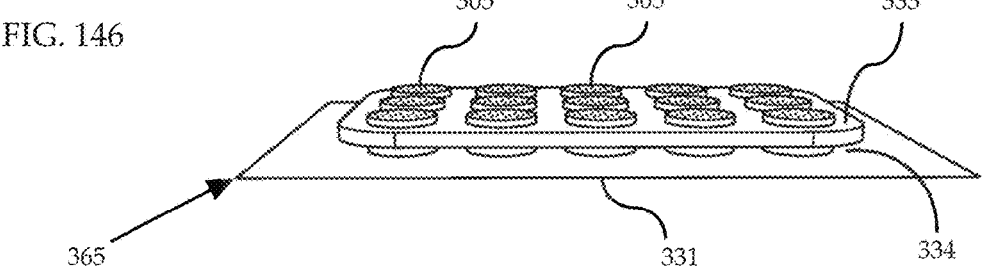

FIG. 146 is a side perspective view of single substrate layer composite material with frame.

Figure 147A:
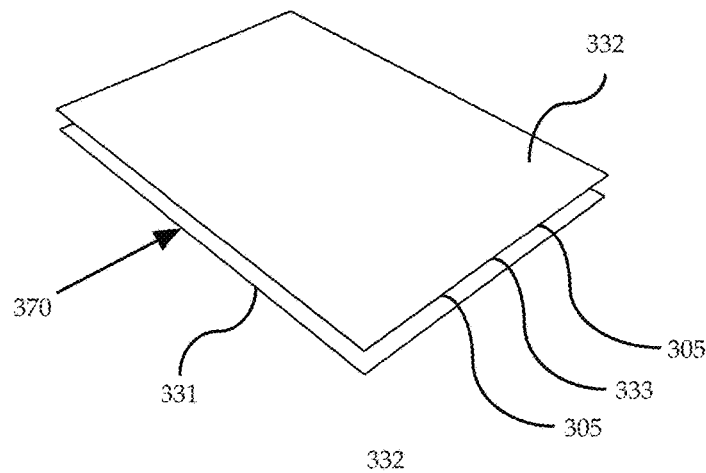
Figure 147B:
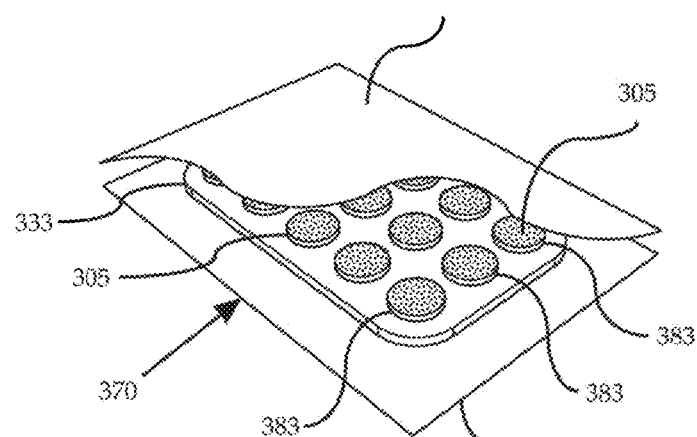
Figure 147C:
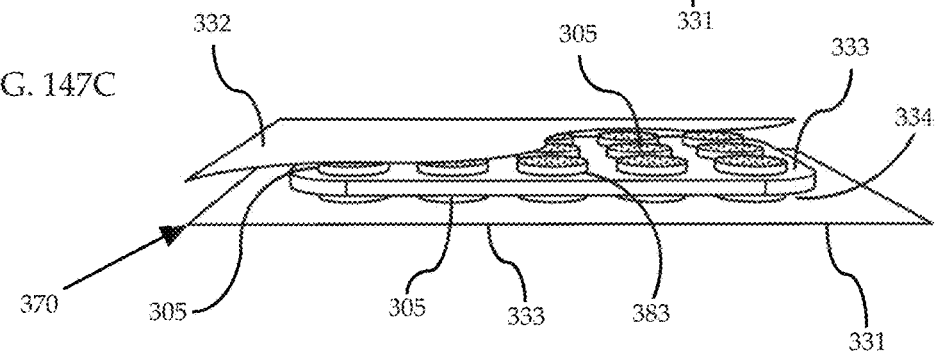

FIG. 147A is a perspective view of dual substrate layer composite material with frame. FIG. 147B is a perspective partial cutaway view of dual substrate layer composite material with frame. FIG. 147C is a side perspective partial cutaway view of dual substrate layer composite material with frame.

Figure 148:
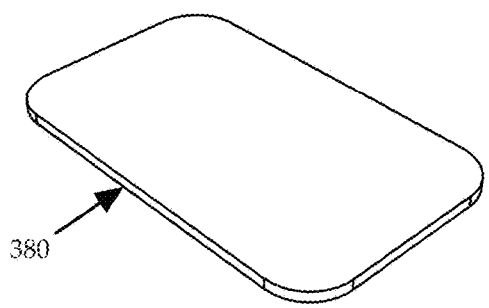

FIG. 148 is a perspective view of base reinforcing material.

Figure 149:
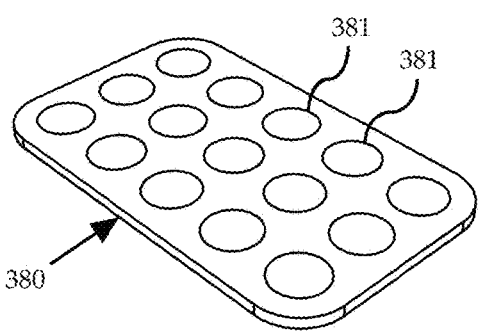

FIG. 149 is a perspective view of base reinforcing material cut along cutting lines.

Figure 150:
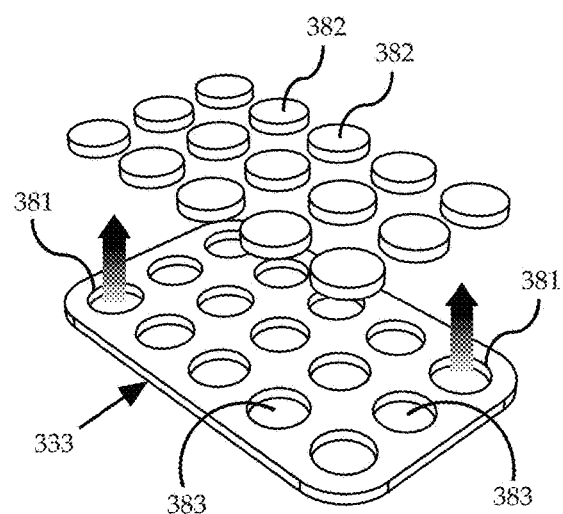

FIG. 150 is a perspective view of base reinforcing material with reinforcing elements being extracted and removed, leaving behind uncoated reinforcing material lattice.

Figure 151A:
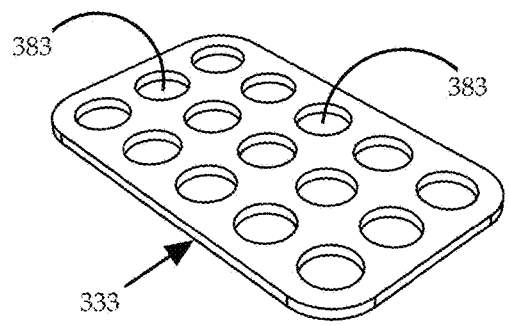
Figure 151B:
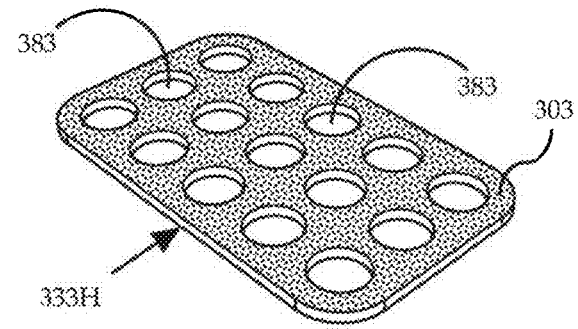

FIG. 151A is a perspective view of uncoated reinforcing material lattice. FIG. 151B is a perspective view of reinforcing material lattice, with adhesive applied to one or more sides.

Figure 152:
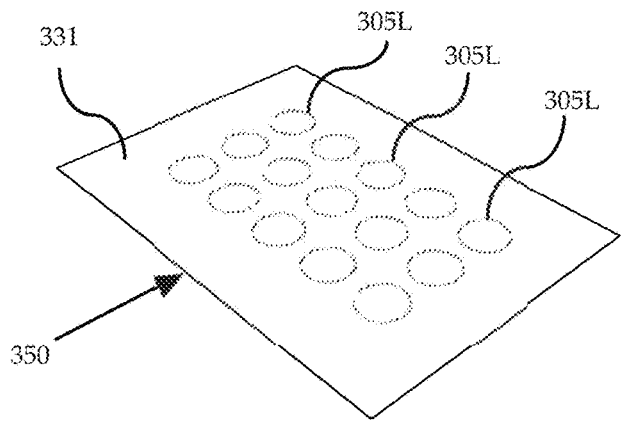

FIG. 152 is a perspective view of seventh composite material, optionally cut along cutting lines.

Figure 153:
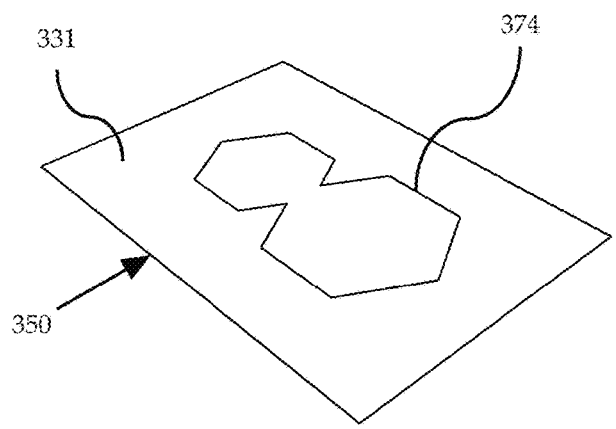

FIG. 153 is a perspective view of seventh composite material, cut along cutting line for use in a protective cushioning pad.

Figure 154:
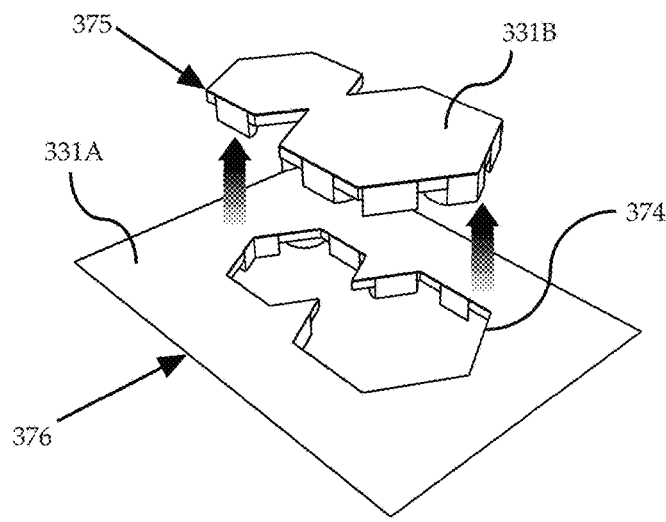

FIG. 154 is a perspective view of seventh composite material, with cushioning pad being separated and extracted.

Figure 155:
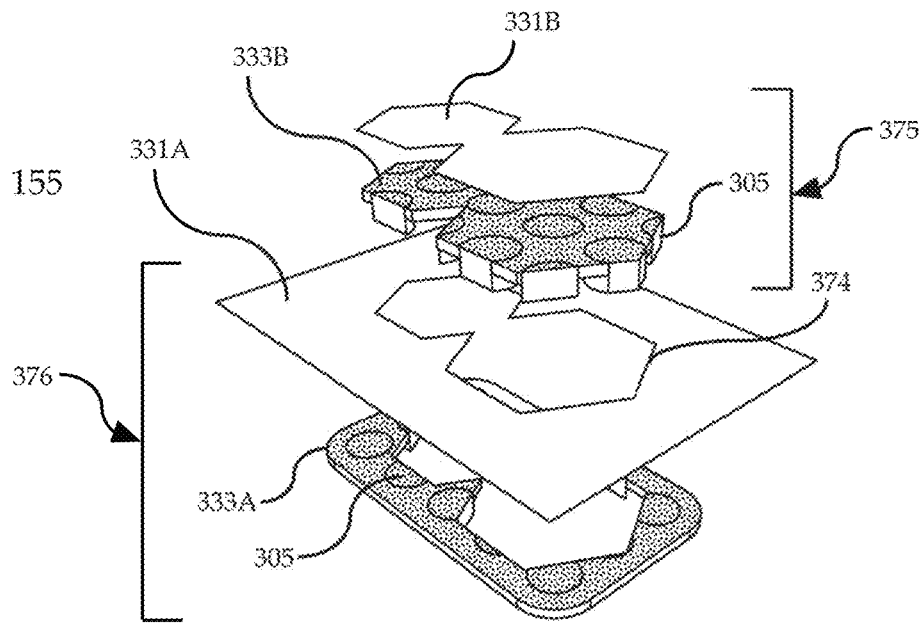

FIG. 155 is an exploded perspective view of cushioning pad and excess seventh composite material.

Figure 156:
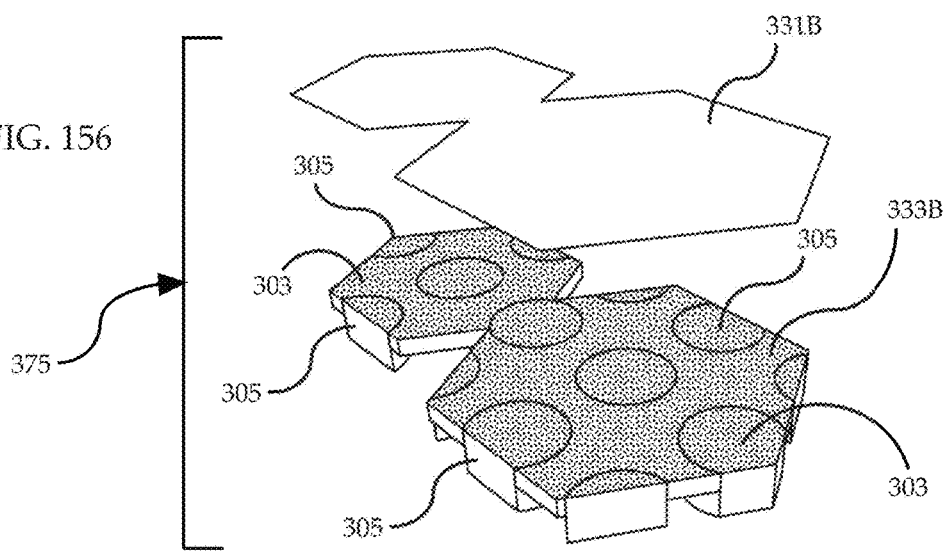

FIG. 156 is an exploded perspective view of excess seventh composite material.

Figure 157A:
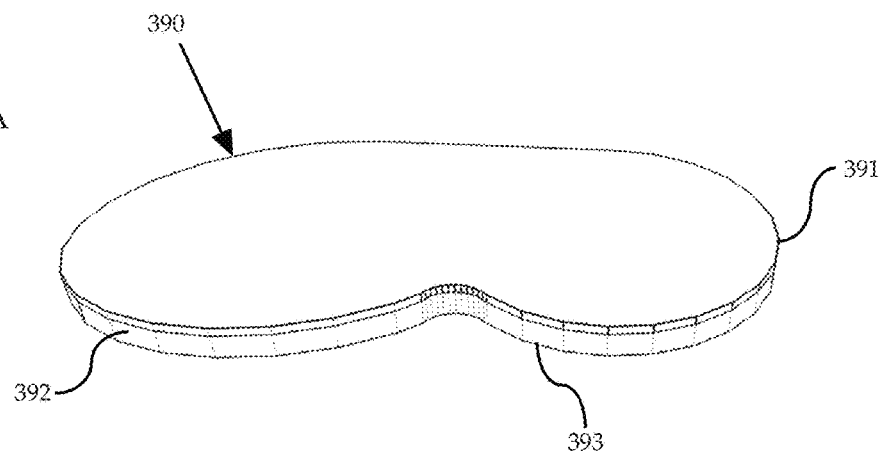
Figure 157B:
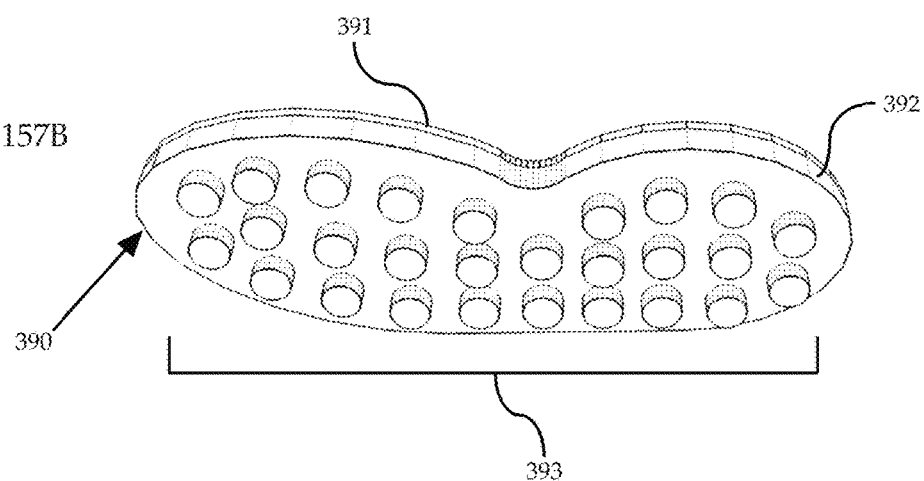
Figure 157C:
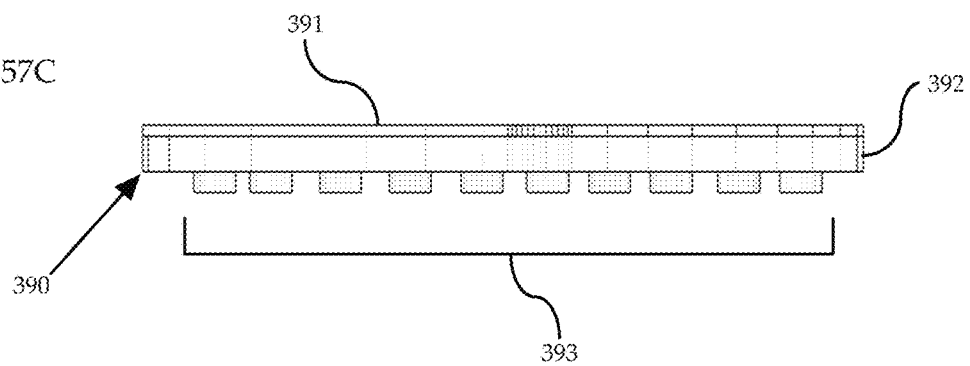

FIG. 157A is a side perspective view of footwear sockliner. FIG. 157B is a side perspective view of the underside of footwear sockliner, showing cushioning pods. FIG. 157C is a side view of footwear sockliner, showing cushioning pods.

Figure 158:
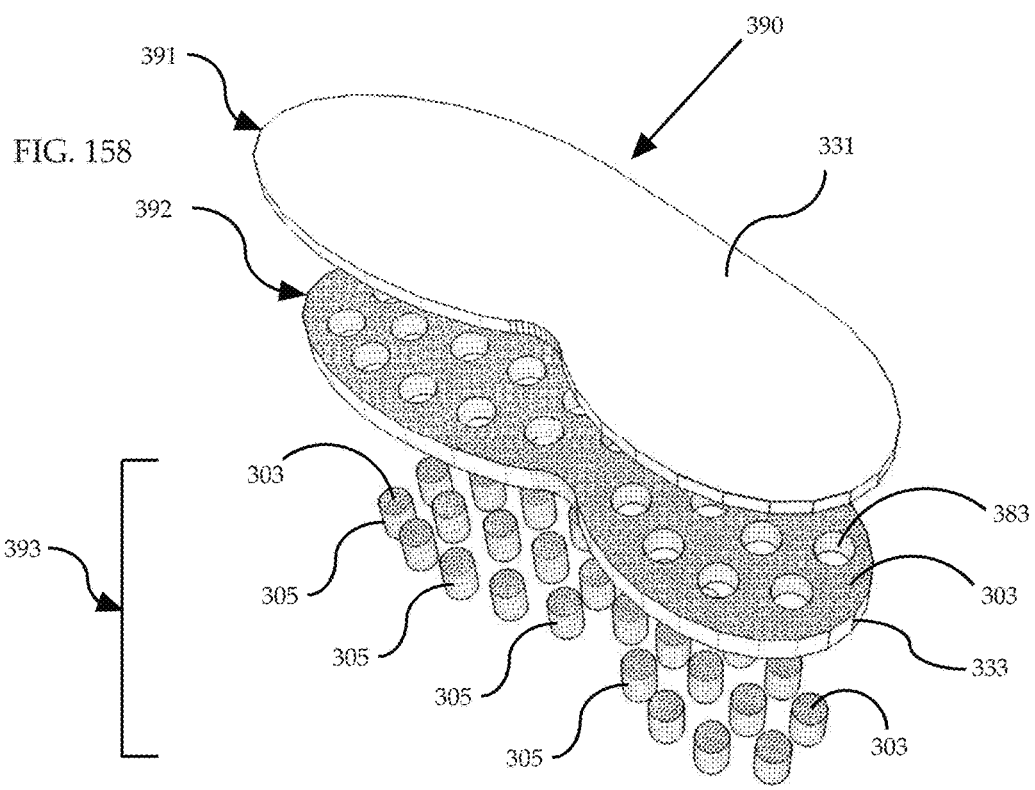

FIG. 158 is an exploded perspective view of footwear sockliner.

Figure 159:
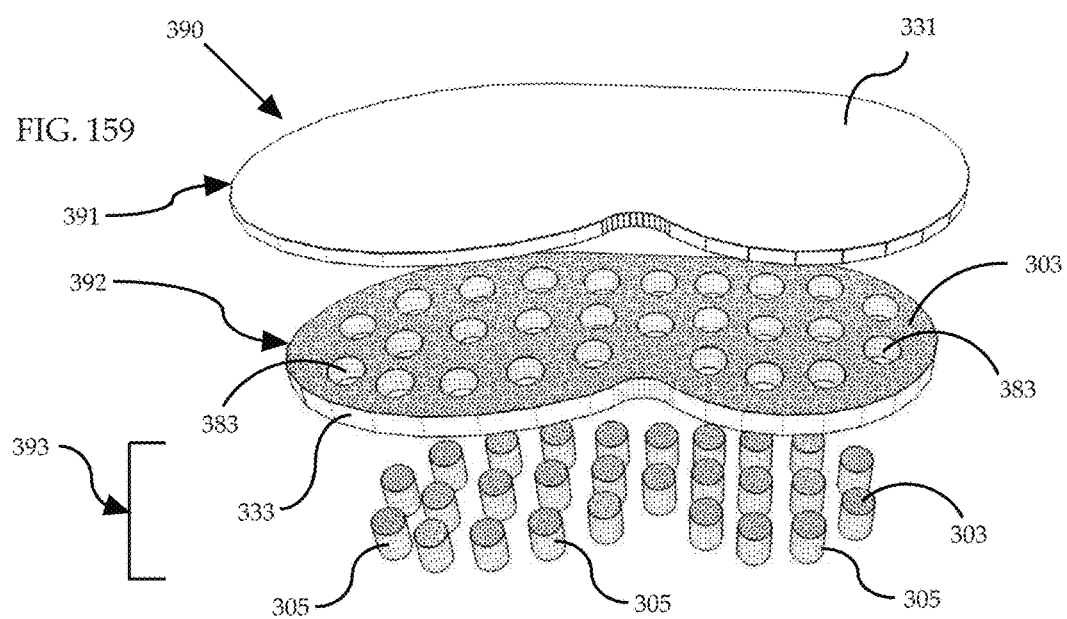

FIG. 159 is an exploded side perspective view of footwear sockliner

DISCLOSURE OF THE INVENTION

In the present application, "a" and "an" are used to refer to both single and a plurality of objects.

In one aspect, the composition of the resilient elements may include without limitation some type of resilient material, such as foam, rubber, elastomer, plastic, and so forth (including a combination of such materials). Functionally, the resilient elements may act as a cushion against impact, or provide insulation to heat, depending on the types and material of the resilient element that is made.

The shape of the resilient element may be in any form, so long as it is able to be reinforced by the reinforcing structure. While the resilient elements shown in the drawings are depicted as cylindrical through its cross-sectional view, each resilient element may have the same or a different shape than the other resilient elements, so long as a plurality of the resilient elements, or the desired subset of the resilient elements, can be reinforced by the selected reinforcement lattice(s). Typically, the resilient elements will be cylindrical, but other regular and irregular shapes may be made such as, without limitation, a block shape, a conical structure, a tapered cylindrical structure or a tapered block structure, or a cylinder, cone, or block having a constricted middle section, which may allow for greater "grabbing" by the element reinforcing structure by allowing the element reinforcing structure to contact the constricted middle portion of the cylinder or block. It is understood that to form these various shapes, each cutting elements will have a shape corresponding to the desired shape of its corresponding resilient element.

All manner of imaginable variation in size and shape of the resilient element is contemplated in the invention. It is to be noted that the height of the resilient elements may vary in a composite. For instance, the height may be made greater in areas where especially high impact is expected. In other words, there is no requirement that the height of the resilient elements as well as the resulting composite pad be uniform. The variability in height may be aesthetic or may serve a physical function. Regarding the shape of the resilient elements, while the presently exemplified shapes include oval and circular resilient elements in top plan view, other designs are contemplated within the present invention, such as various polygons, such as triangles, squares, pentagons, hexagons, heptagons, and so forth, including, dumbbell shapes, other irregular shapes or a mixture of any of these various shapes that can be imagined according to desirability. The shapes do not need to be uniform within a single composite, and in certain situations, a variety of different shapes and sizes of the resilient elements may be used. It is to be understood that the variability of the shape of the resilient elements and how closely spaced apart or how densely or loosely positioned the resilient elements are in relation to each other, may affect the stretchability and breathability of the assembly.

In another aspect, the element reinforcing structure may be made of a variety of different material, including without limitation, foam, neoprene, natural or synthetic leather, plastic, rubber (including, without limitation, latex and silicone), or synthetic fabric, depending on its use. In one aspect of the invention, the reinforcing structure may be made of a different material from the sheeting structure, depending on the use of the composite. For example, if it is desired that the element reinforcing structure be stable and not be stretchable as compared with the sheet structure, then the material for the reinforcing structure and the sheeting structure should be so chosen as to result in these properties. An example of this situation occurs in for instance, an elbow or knee pad, where the sheeting structure may be flexible but that the element and the element reinforcing structure should not be as flexible so that optimum cushioning may be provided to the angled elbow or knee through the stable placement of the element to the angled area.

The element reinforcing structure may be a hard material, which would restrict movement of the reinforcing structure within its environment, such as without limitation, hard foam, leather, rubber, or a plastic sheet.

If, on the other hand, it is desired that the reinforcing material be more stretchable than the resilient material, then a more stretchable material may be chosen for the element reinforcing material. It is understood that the material to be chosen to effectuate the desired stretching properties are available to a person of skill in the art.

The element reinforcing structure may be shaped flat or curved. The material for the element reinforcing structure may be adjusted to increase or decrease absorbency, breathability, stretchability, or tensile strength. The element reinforcing structure may include holes or openings to increase or decrease breathability, stretchability, and air circulation. Any manner of properties for the element reinforcing structure in contemplated within the purview of the invention.

Regarding the lattice of reinforcing material or otherwise referred to as reinforcement member, several of the lattices may be used together. Some may be stacked on top of each other interconnecting with other lattices on the same plane, or to lattices on different planes through engagement to common resilient elements, and so forth. Whereas the present application exemplifies certain shapes of lattices, a variety of lattice shapes for physical, functional or aesthetic purposes are contemplated. Lattices with cut-outs and other various shapes and sizes, for example, are contemplated within the invention. Indeed any shape imaginable can be made of the resilient elements and the lattice of reinforcing structure can be used in the composite pad of the invention.

In another aspect of the invention, the sheeting structure may be typically composed of a fabric, which may be natural or synthetic fabric. Alternatively, the sheeting structure may be flexible or pliable plastic, or latex, silicone, or other rubber material, or made of synthetic fiber, which impart breathability and stretchability to the assembly.

In a specific embodiment, the present invention is directed to a protective pad construction for use on, amongst other things, protective garments, headgear, athletic clothing, body armor, and other uses where light weight, breathable, stretchable, contourable shock absorption to not only protect the body but also as a padding is needed. Footwear, bags, backpacks, sacks, seats, and seat cushions are some of the many products that would benefit from combining with the inventive composite pad. The foam pad of the present invention is constructed in accordance with the preferred embodiments illustrated in the drawings.

A typical application of the inventive resilient or foam pad is shown in FIG. 1, where a representative undergarment is indicated generally at 10, and may be of a type used by athletes in football, baseball, basketball, etc. The undergarment is illustrated to show just one use of the inventive foam pads, and is not intended to limit application of the foam pad of the present invention to be placed only on undergarments. The inventive pads may be placed permanently or by reversible attachment on any object for which protection of the wearer from impact force is desired. Such reversible attachment may be carried out by without limitation zippers, velcro and so forth. Turning to FIG. 1, the garment includes an upper portion 12 for fitting around the waist and hips, and leg portions 14 and 16 which extend downwardly approximately midway along the thighs. The undergarment is constructed of suitable material for providing compression against the body, to aid in minimizing fatigue and strain during athletic activities. Shown mounted on the undergarment are protective pads, such as a hip pad indicated at 18 and a thigh pad indicated at 20. The provision of hip and thigh pads on undergarments is conventionally used, and FIG. 1 is merely provided to show where the inventive foam pads might typically be placed. Of course, foam pads could be placed on other areas of the undergarment, such as without limitation, on the backside and groin areas. And further foam pads could be placed on helmets, backpack linings, equipment linings, footwear, seats, and so forth.

The inventive composite material may comprise a laminated structure including a substrate, a plurality of discrete, spaced-apart resilient elements or foam elements and a reinforcing structure or lattice for surrounding selected resilient or foam elements, and at least an upper layer of fabric or mesh material. This foam pad or "package," of desired configuration, can be adapted for integration in numerous applications as has been described above.

Resilient Pad Composite with Partial Reinforcement

For convenience, the resilient pad composite material comprising elements of the invention will be referred to hereinafter in a specific embodiment as "foam pad". It is to be understood that while the present application describes the present invention as a "foam pad", the invention should not be limited to "foam" element, as other material may be used, and further the invention should not be necessarily limited to a "pad", as other uses of the composite are contemplated in the invention, such as elbow and knee guards and protectors, shin guards, shoulder guards and protectors, and chest protectors for athletes; exercise mats; back panels for backpacks, shoulder straps, and padding for weightlifting belts; helmet and hat linings, head protectors; linings for body armor; shoe midsoles, shoe outsoles, shoe inner lining, and other applications where lightweight, breathable, stretchable, contourable, flexible protective cushioning is desired. As shown in FIG. 2, a foam pad with partial reinforcement is shown in an exploded view. The foam pad includes an upper layer of fabric or mesh material generally indicated at 22, an intermediate or partial reinforcement member 24 which may be thought of as a "cage," because it captures selected ones of foam elements. A substrate of fabric or mesh material is indicated at 26, and a plurality of discrete, spaced-apart foam elements are indicated at 28. The foam elements, in this example are shown as being optionally circular or oval in cross-section and are optionally cylindrical in form.

The foam pads may be made of suitable foam material, such as EVA, PE, Neoprene, or other foam material. In the exploded view in FIG. 2, an upper surface of the foam elements is exposed, it being understood that the lower surface has been optionally suitably bonded, by appropriate adhesive material, in a laminating process to the upper surface of substrate 26. The upper surface of the foam elements, such as indicated at 28a is also provided with adhesive material which upon suitable application of heat can be laminated to mesh material 22.

Partial reinforcement member or lattice 24 is dimensioned with a cross-sectional area which is less than that of the area occupied by resilient or foam elements 28 on substrate 26. Reinforcement member 24 is provided with a plurality of openings, in this case circular openings 30 which are dimensioned with a diameter greater than the diameters of foam elements 28.

As can be seen, reinforcement member 24 is dimensioned with a width W and a length L less than the width and length of the area occupied by foam elements 28 on substrate 26. In assembly, reinforcement member 24 is displaced over a region of the expanse of foam elements 28, as shown in FIG. 3 so that certain of the foam elements are confined within corresponding apertures of reinforcement member 24 while remainder ones of the foam elements remain unconstrained.

As shown in FIG. 3, there are outer rows of foam elements 28 which are not constrained by reinforcement member 24. This can be appreciated further by viewing FIG. 4, which is a cross-sectional view taken along lines 4-4, where it can be seen that when reinforcement member 24 is downwardly positioned over aligned ones of foam elements 28, a portion of each of the foam elements extends above the upper surface of reinforcement member 24. Outer rows of foam elements 28 are not constrained by reinforcement member 24. As also shown in FIG. 4, the composite are sandwich construction includes upper layer 22 adhered onto the upper surface of foam elements 28. Upper surface 22 is adhered to the foam element in a lamination process; as mentioned previously, substrate 26 was adhered to the bottom surface of foam elements by a lamination process as well.

The construction as described above, with inclusion of a partial reinforcement member provides distinct advantages when the composite foam pad is utilized for protection. While FIGS. 2-4 illustrate a foam pad having a generally rectangular configuration, and with partial reinforcement member 24 also being generally rectangular, it should be appreciated that other configurations, such as circular, oblong, triangular, etc. could be readily provided, depending upon the particular placement of the foam pad. For example, if the composite foam pad is placed on a thigh or hip, it may well have a different configuration than if it is placed on headgear, for protection on the elbow, knee, shin, or other area of the body. Partial reinforcement, as described above, enables a composite foam pad to provide several important advantages. First, designation of a specific area to be covered by the reinforcement member enables the foam elements on the fabric, outside of the reinforcement member to move along with the fabric as it is stretched. This stretching may occur, depending upon body part movement, such as the leg, arm or wherever the composite foam pad is provided. The foam element captured within the reinforcement member of course will not move with the stretching action nearly as much as the foam elements outside of the reinforcement member. The reinforcement member also provides additional shock absorbing capability. As shown in FIG. 4, reinforcement member 24 is dimensioned so that a portion of the foam elements 28 optionally extend above the upper surface of the reinforcement member. This enables the foam elements to be compressed upon impact, but the compression is limited in a downward direction by the surface of the reinforcement member. However, the height of the resilient elements may be varied and is not limited to a height extending above the upper surface of the reinforcement member. The reinforcement member may be constructed of a less resilient material and therefore provides enhanced shock absorbing effect. Apertures 30 provided in reinforcement member 24 optionally may be dimensioned with a diameter greater than that of foam elements 28, so that there is some play of each foam element within its associated aperture 30 in the composite foam pad. Greater differences in the diameter allow more air to circulate within the pad resulting in a pad with greater flexibility and with enhanced circulation or "breathing".

Thus, from the description above, it can be seen that the partial reinforcement member 24 provides extra protection, while still enabling a composite foam pad to stretch. With this general construction in mind, it can be appreciated that reinforcement member 24 may be designed to custom specifications and protect a given area while allowing another area to stretch where articulation is necessary. The combination of breathability can be insured by areas not covered by the reinforcement member and the reinforcement member itself may provide an enhanced amount of insulation. Moreover, the foam elements such as indicated at 28 and the reinforcement member 24 may be suitably provided with a bore extending therethrough which can enhance circulation, again depending on the particular application of the foam pad.

While not specifically shown in FIG. 2, multiple reinforcement members or lattices may be provided at selected locations to capture selected ones of the foam elements. Reinforcement lattices, as illustrated above, and in particular with respect to FIG. 4, can be seen to provide an area of circulation between the upper layer 22 and the top surface of the reinforcement lattice. In essence an air chamber is provided, and this circulation may be important for comfort. Moreover, the foam elements first absorb an impact and then the reinforcement member absorbs further impact as the foam elements depress, therefore absorbing more energy from an impact. The reinforcement member also maintains those foam elements captured therewithin in a substantially uniform position. This may be important for protecting a certain area of the body; a portion of the foam pad may stretch to accommodate movement but those foam elements captured within the reinforcement member maintain a substantially uniform orientation with respect to that body portion sought to be protected.

The reinforcement member also will help prevent damage to those foam elements captured within the reinforcement member; for example, certain types of impact may cause foam elements to be compressed toward one another, and could cause damage to them. With the reinforcement member in position, the foam elements captured within the reinforcement member are spaced apart and maintained apart, thereby enhancing their integrity and wear.

Resilient Pad Composite with Full Reinforcement

Figure 5:
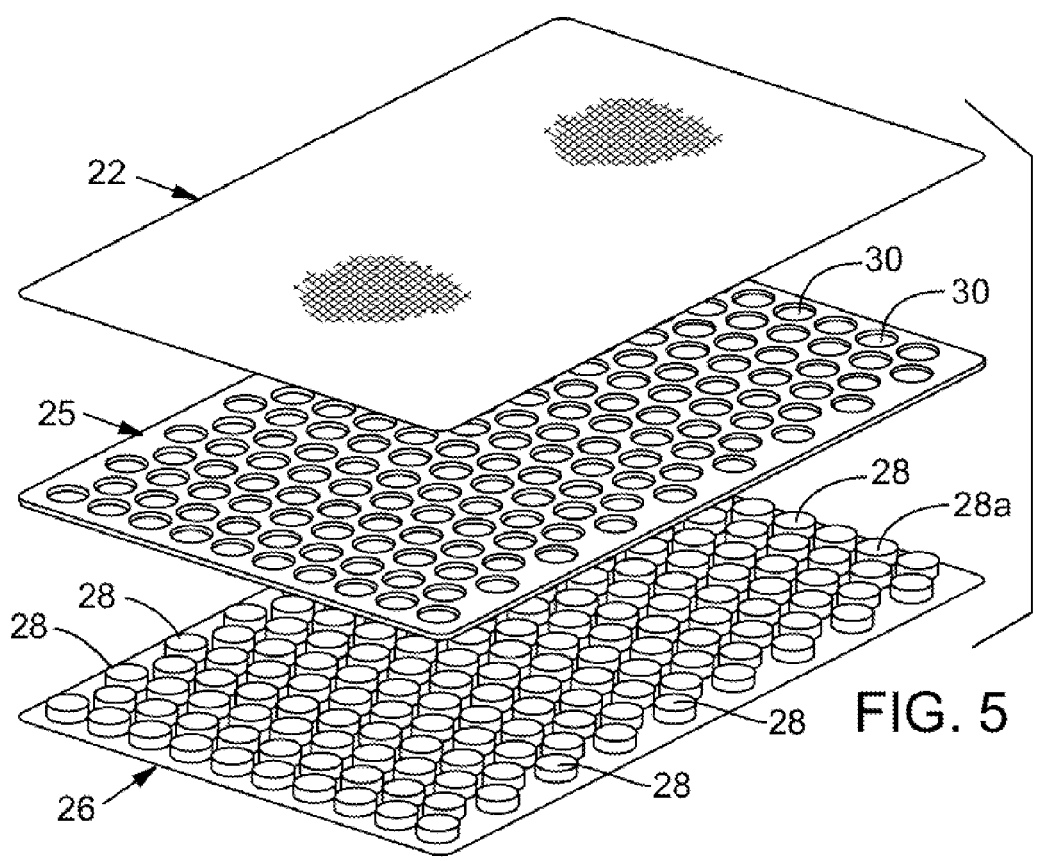
FIG. 5 is an exploded view of the resilient pad assembly, which includes the resilient elements, the full reinforcement lattice and a support.
Figure 6:
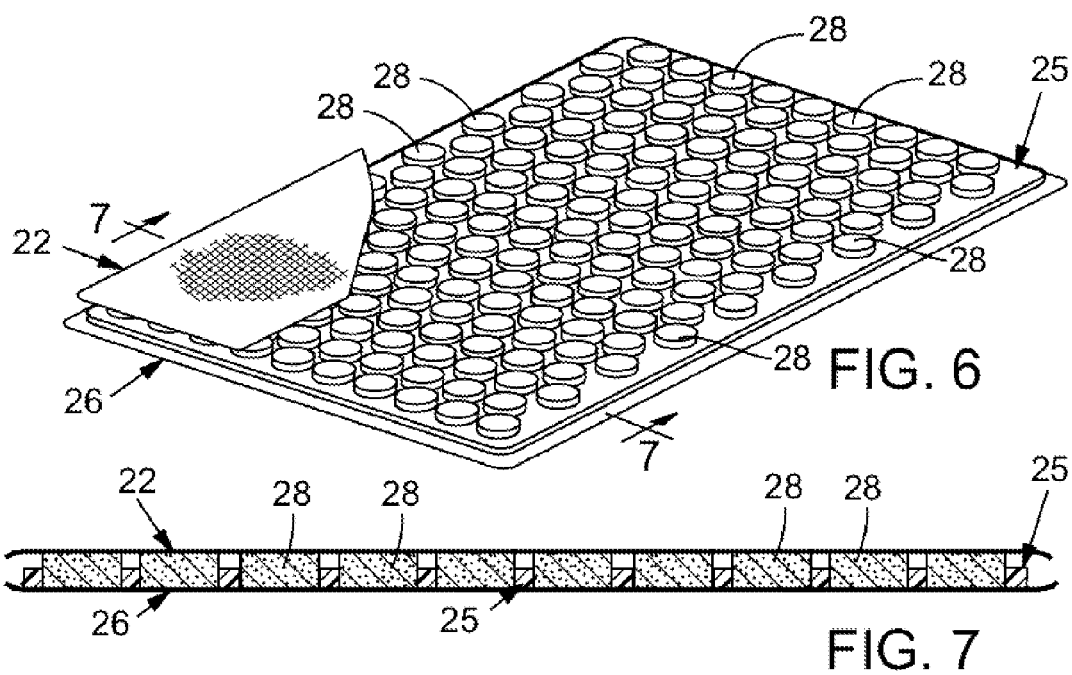
FIG. 6 is a partial cut away view of the resilient pad assembly, which includes the resilient elements, the full reinforcement lattice and a support.

The present invention also contemplates a composite foam pad in which there is full reinforcement, and that construction is shown in the exploded view of FIG. 5. Specifically, an intermediate full reinforcement member or cage, generally indicated at 25 is provided with apertures for alignment for receiving therewithin foam elements 28 in a composite structure. The foam pad as optionally fully laminated is shown in FIG. 6, and as can be seen, along with FIG. 7, the foam elements optionally extend above the surface of the reinforcement member 25 and fabric 22 is suitably laminated to provide the composite construction. However, the height of the resilient elements may be varied and is not limited to a height extending above the upper surface of the reinforcement member. It is recognized that the distinction between a "partial" or "full" reinforcement member may blur, depending upon the number of foam elements and the specific outline or configuration of the reinforcement member. For example, while FIG. 6 shows a full reinforcement member which contemplates capturing substantially all of the foam elements, a reinforcement member may be constructed intermediate in size, as say between reinforcement members 24 and 25. Again, the relative dimensions of a reinforcement member depend upon the need and where the protection is needed. Of course with the full reinforcement member as shown in FIG. 6, stretching of the fabric is limited significantly from the capability of the fabric shown in FIG. 3, which shows partial reinforcement member. It is understood that a reinforcement member (whether partial or full) may link with another reinforcement member through engagement by another reinforcement member to shared resilient elements. For instance, reinforcement members positioned side by side on a resilient sheet may be more stably linked together by placing another reinforcement lattice stacked over the reinforcement members below by engaging the stacking reinforcement lattice to resilient elements common to the reinforcement members positioned on the resilient pad.

Resilient Pad Composite with Partial and Full Reinforcement

As shown in FIG. 8, a foam pad with partial and full reinforcement "stacked" is shown in an exploded view. The foam pad includes an upper layer of fabric or mesh material generally indicated at 22, and two intermediate members, such as partial reinforcement member 24 and full reinforcement member 25. As shown in the composite structure in FIGS. 9 and 10, reinforcement member 24 is mounted on top of reinforcement member 25 and in that area of overlap, compressibility of foam elements 28 is greatly diminished. While there are areas above reinforcement member 25 where reinforcement member 24 does not repose, and more compression of adjacent foam elements is maintained, it should be appreciated that the "stacked" arrangement of the reinforcement members provides a further enhanced area of impact protection. Depending upon the relative sizes of the reinforcement members, there can be a stacked configuration of "partial" cages which would enable outlining areas of the mesh or fabric to still provide stretchability. The point here is that there are numerous types of combinations and configurations which can be provided with the multiple, stacked reinforcement member configuration shown. What is more, with the concept of stacking, portions of the composite foam pad may be reinforced with stacked reinforcement members while other portions may have a partial reinforcement member. Choice of perimeters and design enable customization of a foam pad with reinforcement and stability as desired. FIG. 11 shows a different type of foam element construction, in this case a conical configuration which would allow a reinforcement member to be received thereover but provide further air space for breathability. Breathability is also enhanced by the foam element construction shown in FIG. 12, namely, that a bore may be optionally constructed through each foam element such that breathability between the upper fabric 22 and lower substrate 26 is provided.

Figure 13A:
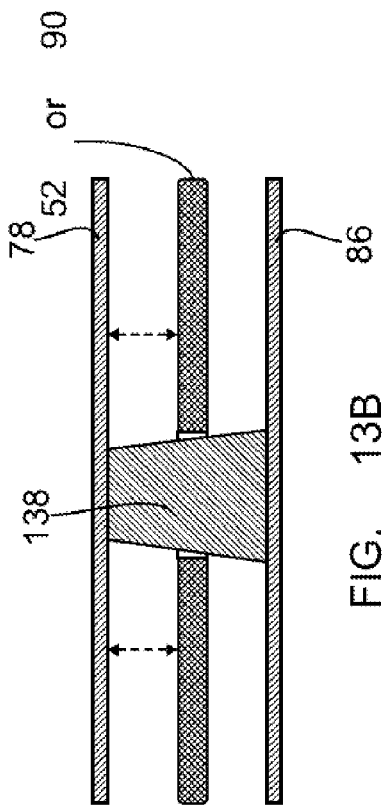
FIGS. 13A-13D are sectional side views of the resilient pad assembly, where the resilient assembly is surrounded by reinforcement lattice. The resilient element is shaped as A: a cylinder; B: cone; C: a cylinder with a constricted end section; D: a cylinder with constriction near the middle of its body.
Figure 13B:
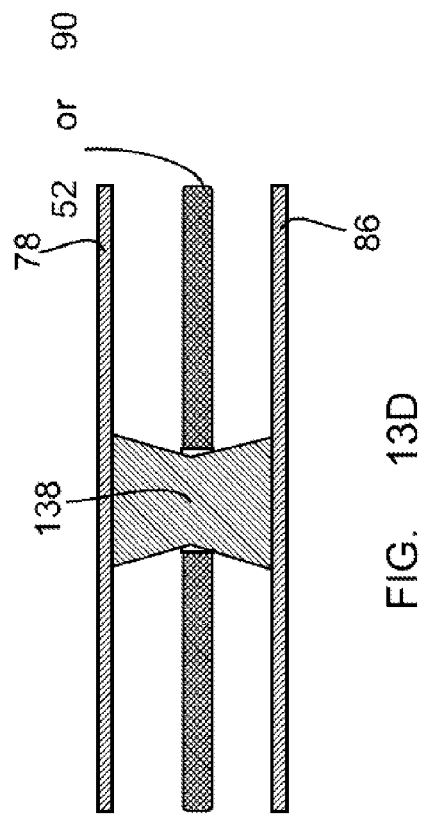
Figure 13C:
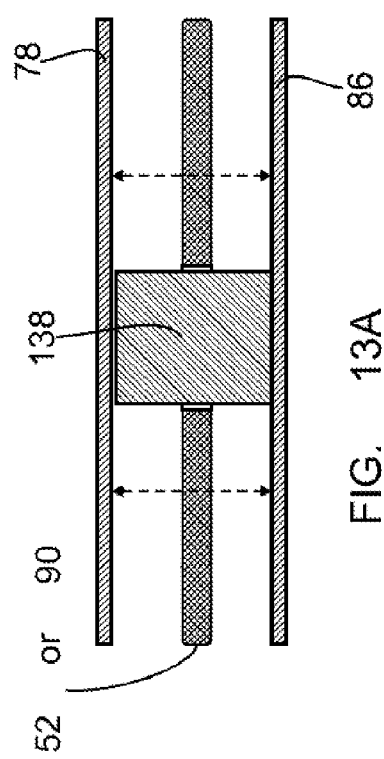
Figure 13D:
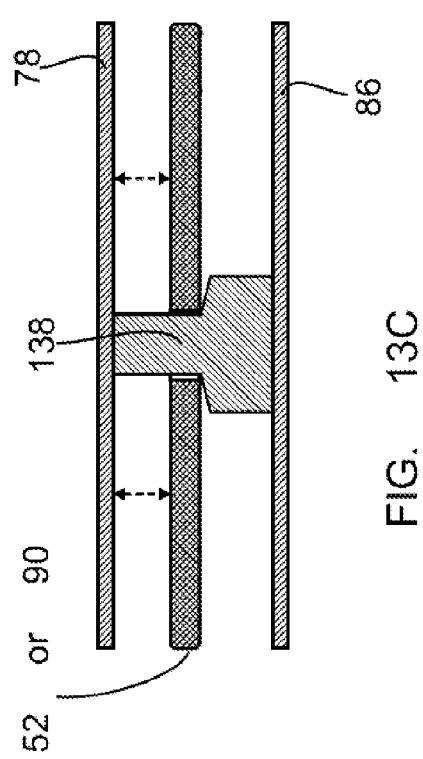

FIGS. 13A-13D show examples of different configurations of foam elements which may be utilized in a cage construction. FIG. 13A shows an elongated foam element, and the arrows indicate that a cage may have movement caused by impact or relaxing of impact. FIG. 13B shows an elongated conical foam element and FIG. 13C shows a foam element formed of a wider base portion. FIG. 13D shows a pair of truncated cones facing one another which would tend to localize a cage intermediate the top and bottom of the resilient or foam element, rather than near the top surface of the substrate or adjacent the bottom surface of the upper layer.

Figure 7:
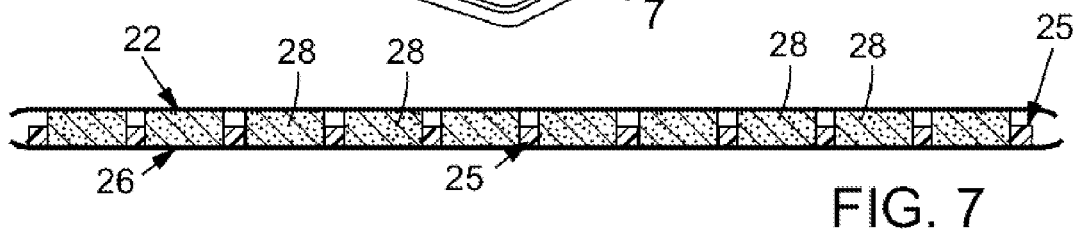
FIG. 7 is a side view of the resilient pad assembly, which includes the resilient elements, the full reinforcement lattice and a support.

It will be noted that in FIG. 4, partial reinforcement member 24 is shown disposed against substrate 26. However, it should be recognized that the reinforcement member may move vertically or horizontally while engaged to the resilient elements or "jiggle" or "float" between upper layer 22 and substrate 26, depending on the height of the reinforcement member in relation to the resilient elements. There is more "float" or "jiggle" if the height of the resilient element is higher. This also depends, of course, upon the configuration of the foam elements, the relative friction between the foam elements and the openings of the reinforcement member and the degree and force of impact, if and when that occurs. Similarly, while FIG. 7 shows full reinforcement member 25 positioned against substrate 26, that reinforcement member may move or float between upper layer 22 and substrate 26. In the embodiment shown in FIG. 10, depending upon the relative thicknesses of partial reinforcement member 24 and full reinforcement member 25, floating action or movement of the "stacked" reinforcement members may be limited to a lesser degree than if a single reinforcement member, whether partial or full, were utilized.

A First Process for Making the Resilient Composite Pad

The present invention also relates to a process for making composite pads with no reinforcement, partial reinforcement, full reinforcement, and both partial and full reinforcement, such as depicted in FIGS. 1-13. In one exemplified method, the process generally comprises:

(a) providing a sheet of resilient material having opposing sides;

(b) applying an adhesive to either or both sides of the sheet of resilient material;

(c) providing a first cutter having a surface and a plurality of cutting elements extending from the surface in a predetermined pattern, where each cutting element has a shape defining an internal space, wherein the plurality of cutting elements are spaced apart from one another to define a contiguous space surrounding and between the plurality of cutting elements, and the internal spaces and the contiguous space are optionally filled with biasing material;

(d) pressing the first cutter into the sheet of resilient material, thereby forming a cut sheet of resilient material comprising a plurality of resilient elements and an excess resilient material, where each resilient element has a shape corresponding to the shape of the internal space of its corresponding cutting element, the plurality of resilient elements form a pattern corresponding to the predetermined pattern of the plurality of cutting elements, and the excess resilient material has a shape corresponding to the shape of the contiguous space;

(e) withdrawing the cutter from the cut sheet of resilient material, whereby the biasing material urges the plurality of resilient elements and the excess resilient material away from the internal spaces within and the contiguous space surrounding the plurality of cutting elements, thereby leaving the cut sheet of resilient material with the cut portions of the resilient elements surrounded by the excess resilient material;

(f) separately providing a sheet of reinforcing material, which may be optionally processed using the methods described in steps (g)-(i), however, the methods of processing a reinforcement lattice is not limited to carrying out the following steps, so long as at least one reinforcement lattice is obtained so as to be combinable with the resilient elements to form the inventive composite pad;

(g) pressing a second cutter into the sheet of reinforcing material, thereby forming a cut sheet of reinforcing material comprising a plurality of reinforcing elements and at least one lattice of reinforcing material, where each reinforcing element has a size and shape corresponding to the predetermined size and shape of the cutting elements, the plurality of reinforcing elements form a pattern corresponding to the predetermined pattern of the plurality of cutting elements, and the lattice of reinforcing material has a shape corresponding to the shape of the contiguous space;

(h) withdrawing the second cutter from the cut sheet of reinforcing material, whereby if the biasing material is optionally used, the biasing material urges the plurality of reinforcing elements and the lattice of reinforcing material away from the internal spaces within and the contiguous space surrounding the plurality of cutting elements, and thereby leaves the cut sheet of reinforcing material with the cut portions of the reinforcing elements optionally surrounded by the lattice of reinforcing material;

(i) separating the lattice of reinforcing material from the reinforcing elements, whereby the lattice of reinforcing material is left with a plurality of holes through the reinforcing material where the reinforcing elements used to be;

(j) providing a die comprising a surface having a plurality of openings defined therein, where the surface surrounding the openings has a shape substantially corresponding to the shape of the excess resilient material in the cut sheet of resilient material, and to the shape of the lattice of reinforcing material, and where at least a plurality of openings form a pattern corresponding to the pattern of at least some of the resilient elements in the cut sheet of the resilient material;

(k) placing at least one lattice of reinforcing material on the die and aligning the lattice of reinforcing material so that the plurality of holes in the lattice of reinforcing material are positioned above the plurality of openings in the die;

(l) placing the cut sheet of resilient material on top of the lattice of reinforcing material, and aligning the cut sheet of resilient material so that the plurality of resilient elements are positioned above the plurality of holes in the lattice of reinforcing material, and above the plurality of openings in the die;

(m) providing a pusher having a plurality of push elements that form a pattern corresponding to the pattern of the resilient elements in the cut sheet of resilient material;

(n) aligning the plurality of push elements with the plurality of resilient elements, and using the pusher to push the resilient elements out of the cut sheet of resilient material, whereby the plurality of resilient elements are pushed into the plurality of holes in at least one lattice of reinforcing material and others into the plurality of openings directly in the die, thereby forming a resilient material assembly comprising the plurality of resilient elements at least partially surrounded by at least one lattice of reinforcing material;

(o) removing the resilient material assembly from the die, and placing the resilient material assembly below a heat platen, if heat-activated adhesive material is applied to a side of the resilient material;

(p) placing a sheet of fabric or mesh material or any other suitable material onto one side of the resilient material assembly, wherein steps (o) and (p) may be reversed; and (q) heating the fabric or mesh sheet or any other suitable material with the heat platen to activate the adhesive on the plurality of resilient elements, whereby the fabric or mesh material or any other suitable material adheres to the plurality of resilient elements to form the composite material.

The adhesive material used need not be limited to heat-activated type. Other types of adhesives that may be used include, without limitation, heat-activated adhesive laminate, two-sided adhesives with removable backing, or the like.

Suitable material for adhering to the plurality of resilient elements may include without limitation, natural or synthetic fabric, mesh, flexible or pliable plastic, latex, silicone, or other rubber material, or made of synthetic fiber. As will be appreciated from the description of the preferred embodiments below, this general process may be used to form various composite materials, including but not limited to composite pads with no reinforcement, partial reinforcement, full reinforcement, and both partial and full reinforcement of the resilient elements by resilient material.

Process for Making Resilient Elements

Figure 14:
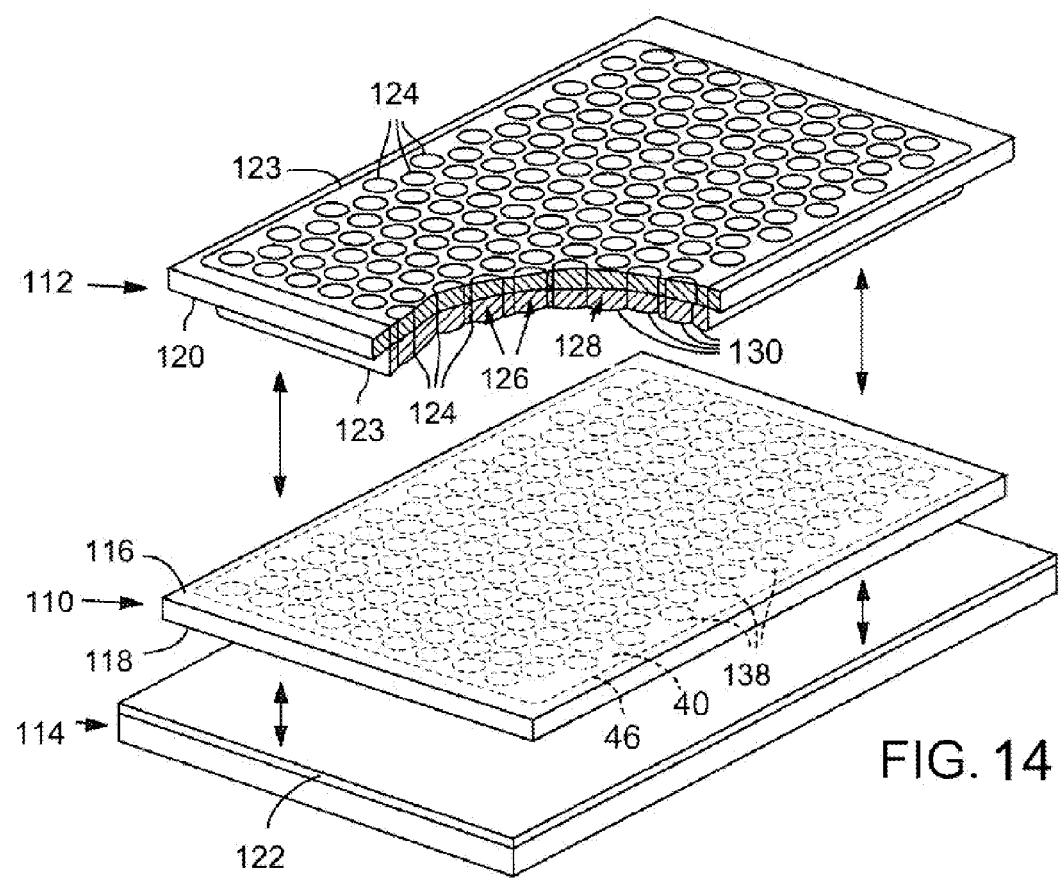
FIG. 14 is an exploded and perspective view of a sheet of resilient material positioned between a cutter and a work surface.
Figure 22:
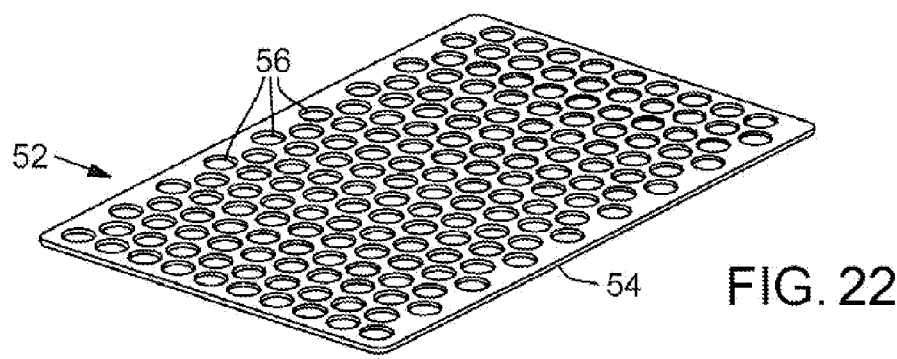
FIG. 22 is a perspective view of a lattice of reinforcing material.

Referring now to the drawings, FIGS. 14-22 generally show the process for cutting sheets of resilient and reinforcing materials to form cut sheets of resilient or reinforcing materials. FIG. 14 shows a sheet of resilient material 110 positioned between a cutter 112 and a work surface 114. The sheet of resilient material shown in FIG. 14 is depicted in solid lines as an uncut sheet, whereas the dashed lines show how the sheet of resilient material looks after it has been cut with the cutter in the manner described below. The sheet of resilient material may be made of such materials as foam, rubber, elastomer, plastic, and so forth (including any combination of such materials), and includes a first side 116 and a second side 118 opposing the first side. The material may be selected for various properties that make it an effective pad for protective gear. For example, the material may be selected based on its resilience to impact, heat insulation properties, breathability, weight, ease of use in manufacturing, or any other desirable properties.

As an initial step in the process, an adhesive may be applied to the first side 116, and/or the second side 118 of the sheet of resilient material 110 prior to cutting, although in a preferred embodiment, adhesive is applied to both sides. Any suitable means for applying adhesive may be used, including a spray-on adhesive, roll-on adhesive, lamination, or the like. Likewise, any suitable adhesive may be used, including a heat-activated adhesive or laminate, two-sided adhesives with removable backing, etc.

After adhesive has been applied to the resilient material, the resilient material may be cut in a desired and predetermined manner using a cutter, such as cutter 112. The cutter may include a cutting surface 120 for supporting various cutting edges or other structures. The cutting surface may be substantially planar for use in cutting resilient and reinforcing materials that are planar, or that are flexible and are configured in a planar shape beneath the cutter on a planar surface, such as a table or other work space. Alternatively or additionally, the cutting surface may be irregularly shaped for cutting resilient or reinforcing materials that are irregularly shaped, or that are flexible and are configured in an irregular shape beneath the cutter on an irregularly shaped surface. For example, as shown in FIG. 14, the cutter may be planar for use in cutting flexible resilient and reinforcing materials that are positioned on a planar work surface 114, where the work surface may additionally include a elastic overlay 122 that prevents or inhibits dulling of cutting edges during operation. For example, the overlay may be made of plastic, nylon, rubber or any other suitable material that prevents or inhibits dulling of cutting edges during operation.

As shown in FIGS. 14-20, the cutter 112 may include various cutting edges for cutting resilient and reinforcing materials. For example, as shown in FIG. 14, the cutter may include a perimetral cutting edge 123 extending from the cutting surface 120 and defining a boundary. This perimetral cutting edge may be sharpened at the end used for engaging and cutting materials, and may be shaped to cut materials into shapes having a desired border that corresponds to the shape of the boundary defined by the perimetral cutting surface.

As shown in FIGS. 14-20, the cutter 112 may also include a plurality of cutting elements 124 extending from the cutting surface to form a preselected pattern, each cutting element being sharpened at the end used for engaging and cutting materials. The cutting elements may be positioned within the boundary defined by the perimetral cutting edge 123, although any conceivable configuration of cutting elements may be provided. Each cutting element is shaped to define an internal space 126 corresponding to the desired shape of cut material. For example, cutting elements may be substantially cylindrical for cutting cylindrically shaped elements into materials, or may have irregular shapes for cutting irregularly shaped elements into materials. The cutting elements may be spaced from one another so as to define a space between the cutting elements. For example, in embodiments having both a perimetral cutting edge and a plurality of cutting elements positioned in a pattern within the boundary defined by the perimetral cutting edge, the perimetral cutting edge and the cutting elements may define a contiguous space 128 that surrounds the plurality of cutting elements and is within the boundary.

The internal spaces 126 and/or the contiguous space 128 may be filled with a biasing material 130 to facilitate removal of cut portions of the resilient and/or reinforcing material from the internal spaces and contiguous space. In some embodiments, both the internal spaces and the contiguous space may be filled with biasing material to facilitate removal of the cut portions from those spaces, and to facilitate keeping the various portions of cut material in an assemblage, as will be described in more detail below. In some embodiments, either the internal spaces or the contiguous space will be filled with biasing material to facilitate removal of the cut portions from those spaces but to retain the cut portions within the spaces that do not have any biasing material. The biasing material may be a resilient material, including, either alone or in combination, foam, rubber, elastomer, plastic, etc., and may be more or less resilient than the material to be cut. In some embodiments, the biasing material will be more resilient than the material being cut, to facilitate biasing of cut materials from the spaces containing the biasing material.

The biasing material used in the cutter may be made of any suitable resilient material that permits biasing of cut materials out of the internal spaces and contiguous space defined by the cutting elements and/or the perimetral cutting edge. The biasing material may be less resilient than the resilient material, the reinforcing material, or both. Selection of an appropriate biasing material requires little experimentation, and is within the capabilities of one of ordinary skill in the art.

It is understood that the biasing material used in the resilient material cutting process may include any material or mechanism, which serves to press the cut resilient element as the cut is made, so that the resilient element and the excess resilient material stay together on the cut sheet and are not separated. Examples of such biasing material may include without limitation rubber or a spring mechanism.

As shown in FIGS. 14 and 15, the sheet of resilient material 110 is positioned on the work surface 114, such as on the protective overlay 122, between the work surface and the cutter 112. As shown in FIGS. 14 and 16, the cutter is then pressed into the sheet of resilient material. This causes the cutting edges of the cutter (such as the perimetral cutting edge 123 shown in FIG. 14 and/or the plurality of cutting elements 124 shown in FIGS. 14 and 16) and the biasing material 130 (such as is in the internal spaces 126 and/or the contiguous space 128), to engage and compress the sheet of resilient material. During this compression process, the biasing material may also be compressed. As pressure is increased by the cutter on the sheet of resilient material, the cutting edges cut through the material, thereby forming a cut sheet of resilient material 136 comprising a plurality of resilient elements 138 and excess resilient material 40. Each resilient element has a first side 42 and a second side 44 with the adhesive applied thereto, and a shape corresponding to the shape of the internal space 126 of its corresponding cutting element. The plurality of resilient elements forms a pattern corresponding to the predetermined pattern of the plurality of cutting elements. The excess resilient material has a shape corresponding to the shape of the contiguous space 128. As such, for embodiments that include a cutter having a perimetral cutting edge 123 that defines the outer boundary of the contiguous space, the excess resilient material will include a border 46 cut by the perimetral cutting edge (See FIG. 14).

After the cutting edges of the cutter 112 have cut completely through the sheet of resilient material, the cutter is withdrawn from the cut sheet of resilient material 136, as shown in FIGS. 14 and 17. The cut sheet of resilient material 136, including the plurality of resilient elements 138 and the excess resilient material 40, decompresses during this process. The biasing material 130 also decompresses, thereby urging the plurality of resilient elements and the excess resilient material away from the internal spaces 126 within, and the contiguous space 128 surrounding, the plurality of cutting elements 124, to leave the cut sheet of resilient material with the cut portions of the resilient elements surrounded by the excess resilient material.

Process for Making Lattice of Reinforcing Material

A similar process is used to cut a sheet of reinforcing material as the resilient material, as shown in FIGS. 18-22. First, a sheet of reinforcing material 47 is selected based on its desired properties. The sheet of reinforcing material may be made of foam, neoprene, natural leather, synthetic leather, plastic, or rubber (including without limitation, latex and silicone, synthetic fabric, and so forth and any combination of such materials), may have a different thickness from the sheet of resilient material, and may include the same or different material from the resilient material, and may have the same or different functional properties from the resilient material. For example, the reinforcing material may be more or less resilient, rigid, flexible, stretchy, breathable, etc., than the resilient material.

As shown in FIG. 18, the sheet of reinforcing material 47 is positioned on the work surface 114, such as on the protective overlay 122, between the work surface and the cutter 112. As shown in FIG. 19, the cutter is then pressed into the sheet of reinforcing material, which causes the cutting edges of the cutter (such as the perimetral cutting edge 123 shown in FIG. 14 and/or the plurality of cutting elements 124 shown in FIGS. 14 and 18) and the biasing material 130 (such as are in the internal spaces 126 and/or the contiguous space 128), to engage and compress the sheet of reinforcing material. As discussed above, the biasing material may also be compressed during this compression process. As pressure is increased by the cutter on the sheet of reinforcing material, the cutting edges cut through the material, thereby forming a cut sheet of reinforcing material 48 comprising a plurality of reinforcing elements 50 and a first lattice of reinforcing material 52 having a shape which enables resilient elements to fit through the first lattice of reinforcing material. Each reinforcing element has a shape corresponding to the shape of the internal space 126 of its corresponding cutting element. The plurality of reinforcing elements forms a pattern corresponding to the predetermined pattern of the plurality of cutting elements. The first lattice of reinforcing material has a shape corresponding to the shape of the contiguous space 128. As such, for embodiments that include a perimetral cutting edge 123 that defines the outer boundary of the contiguous space, the first lattice of reinforcing material will include a border 54 cut by the perimetral cutting edge (See FIG. 22).

It is to be noted that in one embodiment, if a particular partial reinforcement lattice is desired to be combined with a section of resilient material, more than one perimetral cutting edge may be incorporated into the cutter to cut a sheet of reinforcement material, so that the design or the outer perimeter of the particular partial reinforcement lattice is defined by one of the perimetral cutting edges on the cutter, and additional inner perimeters of the same partial reinforcement lattice is defined by one or more of the remaining perimetral cutting edges. Depending on the need, after the holes are punched out in the sheet of reinforcement material, the resulting lattice of reinforcement material has been engaged to at least one of the resilient elements, and the fabric or mesh material or any other suitable material has been adhered to the plurality of resilient elements to form the composite material, the particular partial lattice that is desired to be combined with the resilient elements may be made by pulling or removing the undesired reinforcement material along the perimetral edges defining the boundary of the particular partial reinforcement lattice. Thus, the particular partial lattice of reinforcement material or "partial cage" may be cut and may be combined with the resilient material. Several of these particular partial reinforcement lattices may be incorporated into a resilient pad, resulting in unique properties of the pad. Each of these partial reinforcement lattice may have different properties such as height, strength, resilience and so forth. A combination of these lattices impart unique function to the composite pad.

After the cutting edges of the cutter 112 have cut completely through the sheet of reinforcing material, the cutter is withdrawn from the cut sheet of reinforcing material 48, as shown in FIG. 20. The cut sheet of reinforcing material 48, including the plurality of reinforcing elements 50 and the first lattice of reinforcing material 52, decompresses during this process. The biasing material 130 also decompresses, thereby urging the plurality of reinforcing elements and the first lattice of reinforcing material away from the internal spaces 126 within, and the contiguous space 128 surrounding, the plurality of cutting elements 124, to leave the cut sheet of reinforcing material with the cut portions of the reinforcing elements optionally surrounded by the first lattice of reinforcing material. It is understood that the cut sheet of reinforcing material 48 need not contain any reinforcing element as the reinforcing element is discarded and therefore, the cut sheet of reinforcing material does not intentionally preserve the reinforcing elements surrounded by the lattice of reinforcing material.

It should be appreciated that the fully and partially reinforced composite materials made by the present process only include lattices made of the reinforcing material, and do not utilize the reinforcing elements cut by the cutter. As such, the first lattice of reinforcing material 52 cut from the sheet of reinforcing material may be separated from the reinforcing elements 50 and from any other leftover reinforcing material, thereby leaving the first lattice of reinforcing material by itself, as shown in FIG. 21. The remaining first lattice of reinforcing material 52, shown in FIGS. 21-22, thus includes a plurality of holes 56 through the reinforcing material where the reinforcing elements used to be, and may also include a border 54, such as is cut by a perimetral cutting edge 123.

Assembling Resilient Pad Using a Die

After forming the cut sheet of resilient material 136 (including the plurality of resilient elements 138 and the excess resilient material 40), and the first lattice of reinforcing material 52, the first lattice of reinforcing material is assembled with the plurality of resilient elements to form a resilient material assembly using a die 58 and a pusher 60, according to the process shown in FIGS. 23-27.

Figure 23:
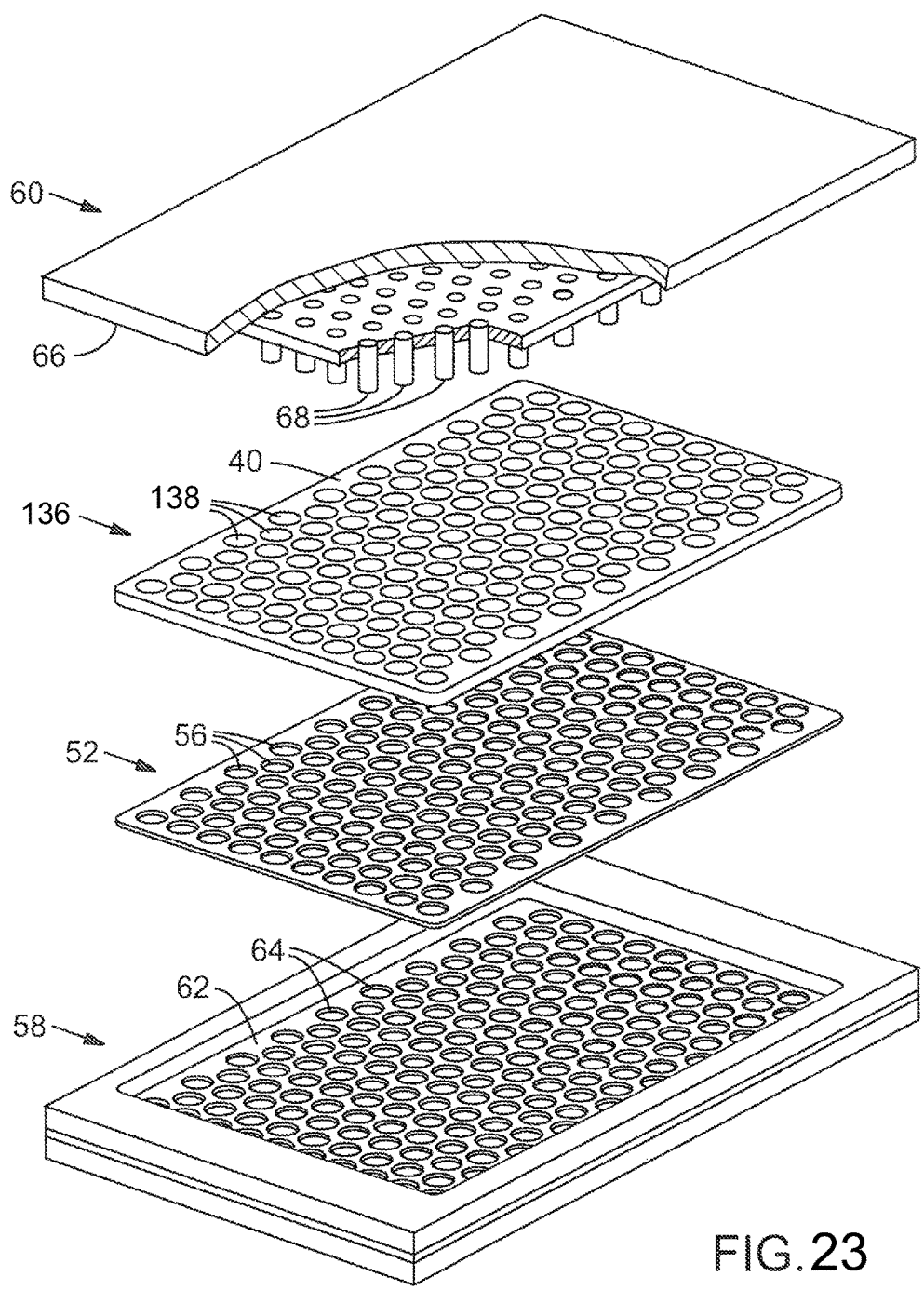
FIG. 23 is an exploded and perspective view of a cut sheet of resilient material and a lattice of reinforcing material positioned between a pusher and a die.

As shown in FIG. 23, the die 58 includes a surface 62 having a plurality of openings 64 defined therein, where the surface surrounding the openings has a shape corresponding to the shape of the excess resilient material 40 in the cut sheet of resilient material 136, and corresponding to the shape of the first lattice of reinforcing material 52, and the plurality of openings form a pattern corresponding to the pattern of the resilient elements 138 in the cut sheet of resilient material 136. The pusher includes a pushing surface 66 and a plurality of push elements 68 that extend from the push surface and form a pattern corresponding to the pattern of the resilient elements in the cut sheet of resilient material.

Figure 24:
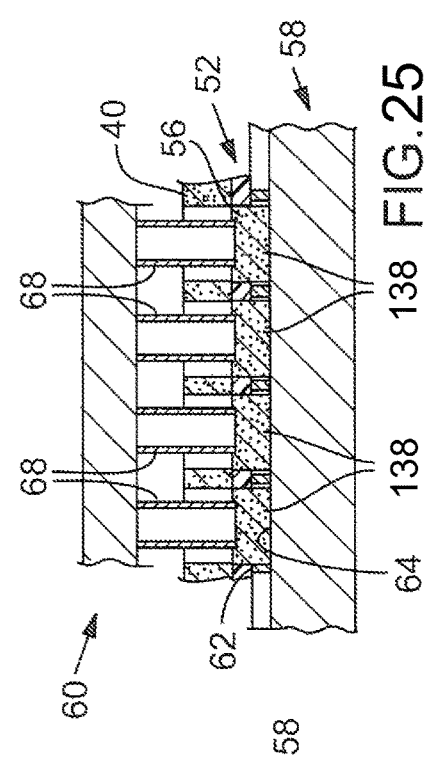
FIG. 24 is a sectional side view of a cut sheet of resilient material and a lattice of reinforcing material beneath a pusher on a die.

As shown in FIG. 24, the first lattice of reinforcing material 52 is placed on the die, and is aligned so that the plurality of holes 56 in the first lattice of reinforcing material are positioned above the plurality of openings 64 in the die 58. Next, the cut sheet of resilient material 136 is placed on top of the first lattice of reinforcing material, and is aligned so that the plurality of resilient elements 138 are positioned above the plurality of holes 56 in the first lattice of reinforcing material, and above the plurality of openings 64 in the die. Finally, the pusher 60 is positioned above the die, the lattice of reinforcing material, the cut sheet of resilient material, and the pusher is aligned so that the plurality of push elements are aligned with and oriented towards the plurality of resilient elements 138.

Figure 25:
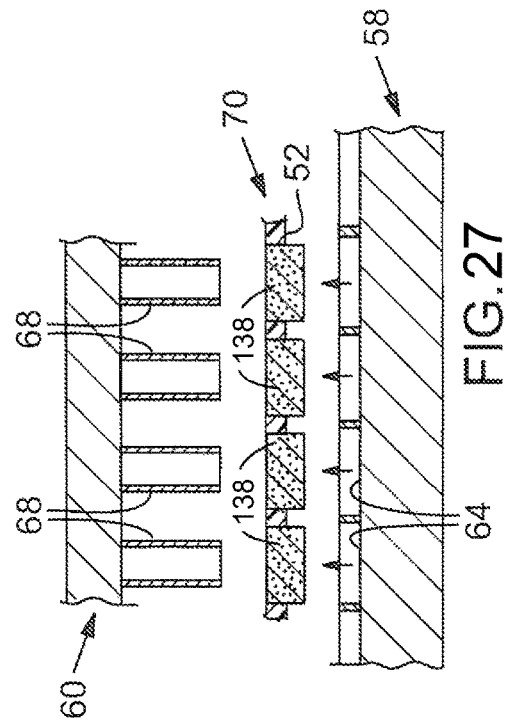
FIG. 25 is a sectional side view of a pusher pushing resilient elements from the cut sheet of resilient material and into the lattice of reinforcing material to form a resilient material assembly.

As shown in FIG. 25, the pusher 60 is then lowered until the plurality of push elements 68 engage with the plurality of resilient elements 138, whereby the resilient elements are pushed out of the excess resilient material 40 to a position where they are partially in the plurality of holes 56 in the first lattice of reinforcing material 52 and partially in the plurality of openings 64 in the die 58. As such, the cut portions of the plurality of resilient elements are at least partially surrounded by the first lattice of reinforcing material.

Figure 26:
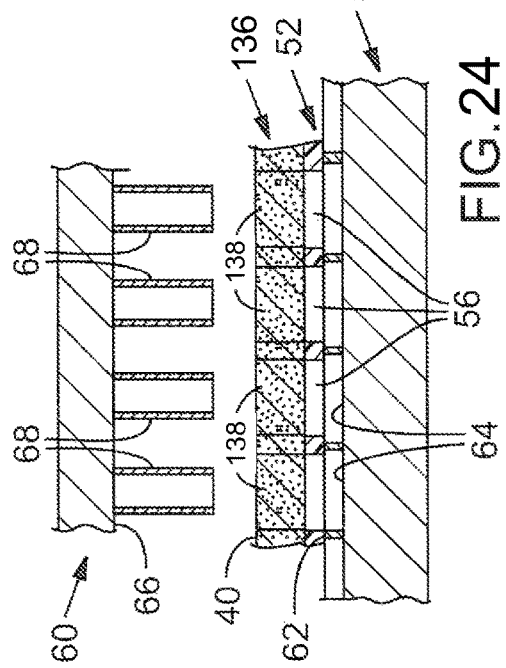
FIG. 26 is a sectional side view of a resilient material assembly on a die.
Figure 27:
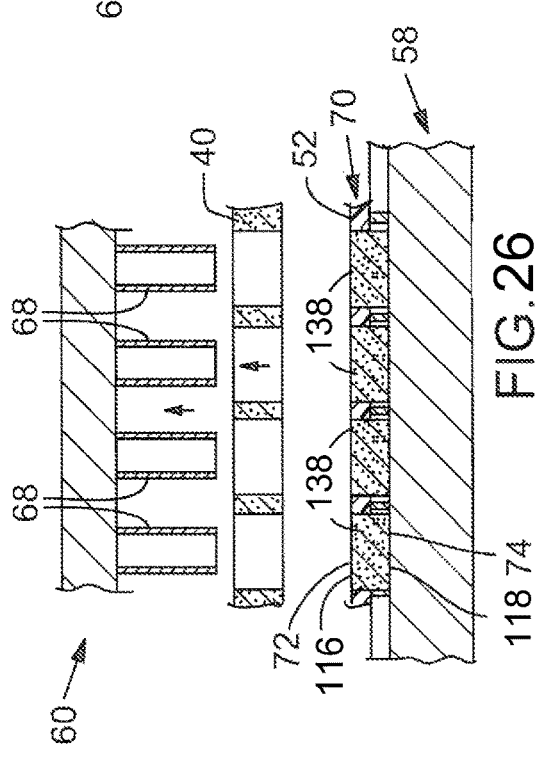
FIG. 27 is a sectional side view of a resilient material assembly being removed from a die.

As shown in FIG. 26, the excess resilient material 40 is removed from the die and discarded. The remaining plurality of resilient elements 138 and the first lattice of reinforcing material 52 have now been assembled to form a resilient material assembly 70, where the first sides 116 of the plurality of resilient elements define a first side 72 of the resilient material assembly, and the second sides 118 of the plurality of resilient elements define a second side 74 of the resilient material assembly opposite the first side of the resilient material assembly. As shown in FIG. 27, the resilient material assembly 70 is then removed from the die 58 so that it can be used as a substrate for forming various composite materials.

FIGS. 28-44 show various additional processes for forming composite materials starting from the resilient material assembly 70, which as discussed above, includes the plurality of resilient elements 138 and the first lattice of reinforcing material 52. The steps shown in FIGS. 28-44 show the process for forming composite materials from resilient material assembly 70 where the resilient elements 138 have a heat-activated adhesive bonded to their surfaces. It is understood that similar method steps could be used to assemble substantially similar composite materials from a resilient material assembly 70 where the resilient elements 138 have a different type of adhesive bonded to their opposing surfaces, but such method steps would not require the application of heat to bond the various elements of the composite materials together.

As shown in FIG. 28, the resilient material assembly is placed on a surface beneath a heat platen 76. A first sheet of fabric or mesh material 78 is placed onto the first side 72 of the resilient material assembly so that the first fabric or mesh sheet contacts the first sides 116 of the plurality of resilient elements. As shown in FIG. 29, the heat platen is lowered until it contacts the first fabric or mesh sheet, and is then heated, thereby heating the first fabric or mesh material and the first side of the resilient material assembly. This activates the adhesive on the first sides of the plurality of resilient elements, whereby the first fabric or mesh material is adhered to the first side of the resilient material assembly to form a first composite material 80. As shown in FIG. 30, the first composite material is then removed from the heat platen for further processing. Alternatively or additionally, the first composite material shown in FIG. 30 can be used as a protective pad without further processing.

It should be understood that the first lattice of reinforcing material 52 in the first composite material 80 is not adhered or otherwise permanently secured to the plurality of resilient elements 138. As such, the first lattice of reinforcing material can be easily removed from the plurality of resilient elements, as shown in FIG. 31, to form a second composite material 82 having the first fabric or mesh sheet 78 adhered to the first sides of the plurality of resilient elements, but lacking a reinforcement lattice altogether. After the first lattice of reinforcing material has been removed from the plurality of resilient elements to form the second composite material, the first fabric or mesh sheet substantially retains the plurality of resilient elements in a predetermined pattern. Alternatively, if a sheet of reinforcing material is cut with a cutter with multiple perimetral cutting edges, the excess material outside the desired defined area may be removed from the sheet of reinforcing material, leaving a "partial cage", resulting in the fourth composite material.

The second composite material 82 can be used as a substrate to make yet other composite materials. For example, as shown in FIGS. 32-34, the second composite material 82 can be used to make a third composite material 84 comprising the plurality of resilient elements 138 sandwiched on opposite sides by the first fabric or mesh sheet 78 and a second fabric or mesh sheet 86, but lacking a reinforcement lattice altogether. To make this third composite material, the second composite material 82 is placed beneath the heat platen 76 with the first sides 116 of the resilient elements and the first fabric or mesh sheet 78 facing away from the heat platen, and the second sides 118 of the resilient elements facing the heat platen. A second fabric or mesh sheet 86 is then placed onto the second side of the resilient elements, and is heated with the heat platen to activate the adhesive on the second sides of the plurality of resilient elements, whereby the second fabric or mesh sheet adheres to the second sides of the plurality of resilient elements to form the third composite material 84. Because the first lattice of reinforcing material was removed from the plurality of resilient elements prior to adhering the second fabric or mesh sheet to the resilient elements, this third composite material lacks a reinforcement lattice altogether. The third composite material may be used as a protective pad.

As shown in FIGS. 35-38, the second composite material 82 can also be used to make a fourth composite material 88 comprising the plurality of resilient elements 138 sandwiched between a pair of fabric or mesh sheets 78 and 86, and one or more lattices of reinforcing material 90 that each surround only a subset of the plurality of resilient elements. In such cases, the first lattice of reinforcing material 52 that was removed from the first composite material 80 (see FIGS. 30-31) can be cut to a smaller desired shape to form a second lattice of reinforcing material 90 that will only surround a subset of the plurality of resilient elements. Alternatively or additionally, one or more lattices of reinforcing material 90 smaller than the first lattice of reinforcing material 52 can be made from scratch according to the general steps for cutting a lattice of reinforcing material described above. As shown in FIGS. 35-36, one or more of these smaller lattices of reinforcing material 90 can be pressed onto a desired subset of the plurality of resilient elements 138 so that only portions of the plurality of resilient elements are reinforced by a lattice or lattices of reinforcing material. As shown in FIGS. 36-38, after pressing the smaller lattice of reinforcing material onto the desired subset of resilient elements, a heat platen 76 can be used to adhere a second fabric or mesh sheet 86 to the second sides 118 of the resilient elements to form the fourth composite material 88.

The first composite material 80 shown in FIG. 30 also can be used as a substrate to make other composite materials. For example, as shown in FIGS. 39-41, the first composite material 80 can be used to make a fifth composite material 92 comprising the plurality of resilient elements 138 sandwiched on opposite sides by fabric or mesh sheets 78 and 86, and surrounded by the first lattice of reinforcing material 52. To make this fifth composite material, the first composite material is placed beneath the heat platen with the first sides 116 of the resilient elements and the first fabric or mesh sheet 78 facing away from the heat platen 76, and the second sides 118 of the resilient elements facing the heat platen. A second fabric or mesh sheet 86 is then placed onto the second side 118 of the resilient elements, and is heated with the heat platen to activate the adhesive on the second sides of the plurality of resilient elements, whereby the second fabric or mesh material adheres to the second sides of the plurality of resilient elements to form the fifth composite material 92. Because the first lattice of reinforcing material 52 was never removed from the plurality of resilient elements 138 prior to adhering the second fabric or mesh sheet to the resilient elements, this fifth composite material includes a reinforcement lattice that fully surrounds the plurality of resilient elements.

As shown in FIGS. 42-44, the first composite material 80 also can be used to make a sixth composite material 94 comprising the plurality of resilient elements 138 sandwiched on opposite sides by fabric or mesh sheets 78, 86, where all of the resilient elements are surrounded by the first lattice of reinforcing material 52, and one or more subsets of the resilient elements are surrounded by one or more second smaller lattices of reinforcing material 90. To make this sixth composite material, one or more lattices of reinforcing material 90 that are smaller than the first excess resilient material 52 can be made from scratch according to the general steps discussed above or a piece taken from an existing lattice, which may be pre-designed to be broken off. The smaller lattice(s) of reinforcing material then can be pressed onto any desired subset(s) of resilient elements 138 so that each smaller lattice only surrounds that subset. After pressing the smaller lattice(s) of reinforcing material onto the desired subset(s) of resilient elements, a heat platen 76 can be used to adhere a second fabric or mesh sheet 86 to the sides of the resilient elements opposite to the side adhered to the first fabric or mesh sheet 78 in the manner discussed above. This forms the sixth composite material 94, which can be used as a protective pad.

In another embodiment, a layer of mesh or fabric or any other suitable material may be placed in the die so that when the resilient elements are pushed through with a pusher 60, the resilient elements contact and bind directly to the mesh or fabric or any other suitable material.

A Second Process for Making the Resilient Composite Pad

An alternative process for making various composite pads with no reinforcement, partial reinforcement, full reinforcement, and both partial and full reinforcement generally comprises:

(a) providing a sheet of resilient material having opposing sides;

(b) applying an adhesive to either or both sides of the sheet of resilient material;

(c) providing a first cutter having a surface and a plurality of cutting elements extending from the surface in a predetermined pattern, where each cutting element has a shape defining an internal space, wherein the plurality of cutting elements are spaced apart from one another to define a contiguous space surrounding and between the plurality of cutting elements, and the internal spaces and the contiguous space are filled with biasing material;

(d) pressing the first cutter into the sheet of resilient material, thereby forming a cut sheet of resilient material comprising a plurality of resilient elements and excess resilient material, wherein each resilient element has a shape corresponding to the shape of the internal space of its corresponding cutting element, the plurality of resilient elements form a pattern corresponding to the predetermined pattern of the plurality of cutting elements, and the excess resilient material has a shape corresponding to the shape of the contiguous space;

(e) withdrawing the first cutter from the cut sheet of resilient material, whereby the biasing material urges the plurality of resilient elements and the excess resilient material away from the internal spaces within and the contiguous space surrounding the plurality of cutting elements, thereby leaving the cut sheet of resilient material with the cut portions of the resilient elements surrounded by the excess resilient material;

(f) providing a sheet of reinforcing material, which may be optionally processed using the following methods however, the methods of processing a reinforcement lattice is not limited to carrying out the following steps, so long as at least one reinforcement lattice is obtained so as to be combinable with the resilient elements to form the inventive composite pad;

(g) pressing a second cutter into the sheet of reinforcing material, thereby forming a cut sheet of reinforcing material comprising a plurality of reinforcing elements and a lattice of reinforcing material, wherein each reinforcing element has a size and shape corresponding to the predetermined size and shape of the cutting elements, the plurality of reinforcing elements form a pattern corresponding to the predetermined pattern of the plurality of cutting elements, and the lattice of reinforcing material has a shape corresponding to the shape of the contiguous space;

(h) withdrawing the second cutter from the cut sheet of reinforcing material, whereby if the biasing material is optionally used, the biasing material urges the plurality of reinforcing elements and the lattice of reinforcing material away from the internal spaces within and the contiguous space surrounding the plurality of cutting elements, and thereby leaves the cut sheet of reinforcing material with the cut portions of the reinforcing elements optionally surrounded by the lattice of reinforcing material;

(i) separating the lattice of reinforcing material from the reinforcing elements, whereby the lattice of reinforcing material is left with a plurality of holes through the reinforcing material where the reinforcing elements used to be;

(j) removing adhesive layer from the excess resilient material on the first side of the cut sheet of resilient material, leaving adhesive on the resilient elements;

(k) bonding a first substrate such as a fabric or mesh to the first side of the cut sheet of resilient material resulting in bonding between the resilient elements to the first substrate optionally by contacting the resilient material with a heat platen, if heat-activated adhesive material was applied to the first side of the resilient material;

(l) separating the excess resilient material from the cut sheet of resilient material, leaving the plurality of resilient elements bound to the first substrate;

(m) engaging the holes of the lattice of reinforcing material to the plurality of resilient elements to form the composite material;

(n) placing a second substrate such as a sheet of fabric or mesh material or any other suitable material onto the second side of the resilient material so that the plurality of resilient elements on the second side of the resilient material bond to the second substrate; and (o) heating the second fabric or mesh sheet substrate or any other suitable material with a heat platen to activate the adhesive on the plurality of resilient elements on the second side of the resilient material, whereby the second fabric or mesh material or any other suitable material adheres to the plurality of resilient elements to form a composite material, if heat-activated adhesive material was applied to the second side of the resilient material.

It is to be understood that the adhesive material used need not be limited to heat-activatable type. Other types of adhesives that may be used including without limitation, heat-activated adhesive laminate, two-sided adhesives with removable backing, or the like.

Suitable material for the substrate to which the plurality of resilient elements are adhered may include without limitation, natural or synthetic fabric, mesh, flexible or pliable plastic, latex, silicone, or other rubber material, or made of synthetic fiber.

As will be appreciated from the description of the preferred embodiments below, this general process may be used to form various composite materials, including but not limited to composite pads with no reinforcement, partial reinforcement, full reinforcement, and both partial and full reinforcement of the resilient elements by reinforcing material.

It should also be understood that the adhesive layer may be applied to one or both sides of the cut sheet of resilient material. The reinforcing material, including the lattice portion, may also be optionally coated with an adhesive layer on either one or both sides if a permanent bonding between the lattice of reinforcing material and the first substrate is desired.

It is also contemplated that in the scheme of things, the resilient material may be composed of different types of material or color, which may be secured to a single continuous lattice of reinforcing material. Conversely, several lattices of reinforcing material may be used to secure a resilient material of a single continuous material. Also, several types of resilient material may be linked together and assembled with several different types of lattices of reinforcing material.

The cutting of the resilient material is described above. However, for purposes of usage in the second process for making the resilient composite pad the resilient elements are not to be "pushed out" in a die.

The lattice of reinforcing material may be made as described above for use in the second process for making the resilient composite pad. Alternatively, the lattice of reinforcing material may be made by simply cutting a resilient material with a cutter.

Assembling Pad Composite Without the Need for Use of a Die

After forming the cut sheet of resilient material 136 (including the plurality of resilient elements 138 and the excess resilient material 40), and the first lattice of reinforcing material 52, the plurality of resilient elements 138 are bonded to the first fabric or mesh sheet "substrate" 78. The excess resilient material is removed. Then, the first lattice of reinforcing material is assembled with the plurality of resilient elements to form a resilient material assembly by fitting the first lattice of reinforcing material 52 on to the group of resilient elements, according to the process shown in FIGS. 46-49 and 62-68. As shown in FIG. 14, the cut resilient material includes a first side 116 and second side 118. At least one of the surfaces is coated with an adhesive.

Figure 45:
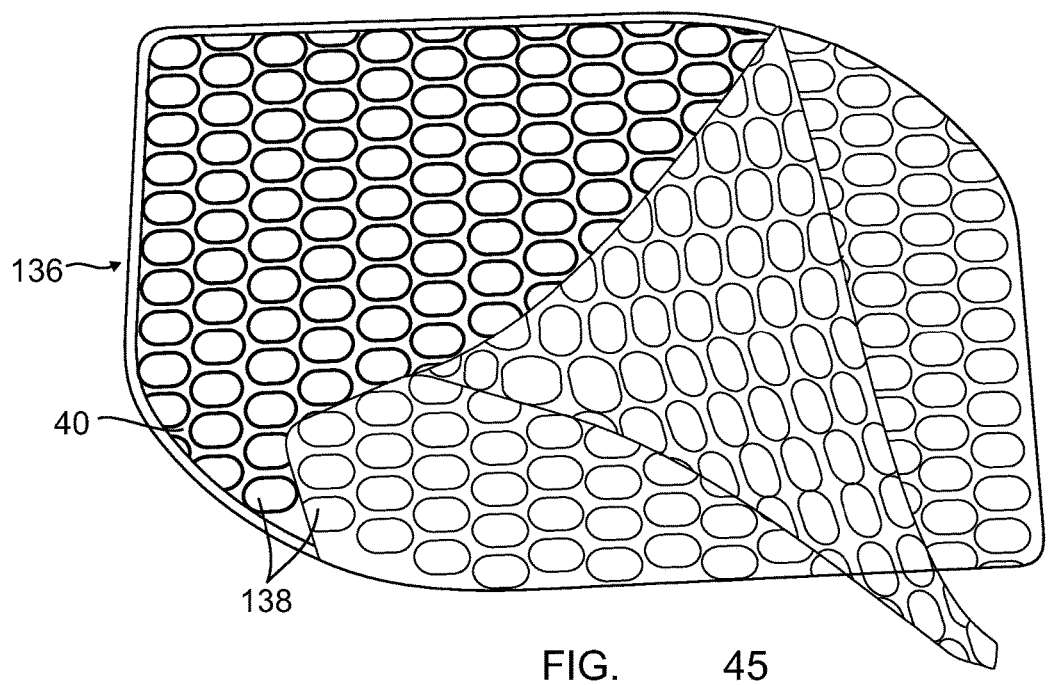
FIG. 45 depicts the "peeling off" or removal of the adhesive layer from the excess resilient material portion of the resilient material.
Figure 60:
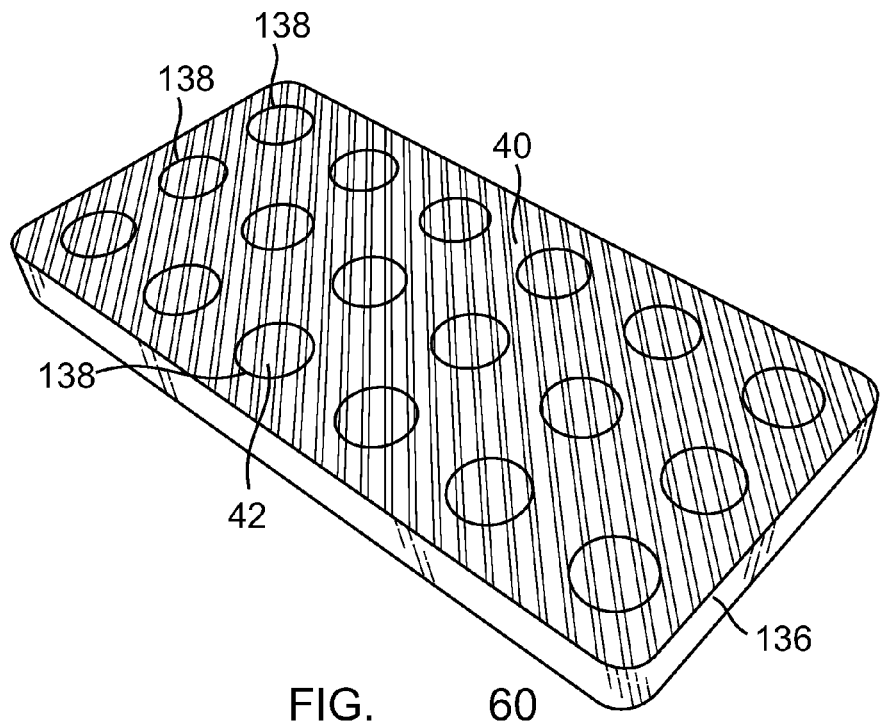
FIG. 60 is a perspective view of a sheet of cut resilient material coated with an adhesive on its first side.
Figure 61:
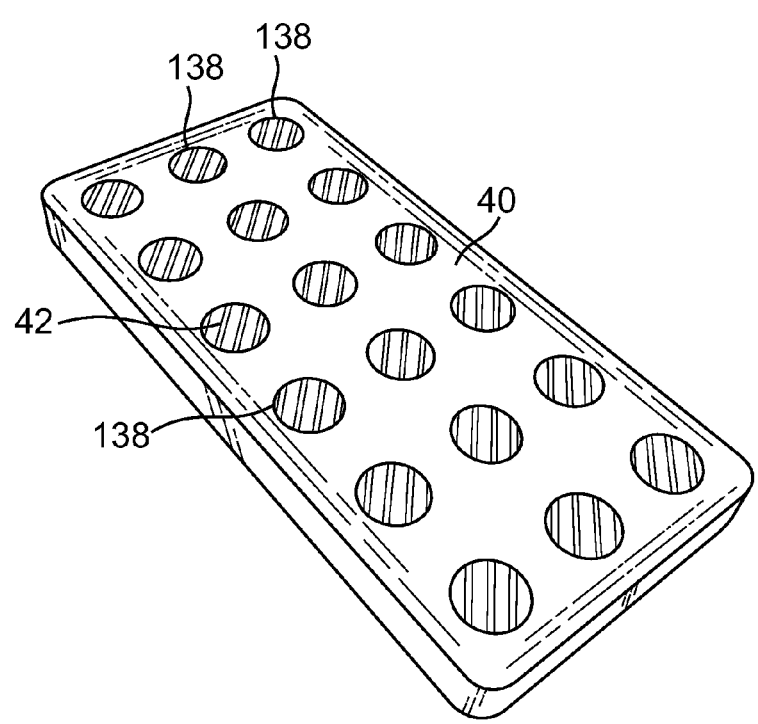
FIG. 61 is perspective view of a sheet of cut resilient material coated with an adhesive on its first side only on the resilient elements.

In one embodiment of the invention, the adhesive on the excess resilient material is removed. The removal may be carried out in a variety of ways. In one aspect, the adhesive layer coating the excess resilient material may be "pulled off" of the resilient material leaving behind the adhesive layer bound only on the resilient element. This procedure results in the resilient elements 138 being coated with adhesive and the excess resilient material 40 not being coated with adhesive on the first side 116 of the cut resilient material. This is illustrated in FIGS. 45 and 60-61. In a specific embodiment of the invention, the resilient material is pre-coated with a heat activated adhesive such as hot melt adhesive or film appropriate for EVA (ethylene vinyl acetate) or similar type of plastic, foam or rubber.

To elaborate further on the desirability of ultimately bonding only the resilient element portion of the cut sheet of resilient material to the first substrate, FIGS. 45 and 60-61 show an exemplified method as illustrated, of coating the entire resilient material with adhesive before cutting the resilient material, and then physically pulling off or chemically dissolving the adhesive material bound only to the excess resilient material portion, leaving behind adhesive material on the resilient elements, which is bonded to the first substrate.

Other methods to selectively coat the resilient elements may include without limitation, using masks to activate or directly apply the adhesive only on the resilient elements. For instance, adhesive may be applied only to the resilient elements 138 by the use of a mask that covers the excess resilient material 40 so as to apply the adhesive material selectively, rather than to the entire surface of the resilient material. This would save on the cost of adhesives. The adhesive may be applied to a cut sheet of resilient material, or alternatively, to a pre-cut but pre-marked sheet of resilient material.

Alternatively, chemically treated masks may also be used to deactivate or remove or "etch out" the adhesive on the excess resilient material. Or, the excess resilient material portion coated with adhesive may be "covered" prior to contacting the first substrate to the resilient elements in order to prevent adhesion of the excess resilient material to the substrate. For example, a sheet of wax paper with holes cut out to accommodate the resilient elements may be aligned. Such "blocking" paper may sit between the resilient material and the substrate during lamination, and prevent the excess resilient material from adhering to the substrate.

A first substrate 78 such as a fabric or mesh is contacted with the first side 116 of the cut resilient material in particular the adhesive coated resilient elements 138, and the bonding between the resilient elements 138 and the substrate 78 is allowed to occur. Once the bonding has occurred, the excess resilient material 40 is removed from the resilient material, leaving the resilient elements 138 of the first side 116 bonded to the first substrate 78, and the second side 44 of the resilient elements optionally coated with an adhesive. This composite assembly is referred to herein as the second composite material 202 (FIGS. 45-48 and 62-63).

Figure 67:
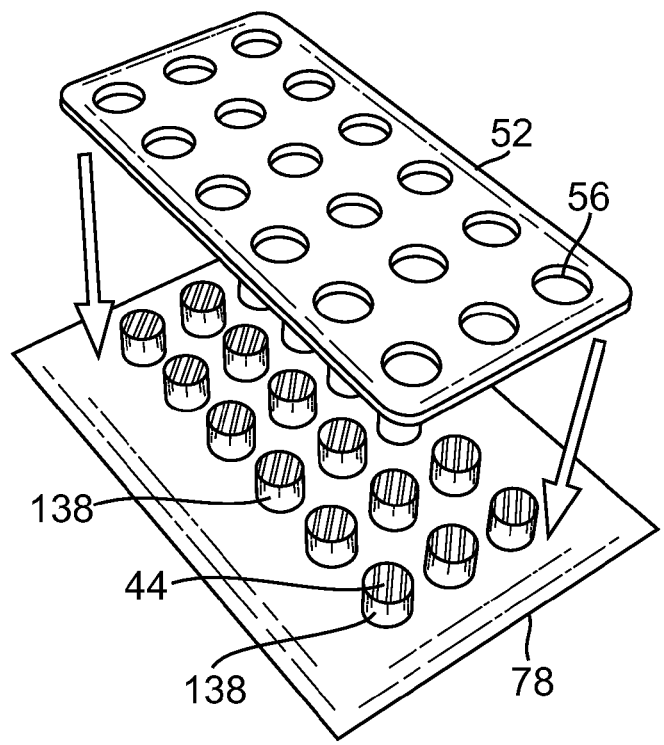
FIG. 67 is a perspective view of the second composite material and a full lattice of reinforcing material being fitted together
Figure 68:
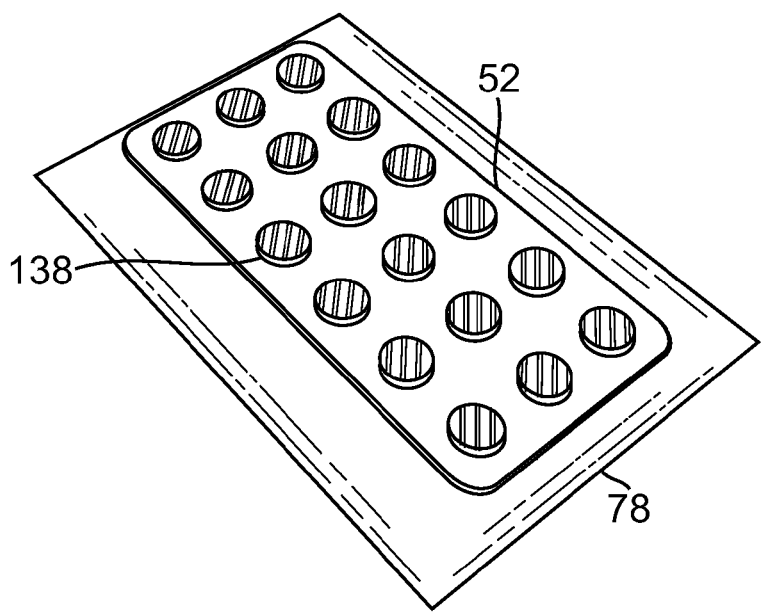
FIG. 68 is a perspective view of a full lattice of reinforcing material fit on to the second composite material.
Figure 69:
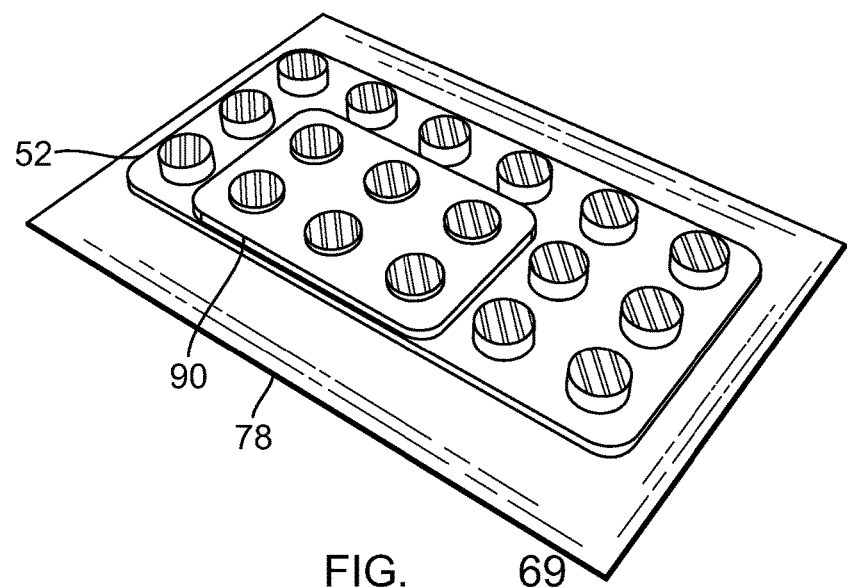
FIG. 69 is a perspective view of full and partial lattices of reinforcing material fit on to the second composite material.
Figure 70:
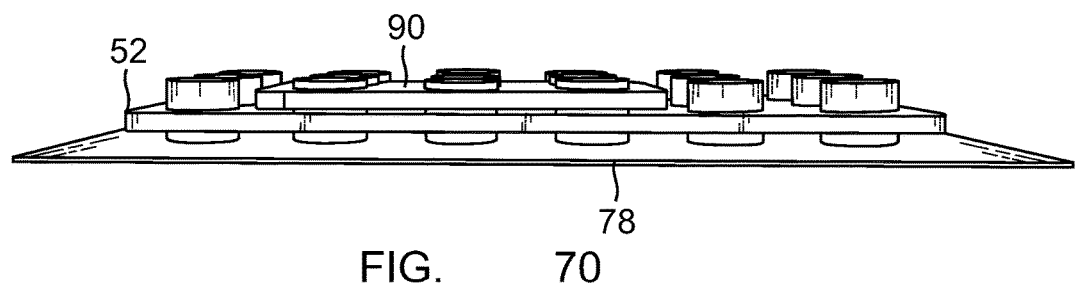
FIG. 70 is a side/perspective view of a full and partial lattice of reinforcing material fit on to the second composite material.

In one aspect of the invention, the plurality of resilient elements 138 bonded to the first substrate 78 is aligned with the first lattice of reinforcing material 52 so that the plurality of resilient elements 138 are positioned in alignment with the plurality of holes 56 in the first lattice of reinforcing material 52 (FIGS. 49 and 67-68). In another aspect, the plurality of resilient elements 138 are forced to a position where they are at least partially in the plurality of holes 56 in the first lattice of reinforcing material 52. As such, the plurality of resilient elements are at least partially surrounded by the first lattice of reinforcing material.

Alternatively and additionally, the plurality of resilient elements 138 bonded to the first substrate 78 may be aligned with a second lattice of reinforcing material 90 so that the second lattice of reinforcing material surrounds only a subset of the plurality of resilient elements (FIGS. 53 and 64-70).

Figure 71:
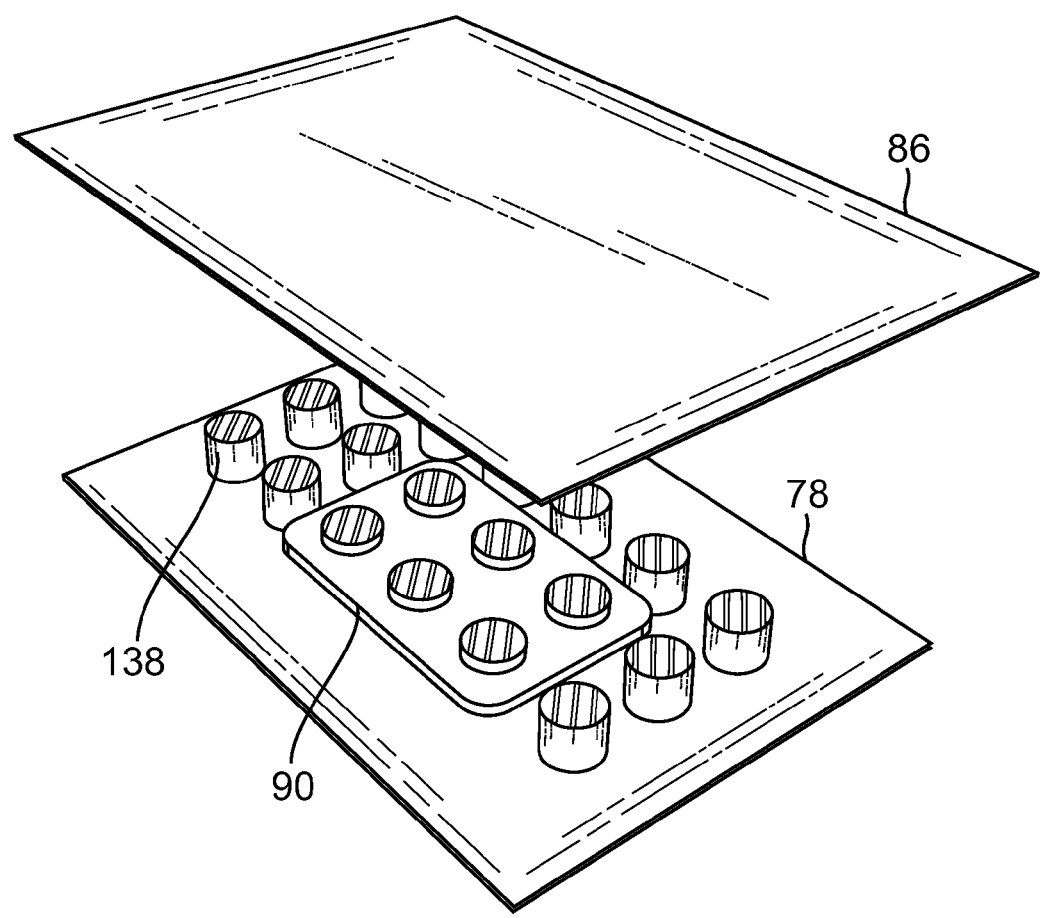
FIG. 71 is a perspective view of the formation of fourth composite by adhering a cloth or mesh material to the second side of the resilient elements, in which the resilient elements and the lattice of reinforcing material are sandwiched between the cloth or mesh material layers.

The plurality of resilient elements 138 and the first lattice of reinforcing material 52 have now been assembled to form a resilient material assembly, where a first side 42 of the plurality of the resilient elements, coated with adhesive is bonded to the first substrate and the second side 44 of the plurality of resilient elements defines a second side of the resilient material opposite the first side of the resilient material assembly (FIG. 68). The plurality of resilient elements on the second side 44 may be bonded to a second substrate opposite the first side of the resilient material assembly (FIGS. 56, 59 and 71).

Assembly of Composite Using the Second Process for Making the Resilient Composite Pad Material in Greater Detail FIGS. 46-59 show processes for forming composite materials in greater detail. The steps shown in FIGS. 46-59 show the process for forming composite materials where the resilient elements 138 have a heat-activated adhesive bonded to their surfaces. It is understood that similar adhesive may be used to assemble similar composite materials where the resilient elements 138 are coated with a type of adhesive that would not require the application of heat to bond the various elements to a substrate.

As shown in FIG. 46, the cut sheet of resilient material 136, in which only the resilient elements 138 are coated with adhesive on the first side 116 of the resilient material are placed on a surface next to a heat platen 76. A first substrate or sheet of fabric or mesh material 78 is placed onto the first side 116 of the resilient material so that the first substrate of fabric or mesh sheet contacts the first side 42 of the plurality of resilient elements coated with adhesive. It is noted that the excess resilient material 40 is not coated with adhesive as described above or may be coated but may be covered with a material that prevents the excess material portion from contacting or bonding to the substrate 78. As shown in FIG. 47, a heat platen is moved towards the first substrate of fabric or mesh sheet 78, until it contacts the first substrate of fabric or mesh sheet, and is then heated, or alternatively and optionally the heat platen is pre-heated before it contacts the substrate of fabric or mesh sheet, thereby heating the first substrate of fabric or mesh material and the first side of the resilient material 116. This activates the adhesive on the first side 42 of the plurality of resilient elements, whereby the first substrate of fabric or mesh material is adhered to the first side 116 of the resilient material to form a resilient material/substrate composite material 300 (FIG. 47).

Figure 62:
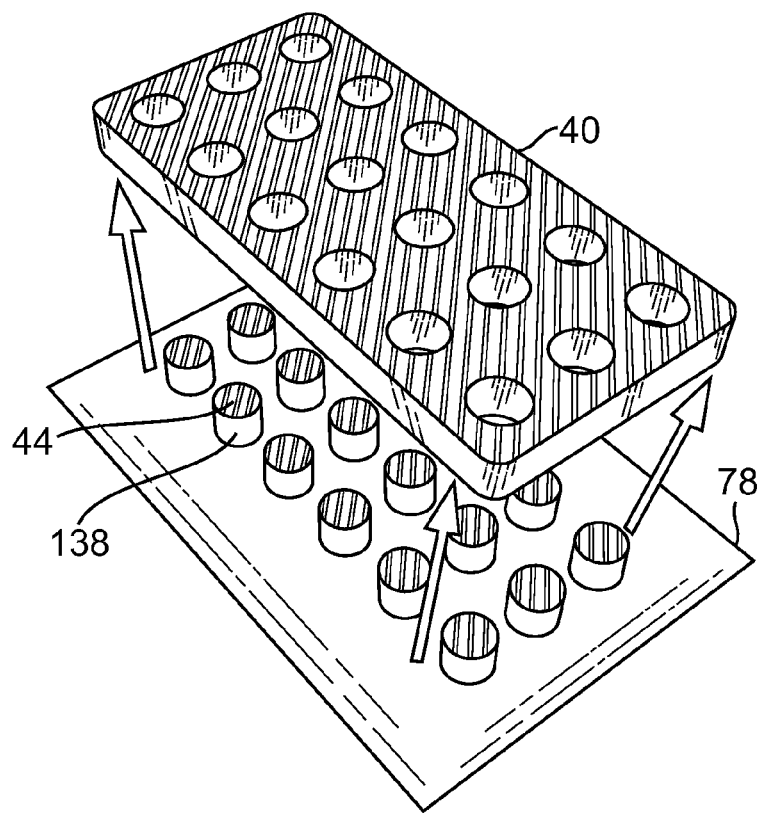
FIG. 62 is a perspective view of the formation of the second composite material in which the first side of the resilient elements is adhered to the cloth or mesh material and the excess resilient material is removed.
Figure 63:
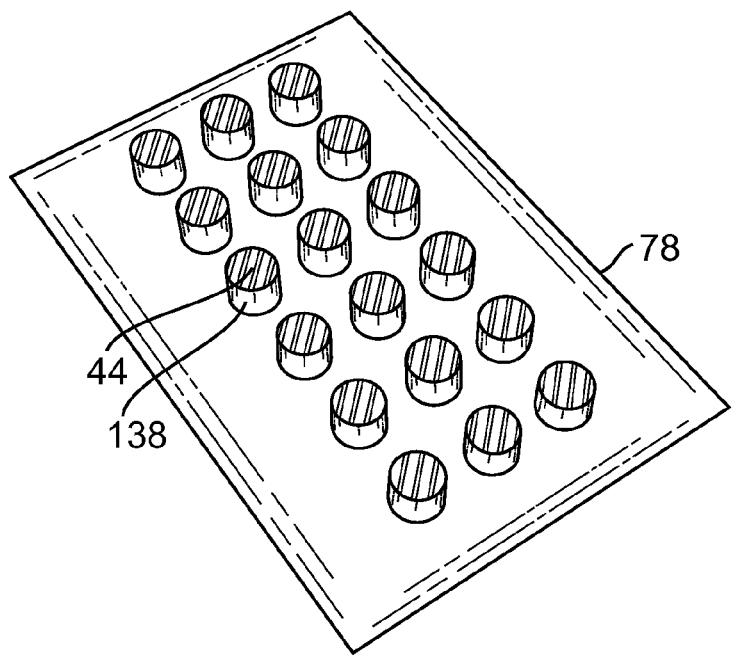
FIG. 63 is a perspective view of the second composite material.
Figure 64:
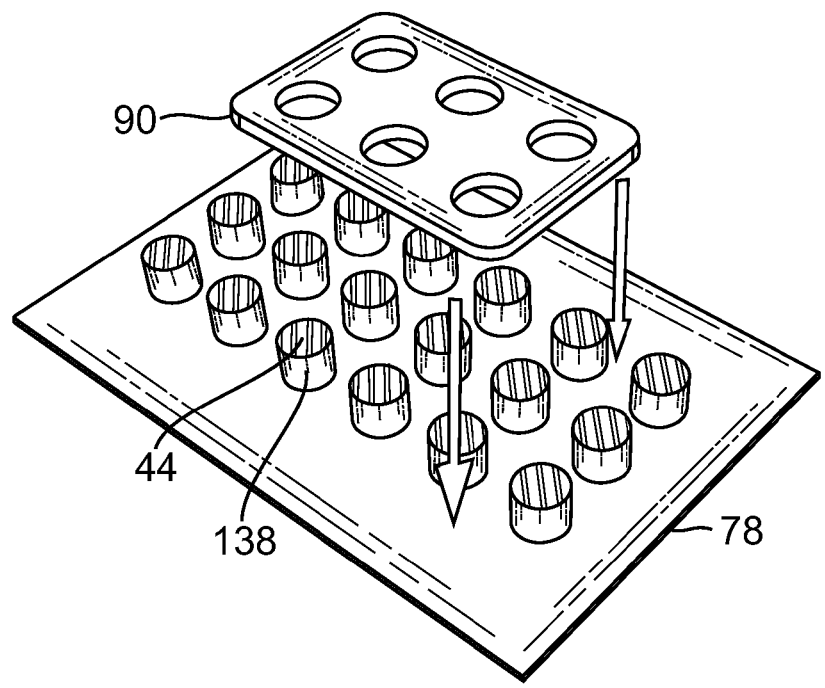
FIG. 64 is a perspective view of the second composite material and a partial lattice of reinforcing material being fitted together.
Figure 65:
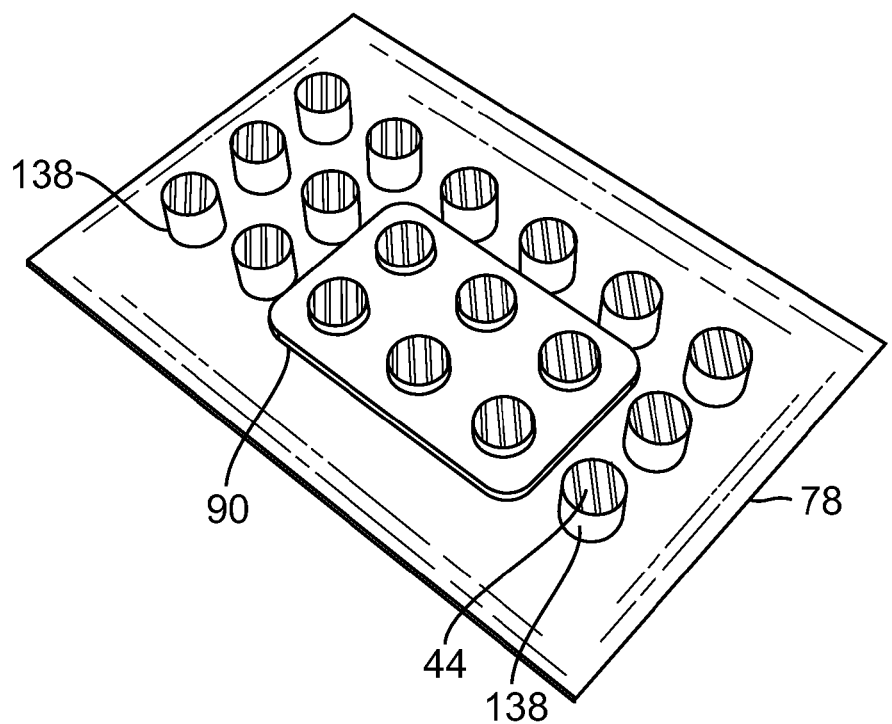
FIG. 65 is a perspective view of a partial lattice of reinforcing material fit on to the second composite material.
Figure 66:
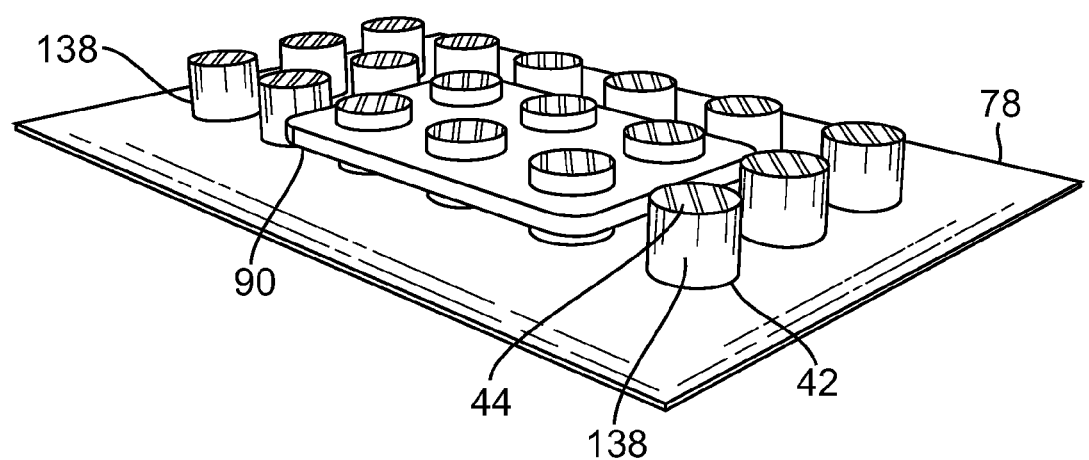
FIG. 66 is a side/perspective view of a partial lattice of reinforcing material fit on to the second composite material.

As shown in FIG. 48, the resilient material/substrate composite material 300 is then removed from the heat platen for further processing. As shown in FIGS. 48 and 62, the excess resilient material 40 is removed from the resilient material/substrate composite material 300 resulting in a second composite material 202, which includes a substrate bonded to resilient elements. Alternatively or additionally, the second composite material 202 shown in FIGS. 48 and 63 can be used as a protective pad without further processing.

Alternatively or additionally, the holes of a first reinforcement lattice are aligned to the plurality of resilient elements 138 and are secured or engaged to result in the first composite material 201 (FIGS. 49 and 67-68).

Alternatively or additionally, after the holes of a first reinforcement lattice are aligned to the plurality of resilient elements 138 and are inserted or engaged, the reinforcement lattice may be optionally glued to the first substrate, resulting in a type of composite material that can be used as a protective pad without further processing.

However, it should be understood that the first lattice of reinforcing material 52 in the first composite material 201 is preferably not adhered or otherwise permanently secured to the plurality of resilient elements 138. As such, the first lattice of reinforcing material may be loosely inserted, secured, engaged or fitted to the plurality of resilient elements.

The second composite material 202 can be used to make yet other composite materials. For example, as shown in FIGS. 50-52, the second composite material 202 can be used to make a third composite material 203 comprising the plurality of resilient elements 138 sandwiched on opposite sides by the first fabric or mesh sheet substrate 78 and a second fabric or mesh sheet substrate 86, but lacking a lattice of reinforcing material. To make this third composite material, the second composite material 202 is placed next to the heat platen 76 with the first sides 42 of the resilient elements and the first fabric or mesh sheet 78 facing away from the heat platen, and the second sides 44 of the resilient elements facing the heat platen. A second fabric or mesh sheet substrate 86 is then placed onto the second side of the resilient elements, and is heated with the heat platen to activate the adhesive on the second sides of the plurality of resilient elements, whereby the second fabric or mesh sheet adheres to the second sides of the plurality of resilient elements to form the third composite material 203, which lacks excess resilient material or reinforcing material. This third composite material type also may be used as a protective pad without further processing.

As shown in FIGS. 53-56 and 64-66, the second composite material 202 can also be used to make a fourth composite material 204 comprising the plurality of resilient elements 138 sandwiched between a pair of fabric or mesh sheet substrates 78 and 86, and one or more lattices of reinforcing material 90 that surround only a subset of the plurality of resilient elements. In such cases, the first lattice of reinforcing material can be cut to a smaller desired shape to form a second lattice of reinforcing material 90 that will only surround a subset of the plurality of resilient elements. Alternatively or additionally, one or more lattices of reinforcing material 90 smaller than the first lattice of reinforcing material 52 can be made from scratch according to the general steps for cutting a lattice of reinforcing material described above. As shown in FIGS. 53-54 and 64-66, one or more of these smaller lattices of reinforcing material 90 can be pressed onto a desired subset of the plurality of resilient elements 138 so that only portions of the plurality of resilient elements are reinforced by a lattice or lattices of reinforcing material. As shown in FIGS. 53-56, 64-66 and 71, after pressing the smaller lattice of reinforcing material onto the desired subset of resilient elements, a heat platen 76 can be used to adhere a second fabric or mesh sheet substrate 86 to the second sides 118 of the resilient elements to form the fourth composite material 204.

As shown in FIGS. 57-59, 69 and 70, the first composite material 201 also can be used to make a sixth composite material 206 comprising the plurality of resilient elements 138 sandwiched on opposite sides by fabric or mesh sheet substrates 78, 86, where all of the resilient elements are surrounded by the first lattice of reinforcing material 52, and one or more subsets of the resilient elements are surrounded by one or more second smaller lattices of reinforcing material 90. To make this sixth composite, one or more lattices of reinforcing material 90 that are smaller than the first lattice of reinforcing material 52 can be made from scratch according to the general steps discussed above. The smaller lattice(s) of reinforcing material then can be pressed onto any desired subset(s) of resilient elements 138 so that each smaller lattice only surrounds that subset. After pressing the smaller lattice(s) of reinforcing material onto the desired subset(s) of resilient elements, a heat platen 76 can be used to adhere a second fabric or mesh sheet substrate 86 to the sides of the resilient elements opposite the side adhered to the first fabric or mesh sheet substrate 78 in the manner discussed above. This forms the sixth composite material 206, which can be used as a protective pad. Moreover, multiple smaller lattices of reinforcing material may be layered on to subsets of resilient elements.

In another aspect of the invention, the fabric or mesh sheets 78 and/or 86 may be natural or synthetic fibers. Alternatively, the sheeting structure may be flexible or pliable plastic, or latex, silicone, or other rubber material, or made of synthetic fiber.

Additional Non-Limiting Examples of the First Process for Making the Resilient Composite Pad FIGS. 72-93 and FIGS. 118-151B depict optional, non-limiting examples of the first process for making composite pads with no reinforcement and full reinforcement, without using a die or jig.

FIGS. 94-109B and FIGS. 118-151B depict other optional, non-limiting examples of the first process for making composite pads with no reinforcement and full reinforcement, and FIGS. 110-112B depict yet another optional, non-limiting example of the first process for making composite pads with no reinforcement and full reinforcement, using an optional holding tray element.

Figure 93:
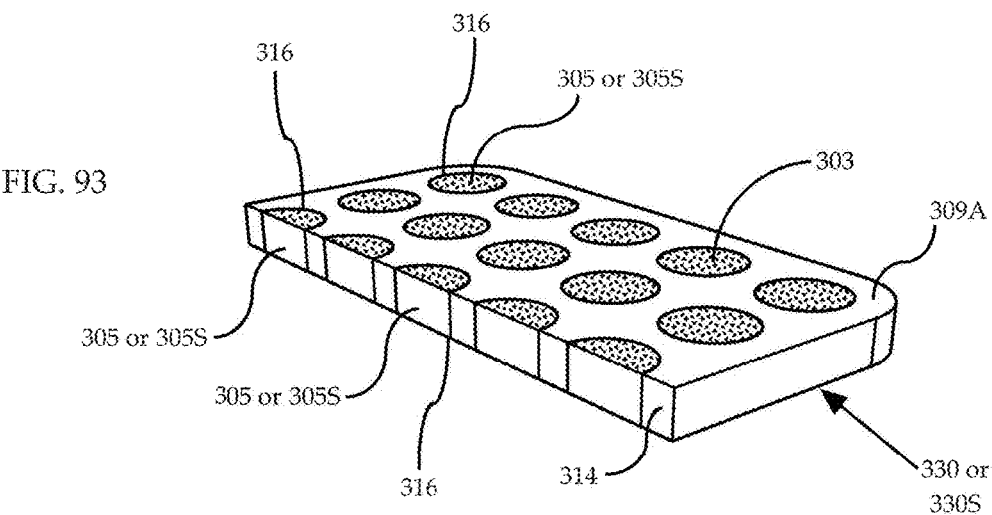
FIG. 93 is a side/perspective partial cutaway view of an alternative embodiment of resilient material assembly.

FIGS. 93-151B depict more optional and alternative non-limiting examples of the first process for making composite pads with no reinforcement and full reinforcement, without using a die or jig.

FIGS. 118-151B depict optional, non-limiting examples of one aspect of the first process for making composite pads, namely, the process of laminating or bonding one or two sheets of fabric or mesh material to a plurality of resilient elements, and various optional and alternative examples of resulting composite pads with no reinforcement and full reinforcement.

It is understood that the various non-limiting examples of the first process for making composite pads depicted above may also be used to assemble composite pads with partial reinforcement, and both partial and full reinforcement.

This aspect of the invention and these alternative embodiments, and the benefits of the same, will be better appreciated once the various alternative and optional processes of making the composite pads, described in greater detail below and depicted in the figures referenced below, are fully understood.

First Non-Limiting Example of the First Process for Assembling Composite Pads, without Using a Jig or Die An optional, non-limiting example of the first process for making composite pads with no reinforcement and full reinforcement, without using a die or jig, is depicted in FIGS. 72-93.

Figure 72:
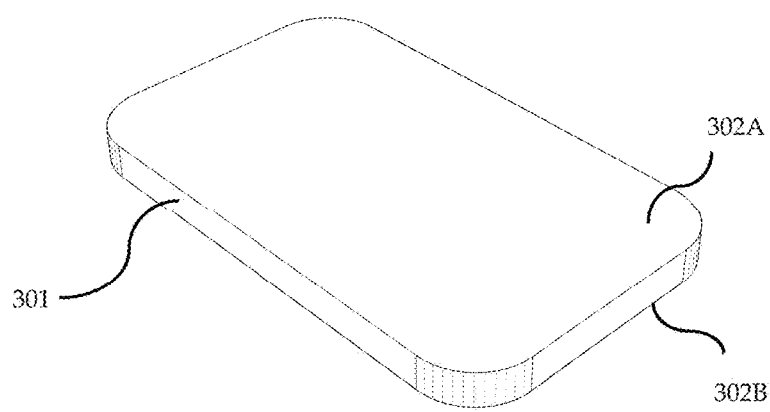
FIG. 72 is a perspective view of a sheet of resilient material.

FIG. 72 depicts a sheet of resilient material 301. It is understood that resilient material 301 is a non-limiting example of the sheet of resilient material 110. Resilient material 301 includes first side 302A and second side 302B.

It is understood that the composition of resilient material 301 (and resilient material 110) may include, without limitation, some type of resilient material, such as foam, rubber, elastomer, plastic, and so forth (including a combination of such materials). Functionally, the resilient material may act as a cushion against impact, or provide insulation to heat, depending on the types and composition of the resilient material.

By way of example only, and without limitations, resilient material 301 (and resilient material 110) may optionally be comprised of a sheet of ethyl vinyl acetate ("EVA") foam, polyurethane ("PU") foam, or olefin or polyolefin based foam.

It is also understood that, optionally, resilient material 301 may alternatively be comprised of a sheet of one type of foam material glued to another sheet of a different type of foam material. Alternatively, and optionally, resilient material 301 may be comprised of a sheet of a foam material glued to another sheet of an elastomer, or a sheet of a foam material glued to one or more sheets of plastic, rubber, synthetic or natural leather, or synthetic or natural fabric. The invention is intended to include all conceivable variations, combinations, and permutations on the composition of the sheeting materials, the number of sheets or layers, and the order or sequence of the sheets or layers included in the resilient material 301, without limitations.

Figure 73:
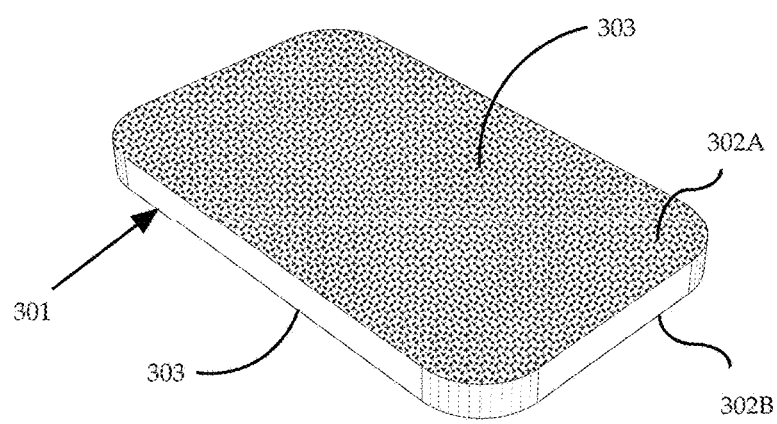
FIG. 73 is a perspective view of a sheet of resilient material where adhesive is applied to the first or second side, or both sides.

As depicted in FIG. 73, adhesive 303 is optionally applied to first side 302A, second side 302B, or both sides of resilient material 301. It is understood that in an alternative embodiment of the invention, one type of adhesive may be applied to first side 302A and, optionally, a different type of adhesive may be applied to the second 302B.

Figure 74:
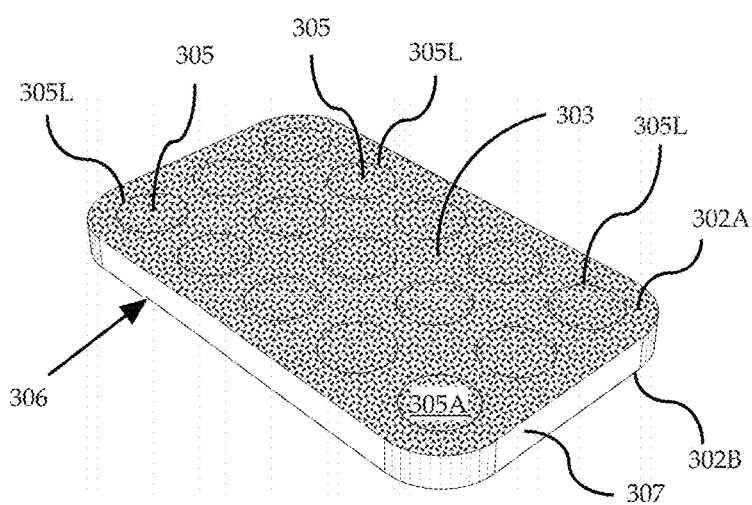
FIG. 74 is a perspective view of a sheet of resilient material, coated with adhesive, cut to define and form a plurality of resilient elements.

As depicted in FIG. 74, resilient material 301, coated with adhesive 303, is cut along cutting lines 305L, defining and forming a plurality of spaced apart resilient elements 305 that are separated from one another by excess resilient material 307. It is understood that the exposed surfaces of the resilient elements 305 (such as the first side 305A, depicted in FIG. 74) remains covered with adhesive 303.

Resilient material 301 is cut in this manner to form cut sheet of resilient material 306. It is understood that cut sheet of resilient material 306 is a non-limiting example of the cut sheet of resilient material 110.

Figure 75:
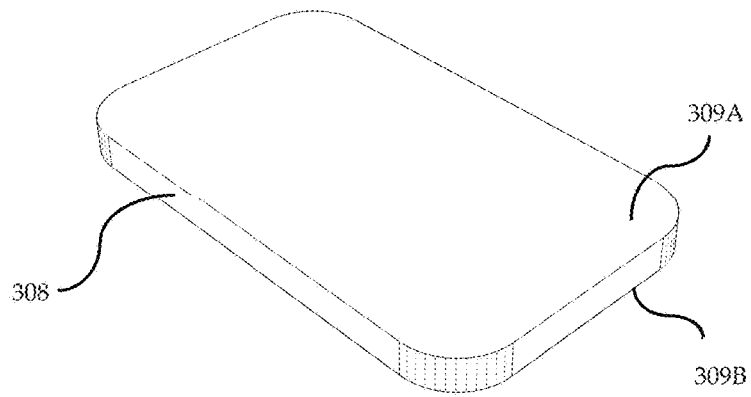
FIG. 75 is a perspective view of a sheet of reinforcing material.

FIG. 75 depicts a sheet of reinforcing material 308. It is understood that reinforcing material 308 is a non-limiting example of reinforcing material 47. Sheet of reinforcing material 308 includes first side 309A and second side 309B.

It is also understood that the composition of reinforcing material 308 (and sheet of reinforcing material 47) may include without limitation foam, neoprene, natural leather, synthetic leather, plastic, or rubber (including without limitation, latex and silicone, synthetic fabric, and, so forth and any combination of such materials). By way of example only, and without limitations, reinforcing material 308 (and reinforcing material 47) may be comprised of a sheet of EVA foam, PU foam, or olefin or polyolefin based foam.

It is understood that the composition of reinforcing material 308 (and sheet of reinforcing material 47) may optionally be comprised of the same or different material from resilient material 301, and may optionally have the same or different functional properties from resilient material 301.

It is also understood that in this alternative embodiment of the invention, the sheet of reinforcing material 308 has the same thickness as the sheet of resilient material 301. However, it is also understood that this is not a limitation of the invention, and that, in the alternative, reinforcing material 308 (and sheet of reinforcing material 47) may optionally have a different thickness relative to the sheet of resilient material 301 (and resilient material 110).

By way of example only, and without limitations, the sheet of reinforcing material 308 may be thicker than the sheet of resilient material 301, wherein the composition of reinforcing material 308 comprises an EVA foam or other polymer foam material that is softer, less dense, or more compressible than the composition of resilient material 301.

And further in this embodiment, during a heat-press lamination process, the "thicker" sheet of reinforcing material 308 may be compressed to a greater degree than the resilient material 301 as a result of the heat platen making contact with both the lattice of reinforcing material fabricated from the sheet of reinforcing material 308 (as described below) and the resilient elements fabricated from the resilient material 301 (as described below).

Figure 76:
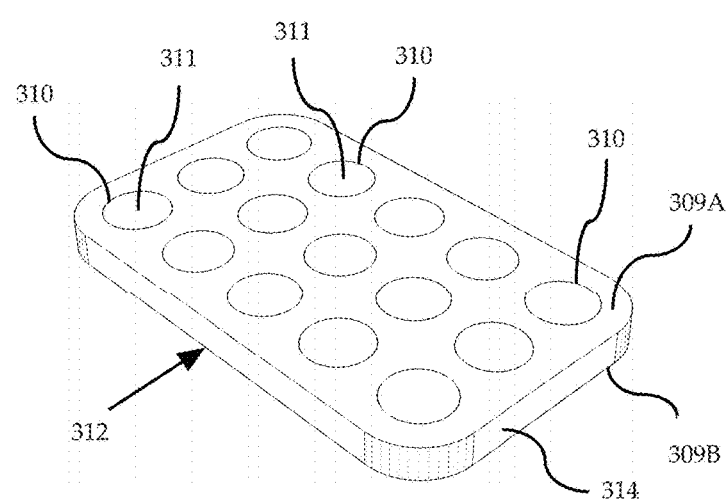
FIG. 76 is a perspective view of a sheet of reinforcing material, cut to define and form a plurality of reinforcing elements.

As depicted in FIG. 76, the sheet of reinforcing material 308 is cut along cutting lines 310, defining and forming a plurality of spaced apart reinforcing elements 311 that are contained, or "embedded," within a lattice of reinforcing material 314. It is understood that the shapes and dimensions of reinforcing elements 311, and their position in the sheet of reinforcing material 308, are the same or substantially the same as the shapes and dimensions of resilient elements 305, and the position of the resilient elements in the sheet of resilient material 301.

It is understood that the sheet of reinforcing material 308 is cut in this manner to form cut sheet of reinforcing material 312. It is also understood that cut sheet of reinforcing material 312 is a non-limiting example of the cut sheet of reinforcing material 48.

Figure 77:
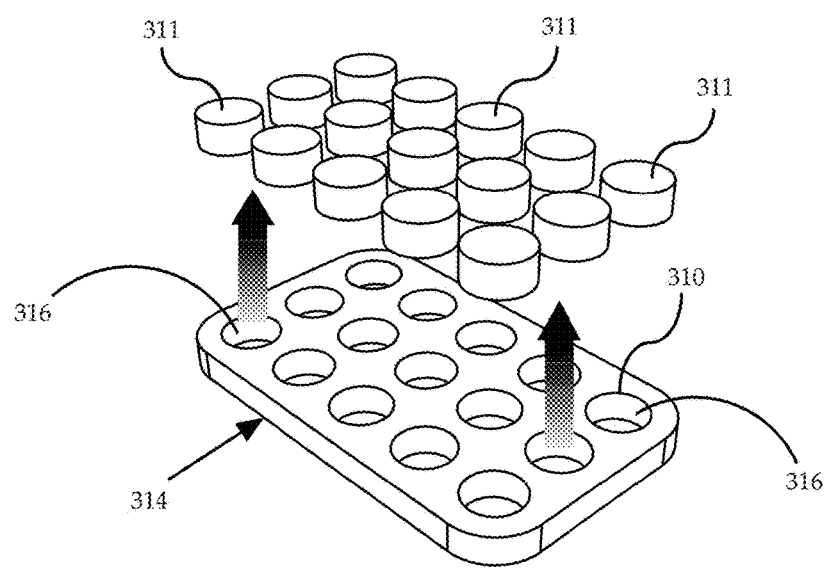
FIG. 77 is a perspective view of the reinforcing elements being separated and extracted from the cut sheet of reinforcing material.

Cut sheet of reinforcing material 312 is further processed as depicted in FIG. 77, by separating and extracting the reinforcing elements 311 from the lattice of reinforcing material 314, leaving behind a plurality of spaced apart holes 316 defined by the cutting lines 310.

Figure 78:
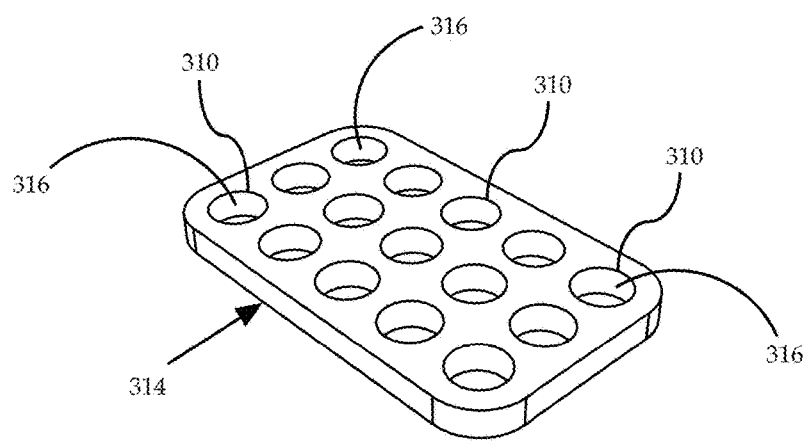
FIG. 78 is a perspective view of the resulting lattice of reinforcing material.

FIG. 78 depicts the resulting lattice of reinforcing material 314. It is understood that in this embodiment of the invention, the shapes and dimensions of holes 316 in the lattice of reinforcing material 314 are the same or substantially the same as the shape and dimensions of resilient elements 305 in cut sheet of resilient material 306 depicted in FIG. 74.

It is understood that the relative position and placement of holes 316 in the lattice of reinforcing material 314 are the same or substantially the same as the relative position and placement of the resilient elements 305 in cut sheet of resilient material 306, so that the lattice of reinforcing material 314 and the cut sheet of resilient material 306 may be positioned close to each other, and the holes 316 in the lattice of reinforcing material 314 may be aligned with the resilient elements 305 in cut sheet of resilient material 306.

Figure 79A:
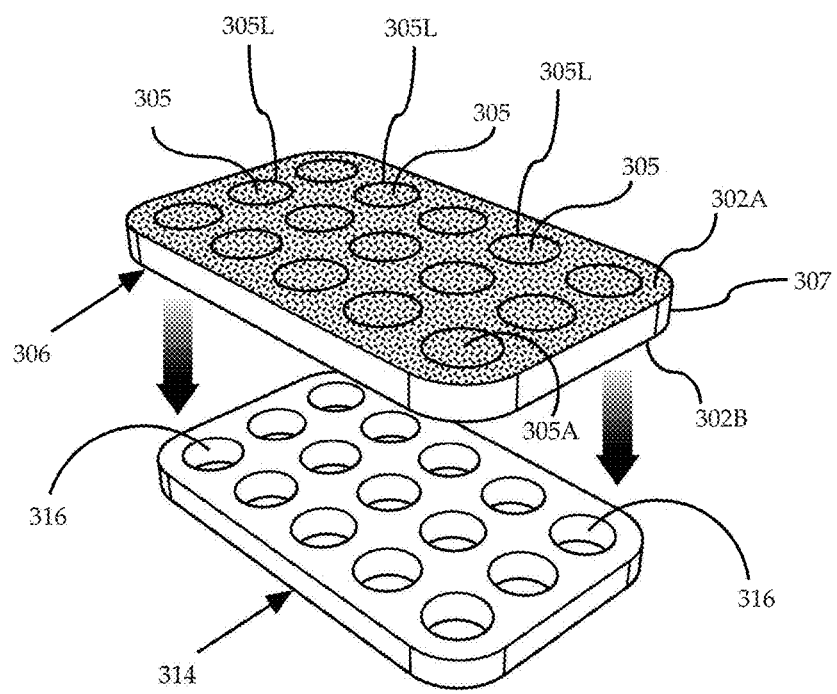
FIG. 79A is a perspective view of the cut sheet of resilient material positioned adjacent to the lattice of reinforcing material.

FIG. 79A depicts the cut sheet of resilient material 306 being positioned adjacent to the lattice of reinforcing material 314, as indicated by the dashed arrow.

Figure 79B:
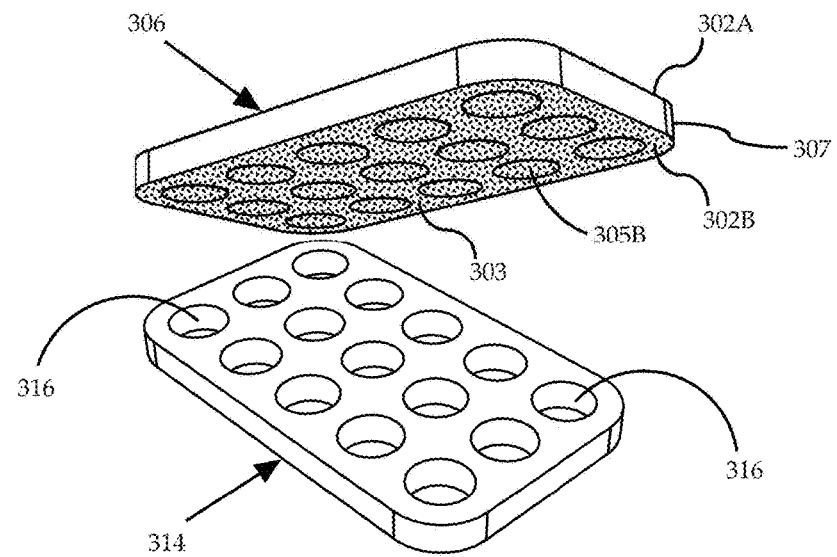
FIG. 79B is a perspective view of the cut sheet of resilient material and the lattice of reinforcing material, the cut sheet of resilient material positioned that the second side might be depicted.

FIG. 79A provides a top view of the cut sheet of resilient material 306, showing first side 302A. FIG. 79B provides a bottom view of the cut sheet of resilient material 306, showing second side 302B. It is understood that in this optional embodiment of the invention, the surfaces of first side 302A and second side 302B of the cut sheet of resilient material 306 may be covered or laminated, in their entirety, with adhesive 303, as depicted in FIGS. 79A-79B. It is also understood that the surfaces of first side 305A and second side 305B of the cut resilient elements 305 may also be covered with adhesive 303.

As depicted in FIGS. 79A-79B, both sides of the cut sheet of resilient material 306 (namely, first side 302A and second side 302B) may be covered or laminated with adhesive 303. However, it is understood that, alternatively and optionally, adhesive 303 may optionally be applied to a single side of the cut sheet of resilient material 306 (that is, either first side 302A or second side 302B). Also optionally, only a single surface of the cut resilient elements 305 (such as first side 305A or second side 305B) may be covered with adhesive 303.

Figure 80:
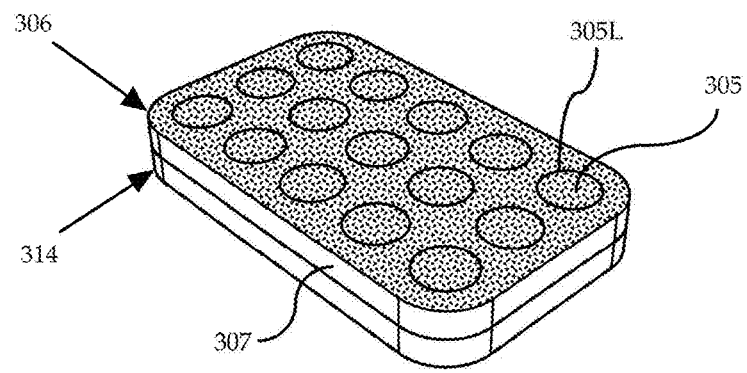
FIG. 80 is a perspective view of the cut sheet of resilient material positioned next to the lattice of reinforcing material.

FIG. 80 depicts the cut sheet of resilient material 306 positioned next to the lattice of reinforcing material 314, wherein second side 302B of cut sheet of resilient material 306 faces first side 309A of the lattice of reinforcing material 314. (Alternatively, and optionally, cut sheet of resilient material 306 may be "flipped over" before being positioned next to the lattice of reinforcing material 314, so that first side 302A of cut sheet of resilient material 306 faces first side 309A of the lattice of reinforcing material 314).

Figure 81:
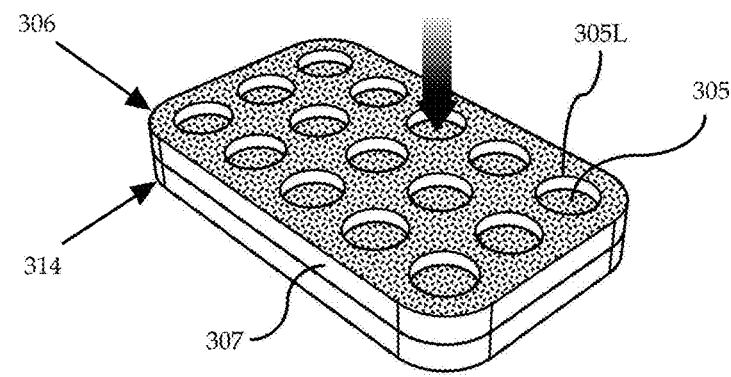
FIG. 81 is a perspective view of the cut sheet of resilient material positioned next to the lattice of reinforcing material, where one or more resilient element are pressed, pushed, or punched.

As depicted in FIG. 81, one or more resilient elements 305 are pressed, pushed, or punched in the direction of the dashed arrow, so that resilient elements 305 "embedded," or held by friction within the holes (defined by the cutting lines 305L) in the cut sheet of resilient material 306, are pressed into the corresponding spaced-apart holes 316 in the lattice of reinforcing material 314.

Figure 82:
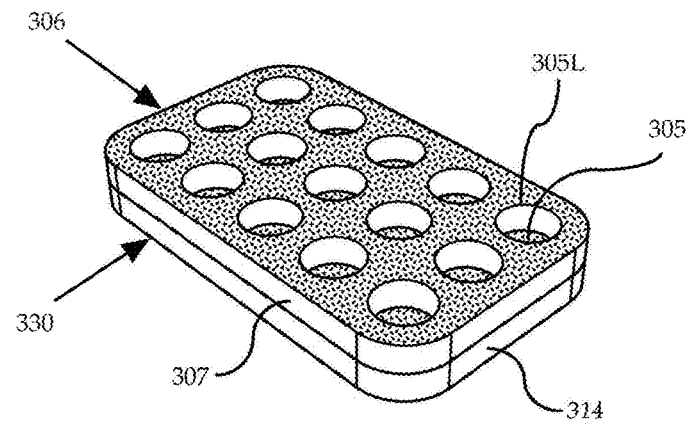
FIG. 82 is a perspective view of the cut sheet of resilient material positioned next to the lattice of reinforcing material, where one or more resilient elements have been pressed, pushed, or punched into corresponding holes, forming a resilient material assembly.

FIG. 82 depicts resilient material assembly 330, formed by inserting a plurality of spaced-apart resilient elements 305 into a corresponding plurality of holes 316 in the lattice of reinforcing material 314, so that the resilient elements are "embedded," or held by friction within the holes 316 in the lattice of reinforcing material 314.

Figure 83A:
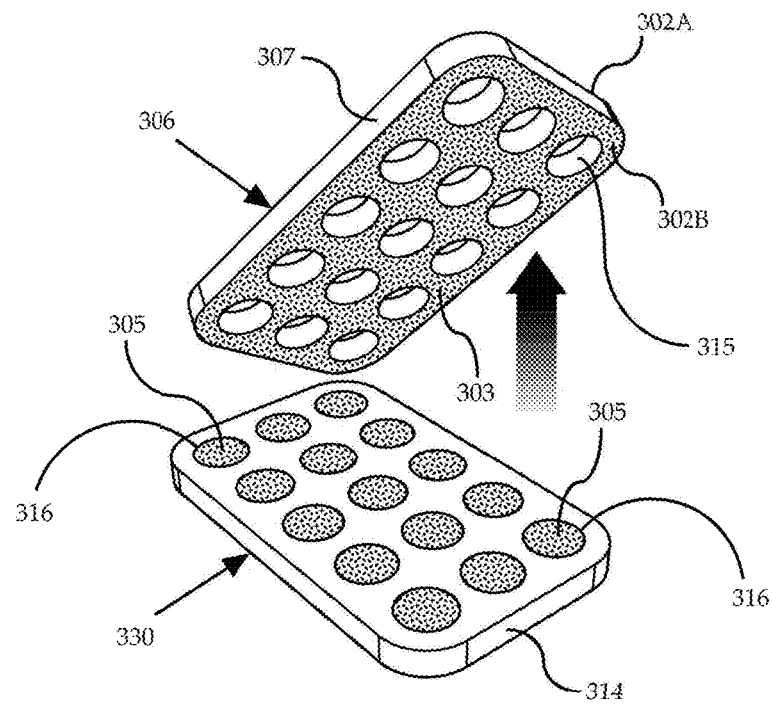
FIG. 83A is a perspective view of resilient material assembly, with the cut sheet of resilient material being removed.

Following the assembly of resilient material assembly 330, the cut sheet of resilient material 306, with a plurality of holes 315 in the locations previously occupied by resilient elements 305, may be removed as depicted in FIG. 83A and optionally discarded as waste material, or set aside for reuse or recycling.

Figure 118:
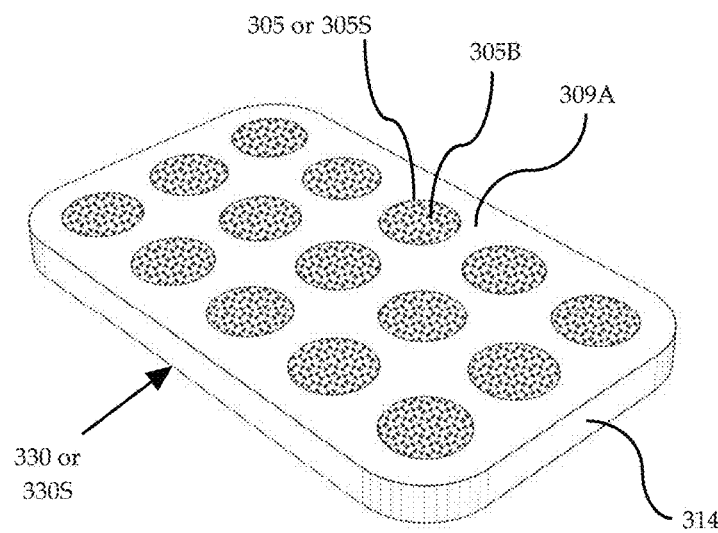
FIG. 118 is a perspective view of resilient material assembly, where both sides of the resilient elements, but not the lattice of reinforcing material, are covered with adhesive.

Resilient material assembly 330 and its components are shown in greater detail in FIGS. 83A and 118. It is understood that resilient material assembly 330 is a non-limiting example of the resilient material assembly 70.

Figure 83B:
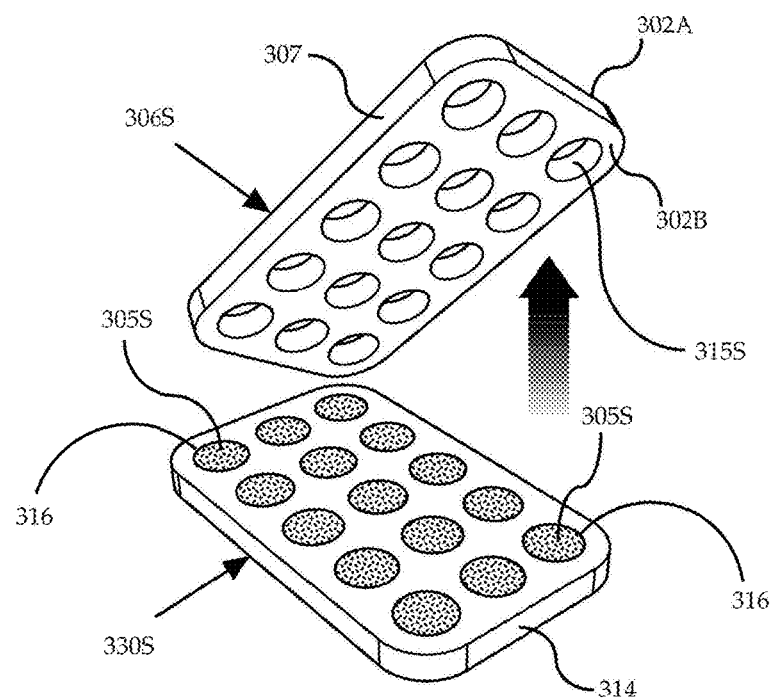
FIG. 83B is a perspective view of an alternative embodiment, where adhesive has optionally been applied to a single side of resilient material.

In an alternative embodiment of the invention, adhesive 303 may be applied optionally to a single side of resilient material 301 (such as, by way of example only, second side 302B), resulting in singly-bonded cut sheet of resilient material 306S, depicted in FIG. 83B. It is understood that singly-bonded cut sheet of resilient material 306S is equivalent or identical to cut sheet of resilient material 306, except that the former is coated with adhesive 303 only on one side, while the latter is coated with adhesive 303 on both sides.

The singly-bonded cut sheet of resilient material 306S may be positioned next to the lattice of reinforcing material 314, and one or more resilient elements 305S embedded in singly-bonded cut sheet of resilient material 306S may be pressed towards the lattice of reinforcing material 314, so that one or more resilient elements 305S are pushed into the corresponding spaced-apart holes 316 in the lattice of reinforcing material 314. It is understood that resilient material 305S is identical or equivalent to resilient material 305, except that resilient material 305S is coated with adhesive 303 only on one side, while the latter is coated with adhesive 303 on both sides.

This operation results in an alternative embodiment of the invention, namely, resilient material assembly 330S depicted in FIG. 83B, formed by inserting a plurality of spaced-apart resilient elements 305S into a corresponding plurality of holes 316 in the lattice of reinforcing material 314, so that the resilient elements 305S are "embedded," or held by friction within the holes 316 in the lattice of reinforcing material 314. It is understood that resilient material assembly 330S is identical or equivalent to resilient material assembly 330, except that resilient elements 305S in resilient material assembly 330S are coated with adhesive 303 only on one side, while resilient elements 305 in resilient material assembly 330 are coated with adhesive 303 on both sides.

Figure 84:
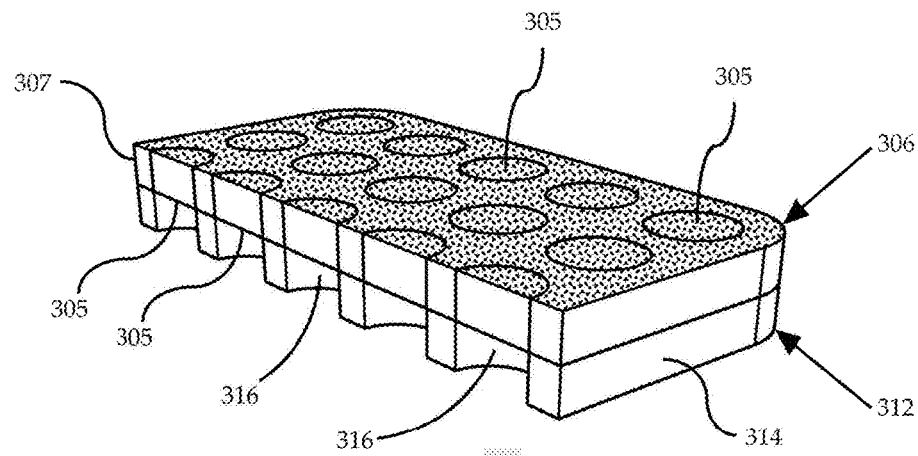
FIG. 84 is a side/perspective partial cutaway view of a cut sheet of resilient material positioned next to a lattice of reinforcing material.
Figure 85:
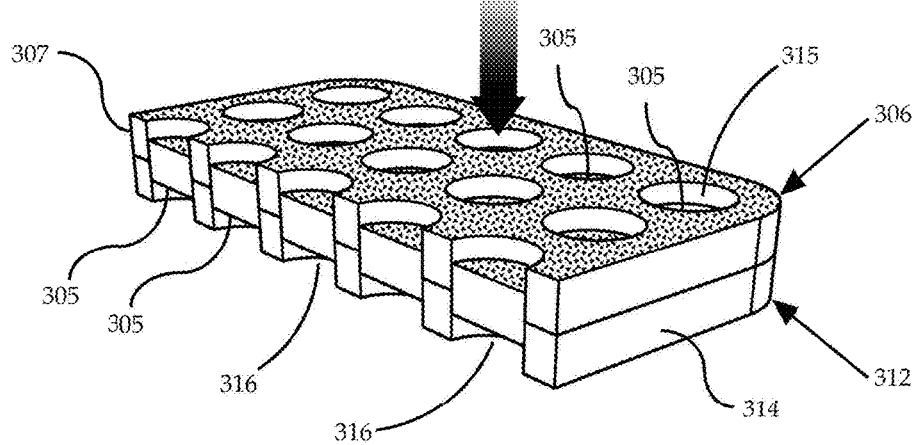
FIG. 85 is a side/perspective partial cutaway view of a cut sheet of resilient material positioned next to a lattice of reinforcing material, where one or more resilient elements are pressed, pushed, or punched.
Figure 86:
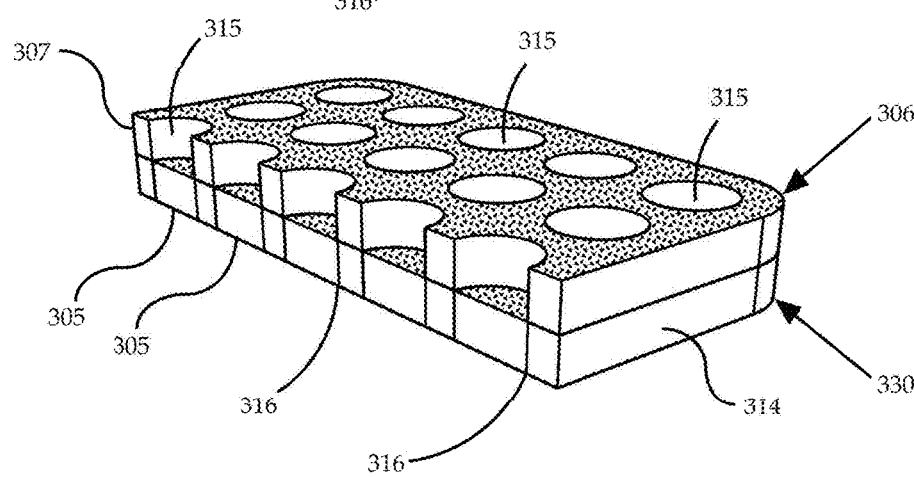
FIG. 86 is a side/perspective partial cutaway view of a cut sheet of resilient material positioned next to a lattice of reinforcing material, where one or more resilient elements have been pressed, pushed, or punched into corresponding holes, forming a resilient material assembly.

FIGS. 84-86 depict a non-limiting example of the "transfer" of the resilient elements (such as resilient elements 305) from the cut sheet of resilient material 306 into the holes 316 in the lattice of reinforcing material 314.

FIG. 84 is a partial cut-away view of the cut sheet of resilient material 306 positioned next to the lattice of reinforcing material 314. As depicted in FIG. 84, one or more resilient elements 305 in the cut sheet of resilient material 306 are aligned with the holes 316 in the lattice of reinforcing material 314.

As depicted in FIG. 85, resilient elements 305 in the cut sheet of resilient material 306 are pushed in the direction of the dashed arrow, into the holes 316 in the lattice of reinforcing material 314. As resilient elements 305 are, by application of pressure, slid out and transferred from the cut sheet of resilient material 306 into the holes 316 in the lattice of reinforcing material 314, the resilient elements leave behind excess resilient material 307 with a plurality of holes 315 in the locations previously occupied by resilient elements 305, as depicted in FIG. 86.

Figure 87A:
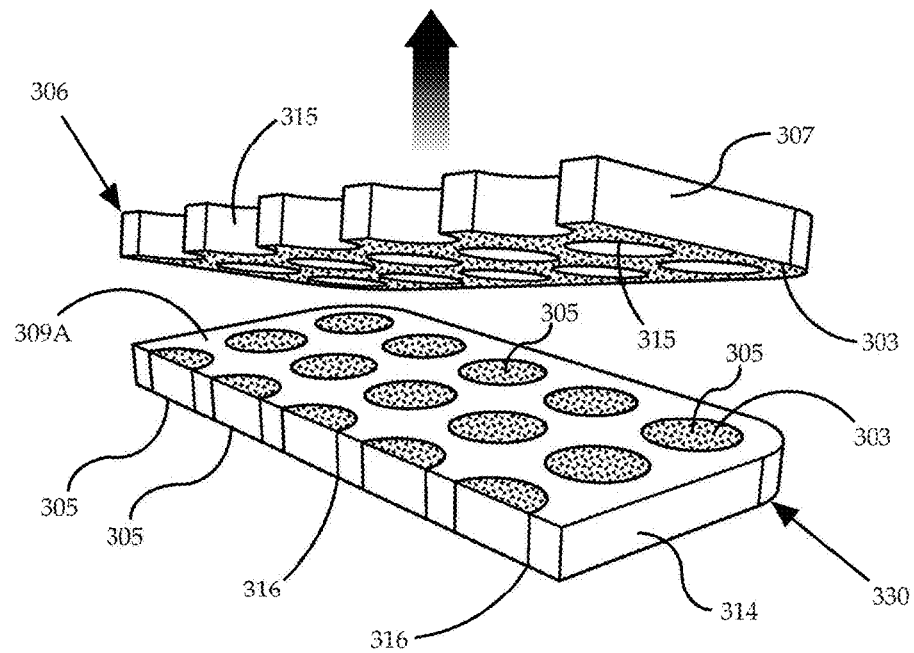
FIG. 87A is a side/perspective partial cutaway view of resilient material assembly, with the cut sheet of resilient material being removed.

As depicted in FIG. 87A, excess resilient material 307 may be removed and optionally discarded, leaving behind resilient material assembly 330.

Figure 87B:
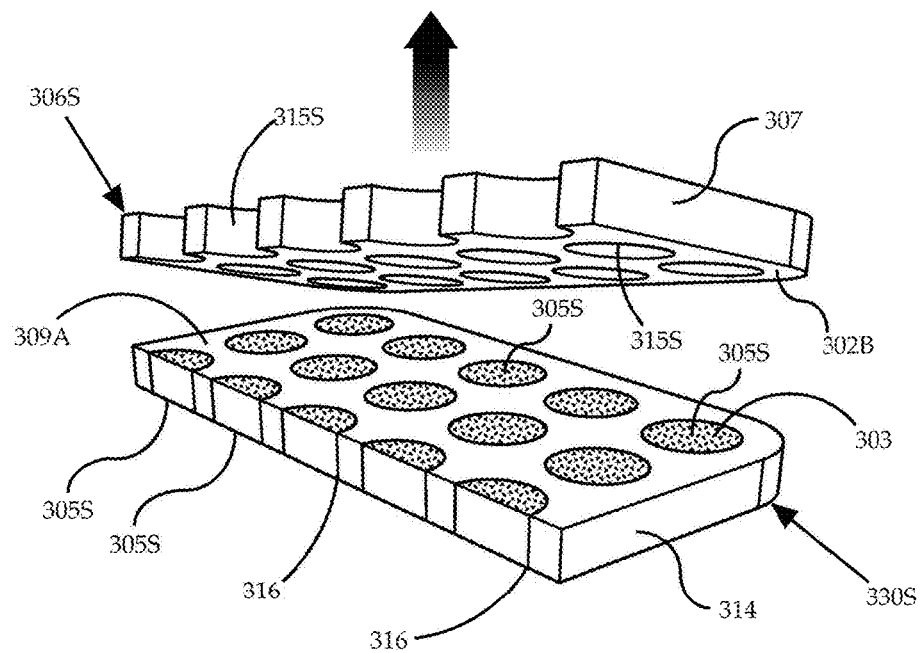
FIG. 87B is a perspective view of an alternative embodiment, where adhesive has optionally been applied to a single side of resilient material.

It is understood that, optionally and alternatively, the same operation may be carried out with singly-bonded cut sheet of resilient material 306S, in place of cut sheet of resilient material 306, in which case the result of the operation is resilient material assembly 330S depicted in FIGS. 83B and 87B. It is understood that resilient material assembly 330S is comprised of a plurality of spaced-apart resilient elements 305S fitted into corresponding plurality of holes 316 in the lattice of reinforcing material 314. It is also understood that resilient elements 305S are pushed and "transferred" from their locations in the singly-bonded cut sheet of resilient material 306S into holes 316 in the lattice of reinforcing material 314, leaving behind excess resilient material 307, which may optionally be discarded.

In one aspect of the invention, the resilient elements (such as resilient elements 305, or resilient elements 305S) may be pushed out, pressed out, punched out, or "transferred" from the cut sheet of resilient material (such as cut sheet of resilient material 306, or singly-bonded cut sheet of resilient material 306S) into the corresponding holes in the lattice of reinforcing material 314 by a variety of optional means. By way of example only, and limitations, the resilient elements may be punched or pressed out manually, and fingers may be used to push the resilient elements into the holes in the lattice of reinforcing material. Alternatively, and optionally, pushing rods, sticks, or even chopsticks may be used to push the resilient elements out of the cut sheet of resilient material and into the lattice of reinforcing materials.

FIGS. 88-91 depict an optional embodiment of the invention, wherein a pusher 320, comprised of a plurality of push elements 322 attached to a pusher base 321, pushes the resilient elements out of the cut sheet of resilient material and into the lattice of reinforcing material. With respect to this aspect of the invention, it is understood that pusher 320 is a non-limiting example of pusher 60 depicted in FIGS. 23-27.

It is understood that in this optional embodiment of the invention, the resilient elements are contained and stabilized by the lattice of reinforcing materials as the resilient elements are "transferred" from the cut sheet of resilient material into the lattice of reinforcing materials. Following the "transfer," the resilient elements are "embedded" into the lattice of reinforcing materials and are held in place by the same; as such, a separate die is not required to guide, hold, or stabilize the resilient elements in this embodiment of the invention.

Figure 88:
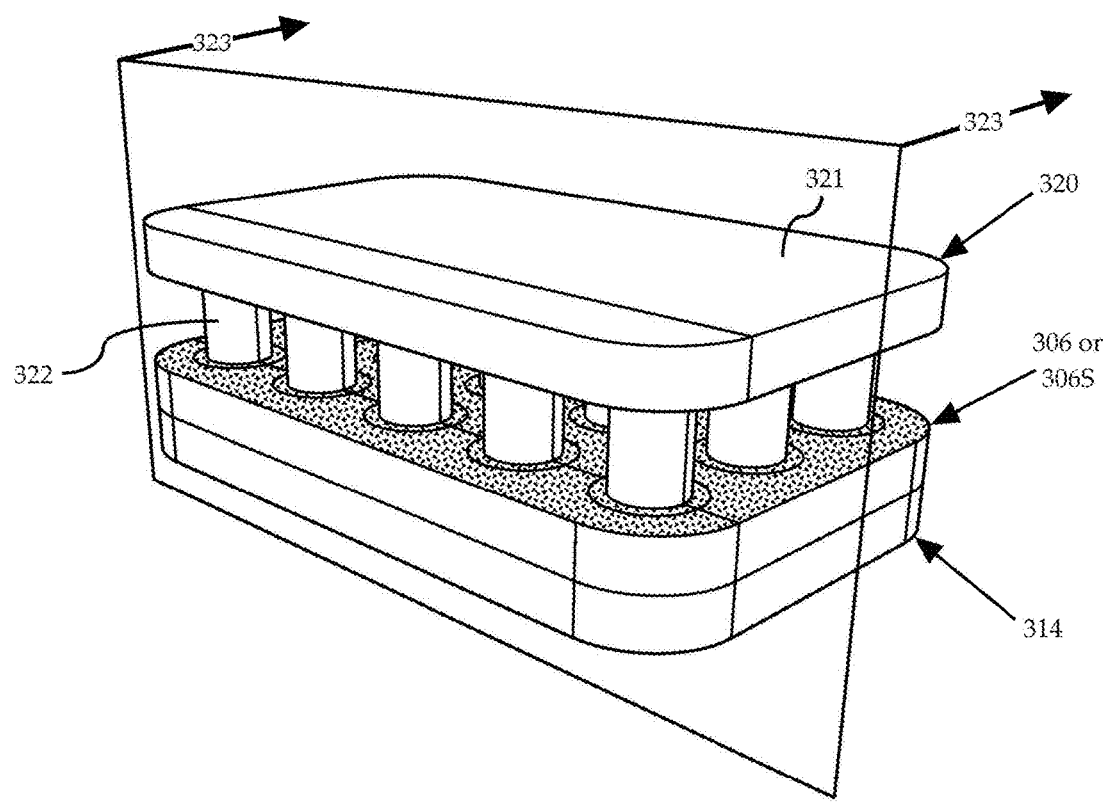
FIG. 88 is a perspective view of a pusher positioned above a cut sheet of resilient material next to a lattice of reinforcing material, with individual push elements of the pusher aligned with individual resilient elements.
Figure 89:
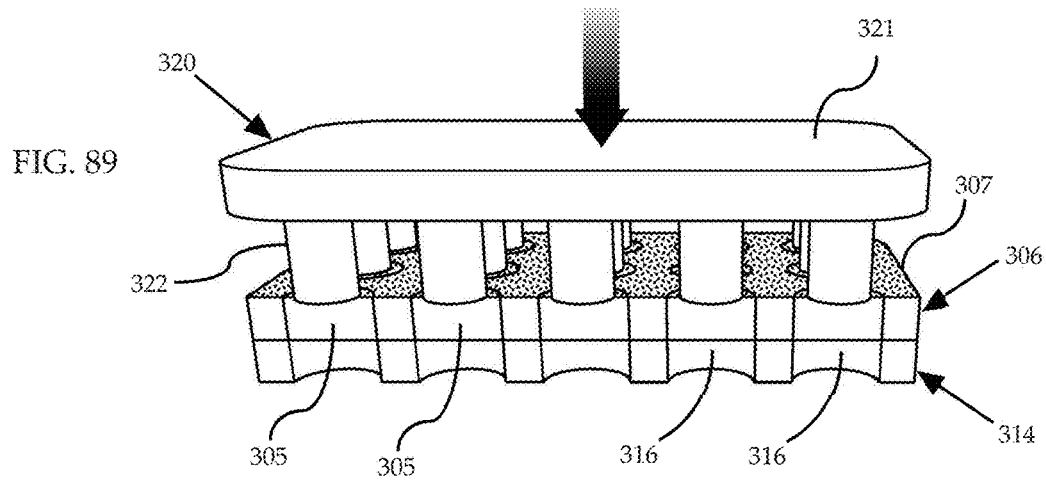
FIG. 89 is a side view of a pusher positioned above a cut sheet of resilient material next to a lattice of reinforcing material, with individual push elements of the pusher aligned with individual resilient elements.

FIGS. 88-89 depict pusher 320, comprised of a plurality of push elements 322 attached to a pusher base 321, positioned adjacent to a stack of materials comprised of a cut sheet of resilient material (such as cut sheet of resilient material 306 as depicted in FIG. 89, or singly-bonded cut sheet of resilient material 306S) and a lattice of reinforcing material (such as lattice of reinforcing material 314), wherein it is understood that individual push elements 322 are substantially aligned with the individual resilient elements (such as resilient elements 305 as depicted in FIG. 89, or resilient elements 305S) in the cut sheet of resilient material.

Figure 90:
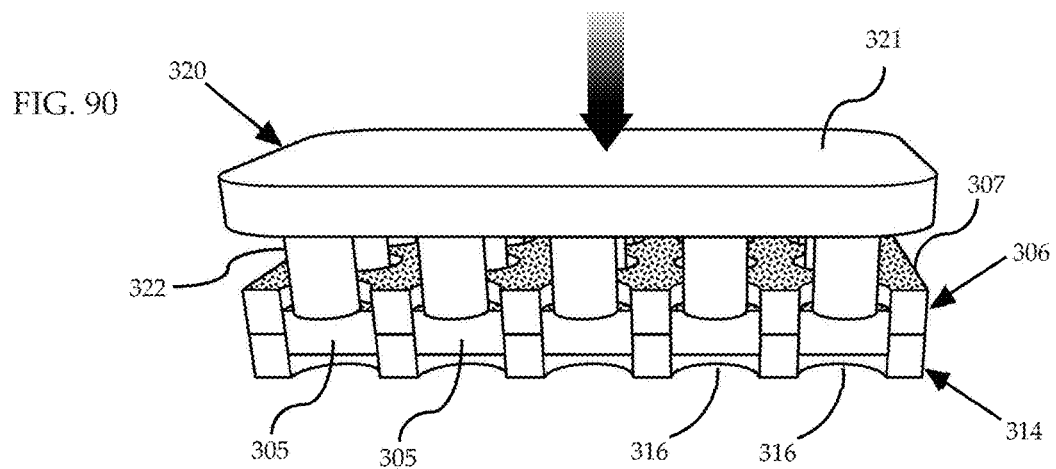
FIG. 90 is a side view of a pusher with individual push elements dislodging resilient elements from the cut sheet of resilient material into holes of the lattice of reinforcing material.

In one optional embodiment of the invention, pusher 320 is pressed in the direction of the dashed arrow as depicted in FIGS. 89-90, so that push elements 322 make contact with resilient elements 305.

FIG. 90 depicts push elements 322 dislodging resilient elements 305 from the cut sheet of resilient material 306, and pushing the resilient elements 305 into holes 316 in the lattice of reinforcing material 314.

Figure 91:
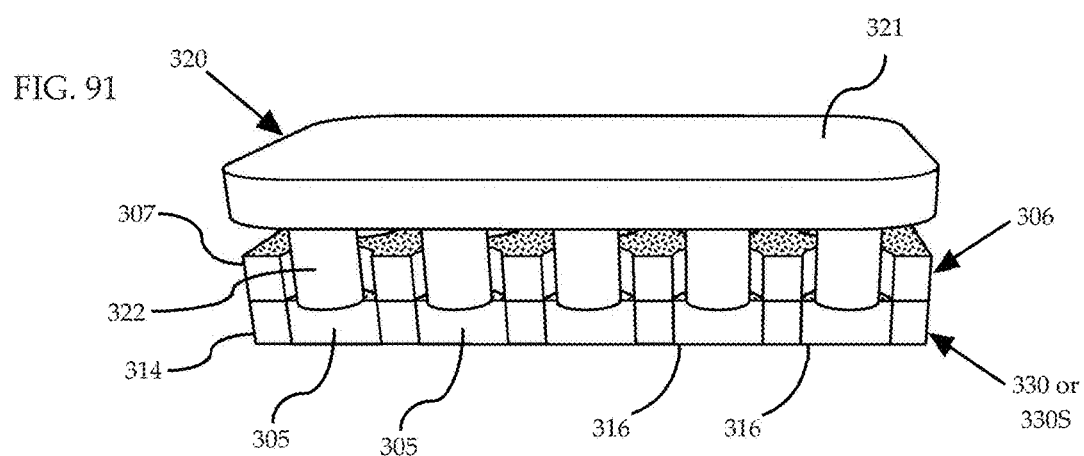
FIG. 91 is a side view of the pusher with individual push elements having completely pushed resilient elements from the cut sheet of resilient material into holes of the lattice of reinforcing material, forming resilient material assembly.

FIG. 91 depict the completed transfer of the resilient elements 305 from the cut sheet of resilient material 306 into holes 316 in the lattice of reinforcing material 314, forming resilient material assembly 330. It is understood that optionally, and alternatively, pusher 320 may also be used to transfer resilient elements 305S from singly-bonded cut sheet of resilient material 306S into holes 316 in the lattice of reinforcing material 314, forming resilient material assembly 330S.

Figure 92:
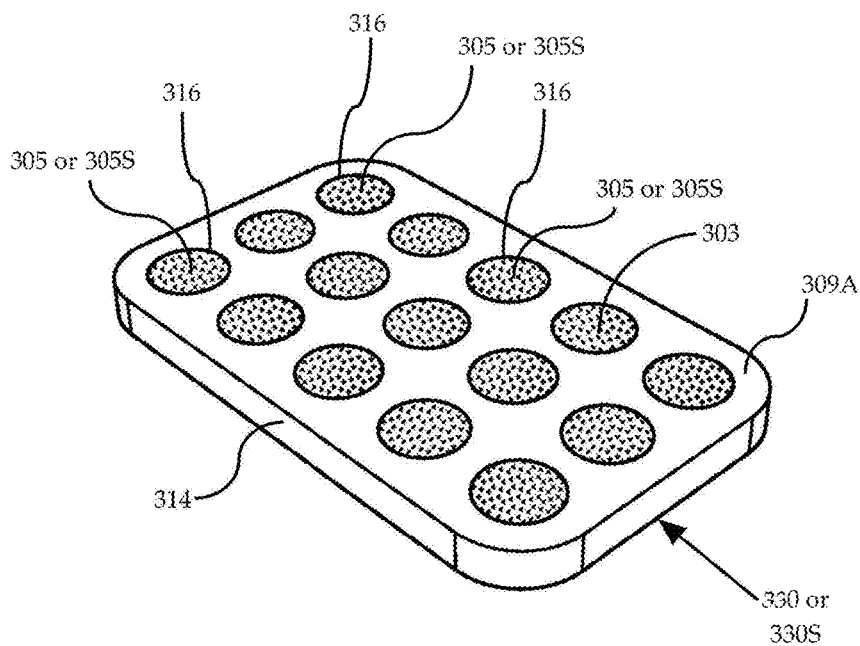
FIG. 92 is a perspective view of an alternative embodiment of resilient material assembly.

FIG. 92 depicts alternative embodiments of the invention, that is, variations of the resilient material assembly formed by using this process, such as resilient material assembly 330, and resilient material assembly 330S. FIG. 93 depicts a partial cutaway view of the resilient material assembly.

As depicted in FIGS. 92-93, resilient material assembly 330 is comprised of a plurality of spaced-apart resilient elements 305 "embedded" into holes 316 in the lattice of reinforcing material 314. It is understood that in resilient material assembly 330, the surface of only one side of resilient elements 305 is covered with adhesive 303.

It is also understood that in a variant of resilient material assembly 330, namely resilient material assembly 330S, a plurality of spaced-apart resilient elements 305S are similarly "embedded" into holes 316 in the lattice of reinforcing material 314, wherein resilient elements 305S in resilient material assembly 330S have adhesive 303 applied to only one side.

It is further understood that in the resilient material assembly 330 and in the alternative resilient material assembly 330S, the surfaces of the lattice of reinforcing material 314 (such as first side 309A shown in FIGS. 92-93, and second side 309B) are exposed and not covered with adhesive.

Additionally, it is also understood that resilient material assembly 330 and resilient material assembly 330S are non-limiting examples of resilient material assembly 70. Resilient material assembly 330 and resilient material assembly 330S may optionally be processed further as described herein.

Second Non-Limiting Example of the First Process for Assembling Composite Pads, Optionally Using a Holding Tray In one aspect of the invention, cut sheet of reinforcing material 312 is first processed as depicted in FIG. 77, by separating and removing the reinforcing elements 311 from the lattice of reinforcing material 314, leaving behind the lattice of reinforcing material 314 with a plurality of spaced apart holes 316. The lattice of reinforcing material 314 may be then placed adjacent to cut sheet of resilient material 306, as depicted in FIG. 80, and resilient elements 305 are pushed out and "transferred" from cut sheet of resilient material 306 into the empty holes 316 in the lattice of reinforcing material 314.

Figure 94:
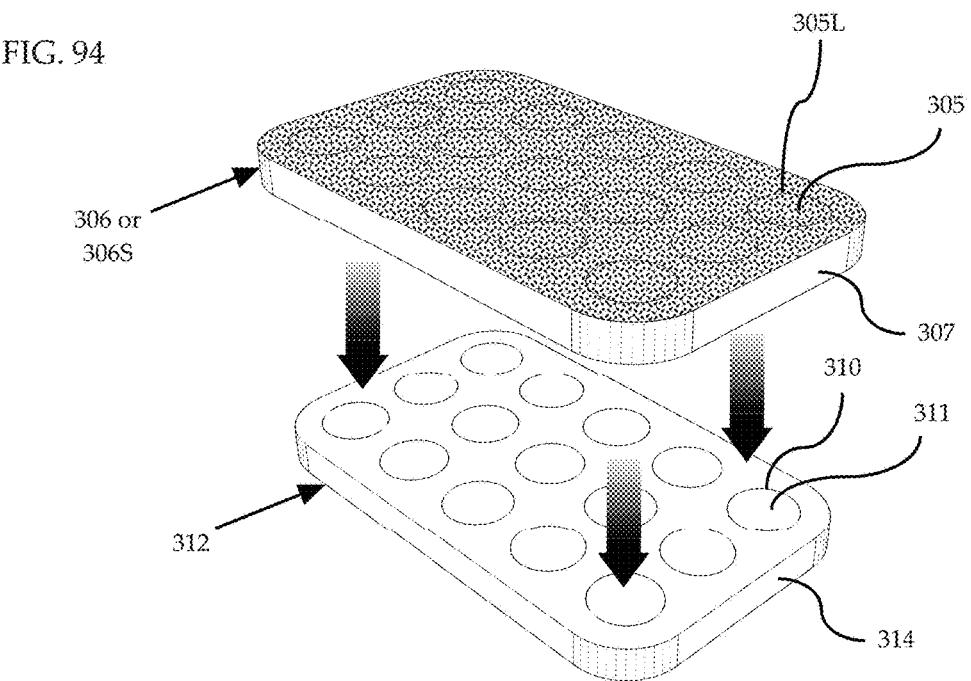
FIG. 94 is a perspective view of a cut sheet of resilient material being positioned adjacent to a cut sheet of reinforcing material, where the reinforcing elements have not yet been removed.
Figure 95:
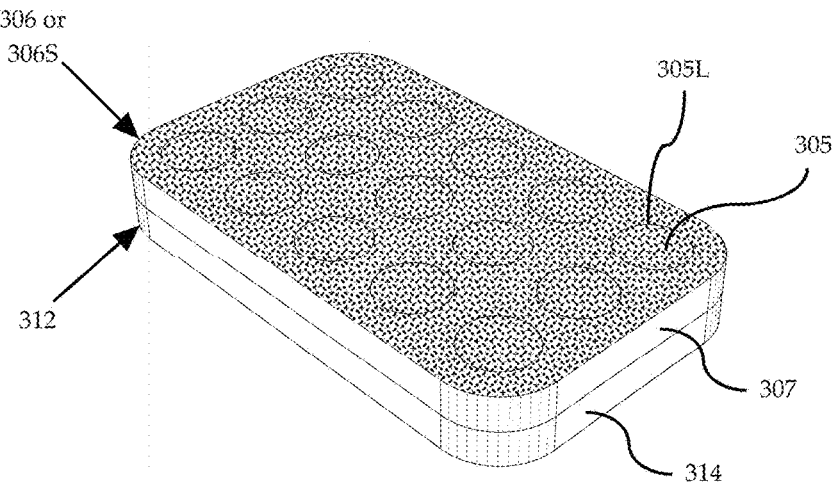
FIG. 95 is a perspective view of a cut sheet of resilient material positioned next to a cut sheet of reinforcing material, where the reinforcing elements have not yet been removed.
Figure 96:
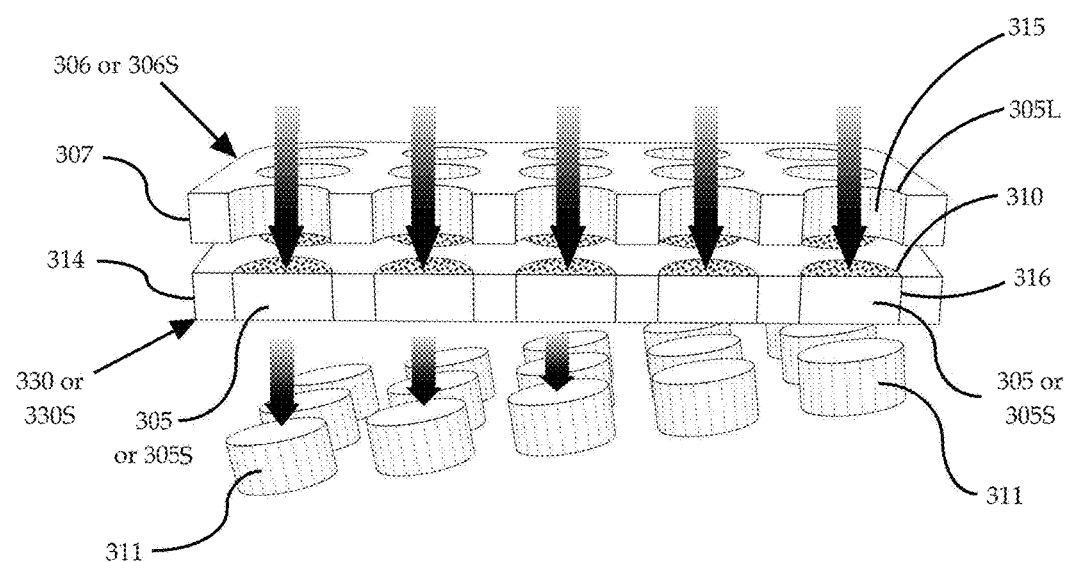
FIG. 96 is a side cutaway view of a cut sheet of resilient material positioned next to a lattice of reinforcing material, where one or more resilient elements have been pressed, pushed, or punched, dislodging and replacing the reinforcing elements, forming a resilient material assembly.

But in another aspect of the invention, depicted in FIGS. 94-96, the cut sheet of resilient material 306 may be placed optionally adjacent to the cut sheet of reinforcing material 312, wherein the reinforcing elements 311 have not yet been removed from holes 316 in the lattice of reinforcing material 314, and remain "embedded" in the cut sheet of reinforcing material 312. In this alternative and optional embodiment of the invention, resilient elements 305 are pushed out and made to travel from the cut sheet of resilient material 306 into the holes 316 in the cut sheet of reinforcing material 312, and the resilient elements dislodge and displace the reinforcing elements 311 from the lattice of reinforcing material 314, forming resilient material assembly 330.

In yet another aspect of the invention, depicted in FIGS. 97A-112B, the assembly comprised of resilient material 306 positioned adjacent to the cut sheet of reinforcing material 312 may optionally be placed over or against a work surface, namely, holding tray 325, with a plurality of apertures 326 in positions that match the positions of the reinforcing elements 311 in the cut sheet of reinforcing material 312. As described in greater detail below and depicted in FIGS. 111-112B, holding tray 325 holds or stabilizes cut sheet of reinforcing material 312 while resilient elements 305 are pushed out by pusher 320 and "transferred" from the cut sheet of resilient material 306 into the holes 316 in the cut sheet of reinforcing material 312, and the reinforcing elements 311 are dislodged from the lattice of reinforcing material 314, displaced by resilient elements 305, and are removed through apertures 326 and optionally discarded.

Figure 113:
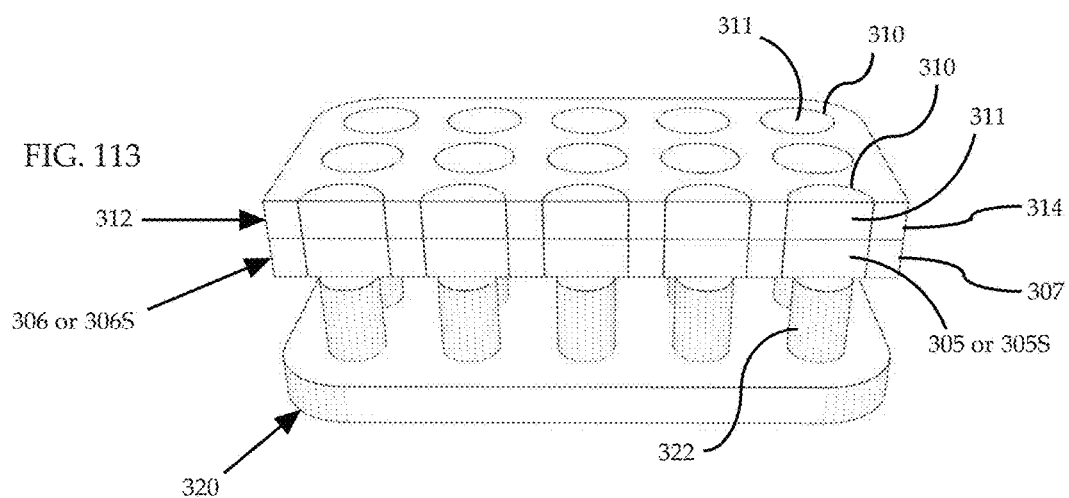
FIG. 113 is a side partial cutaway view of a pusher positioned such that the push elements are aligned with resilient elements of a cut sheet of resilient material stacked below a cut sheet of reinforcing material.

FIGS. 113-115 depict yet another optional and alternative embodiment of the invention, in which the cut sheet of reinforcing material 312 is placed above the cut sheet of resilient material 306, and the entire assembly is stacked above the pusher 320 with the push elements 322 pointed upward, towards the cut sheet of resilient material 306, so that individual push elements 322 may contact, and push up, the cut resilient elements 305 embedded in the cut sheet of resilient material 306.

In this embodiment of the invention, pusher 320 may optionally be pressed against the stack of assembled components, or the stack of assembled components may be pressed against pusher 320, causing resilient elements 305 to be pushed out by push elements 322 and "transferred" from the cut sheet of resilient material 306 into the cut sheet of reinforcing material 312, to form resilient material assembly 330.

This aspect of the invention and these alternative embodiments, and the benefits of the same, will be better appreciated once the various alternative and optional processes of making the composite pads as described in greater detail below and depicted in the figures referenced below are fully understood.

FIGS. 94-95 depict a cut sheet of resilient material (such as cut sheet of resilient material 306, or singly-bonded cut sheet of resilient material 306S) positioned adjacent to a cut sheet of reinforcing material 312. It is understood that the cut sheet of reinforcing material 312 is comprised of a lattice of reinforcing material 314 and a plurality of spaced-apart reinforcing elements 311.

It is also understood that the cut sheet of resilient material 306 is aligned to the cut sheet of reinforcing material 312, so that the relative positions of resilient elements 305 in the cut sheet of resilient material 306 substantially correspond to the relative positions of the reinforcing elements 311 in the cut sheet of reinforcing material 312, and the resilient elements 305 are aligned with reinforcing elements 311.

One or more resilient elements 305 (which are defined and separated from cut sheet of resilient material 306 by cutting lines 305L) are pressed, pushed, or punched in the direction of the dashed arrows, so that resilient elements 305 "embedded," or held within the cut sheet of resilient material 306, press against the corresponding reinforcing elements 311 held within the lattice of reinforcing material 314.

As depicted in FIG. 96, resilient elements 305 are dislodged from the cut sheet of resilient material 306, and are pushed towards and into the lattice of reinforcing material 314, dislodging and displacing reinforcing elements 311 from the holes 316 in the lattice of reinforcing material 314, and pushing the reinforcing elements 311 out of the lattice of reinforcing material 314. The result is resilient material assembly 330, depicted in FIG. 96.

It is understood that as an alternative and optional embodiment of the invention, singly-bonded cut sheet of resilient material 306S may be used in place of cut sheet of resilient material 306, to form an alternative resilient material assembly 330S, as also depicted in FIGS. 94-96.

It is understood that a variety of optional means may be employed to push out, press out, or punch out the resilient elements (such as resilient elements 305, or resilient elements 305S) from the cut sheet of resilient material (such as cut sheet of resilient material 306, or singly-bonded cut sheet of resilient material 306S), and to cause the resilient elements to press against, dislodge, and displace reinforcing elements 311 from the cut sheet of reinforcing material 312. By way of example only, and without limitations, the resilient elements may be punched or pressed out manually, and fingers may be used to push the resilient elements, and to cause the resilient elements to dislodge and displace the reinforcing elements 311. Alternatively, and optionally, pushing rods or sticks may be used to push the resilient elements out of the cut sheet of resilient material and into the holes in the cut sheet of reinforcing material.

Alternatively, as depicted in FIGS. 97A-109B, pusher 320 may optionally be employed to push resilient elements out of a cut sheet of resilient material and into a lattice of reinforcing material, dislodging and displacing reinforcing elements previously embedded in the lattice of reinforcing material.

Figure 97A:
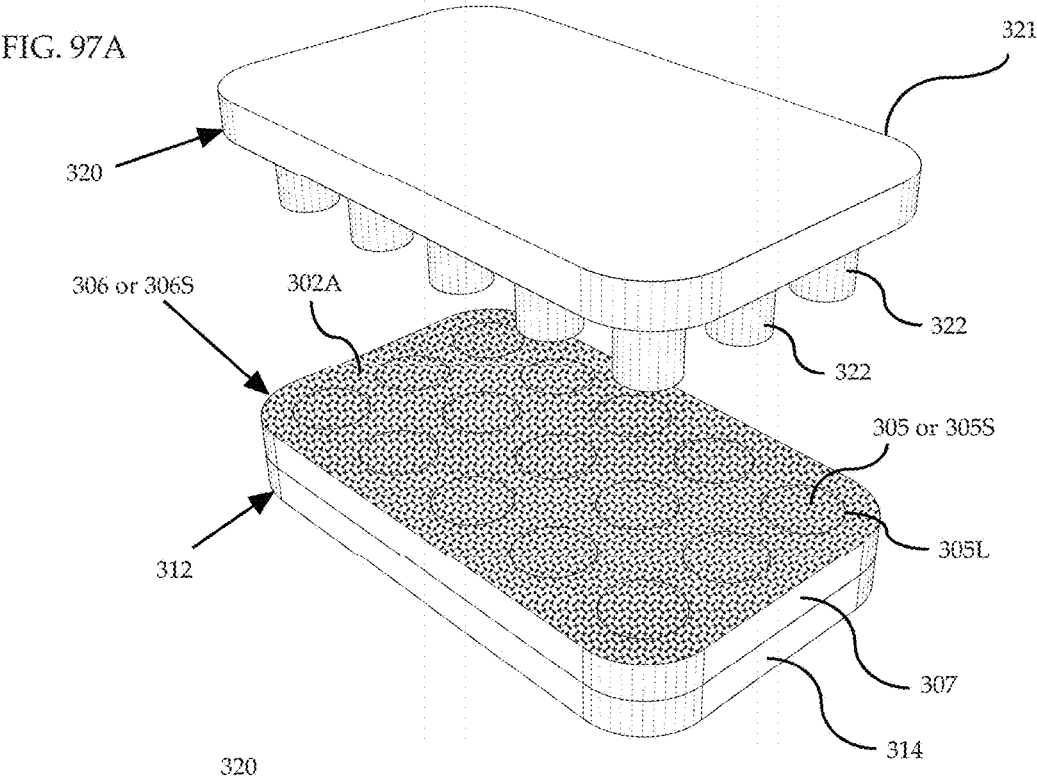
FIG. 97A is a perspective view of a pusher being positioned above a cut sheet of resilient material next to a cut sheet of reinforcing material, where the reinforcing elements have not yet been removed.
Figure 97B:
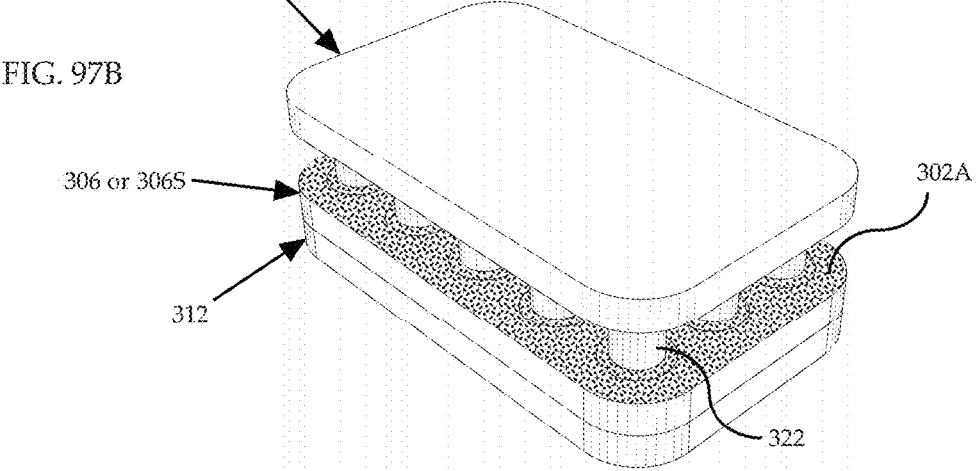
FIG. 97B is a perspective view of a pusher brought into contact with a cut sheet of resilient material next to a cut sheet of reinforcing material, where the reinforcing elements have not yet been removed, such that individual push elements of the pusher are aligned with the resilient elements.
Figure 98A:
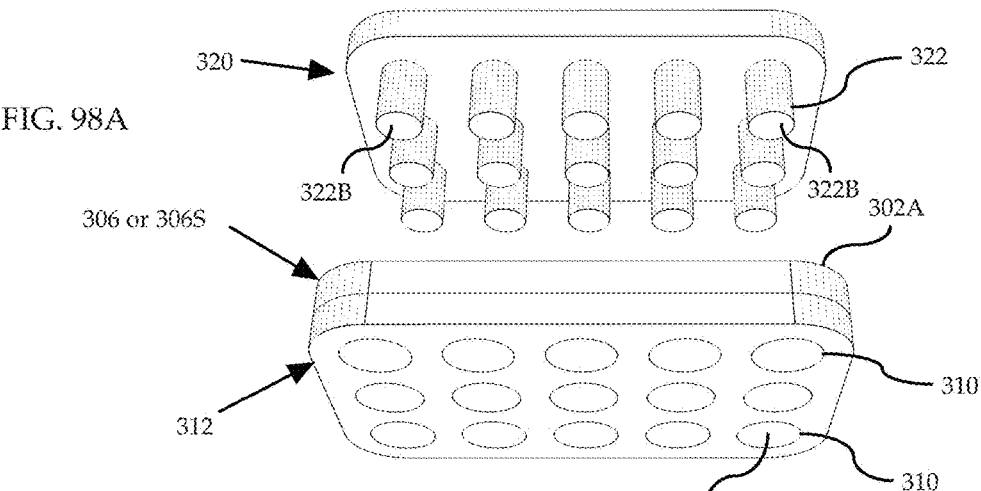
FIG. 98A is a side perspective view of a pusher being positioned above a cut sheet of resilient material next to a cut sheet of reinforcing material, where the reinforcing elements have not yet been removed.
Figure 98B:
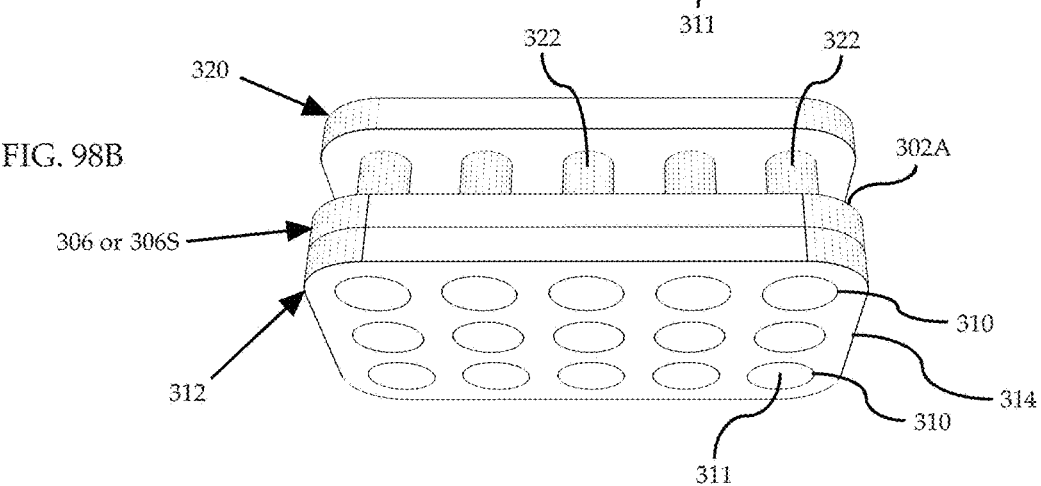
FIG. 98B is a side perspective view of a pusher brought into contact with a cut sheet of resilient material next to a cut sheet of reinforcing material, where the reinforcing elements have not yet been removed, such that individual push elements of the pusher are aligned with the resilient elements.
Figures 105, 106, 107:
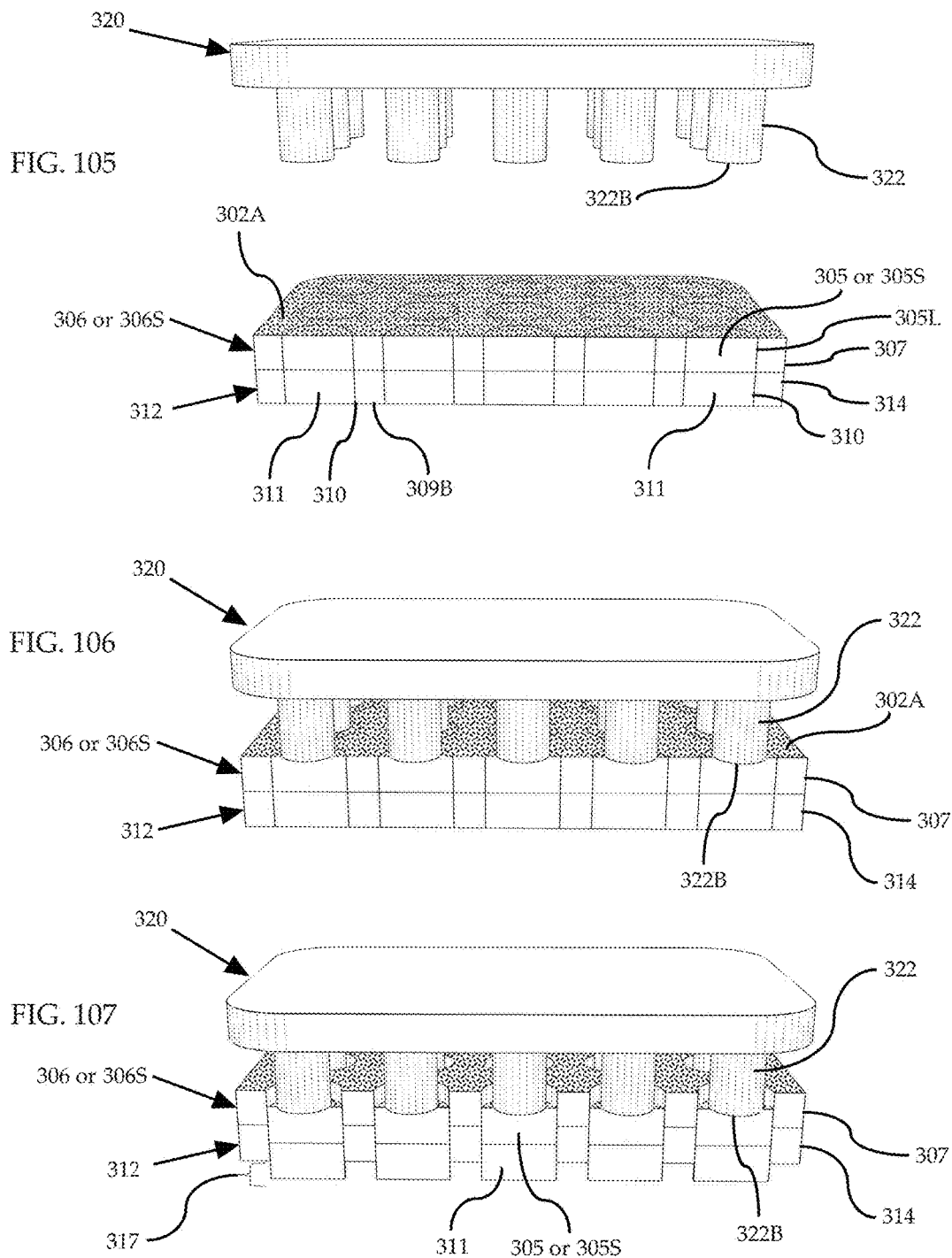
FIG. 105 is a side partial cutaway view of a pusher being positioned above a cut sheet of resilient material next to a cut sheet of reinforcing material, where the reinforcing elements have not yet been removed.
FIG. 106 is a side partial cutaway view of a pusher brought into contact with a cut sheet of resilient material next to a cut sheet of reinforcing material, where the reinforcing elements have not yet been removed, such that individual push elements of the pusher are aligned with the resilient elements.
FIG. 107 is a side partial cutaway view of the pusher as it presses against a cut sheet of resilient material next to a cut sheet of reinforcing material, such that the resilient elements dislodge and replace the reinforcing elements.

FIGS. 97A, 98A, and 105 depict a cut sheet of resilient material (such as cut sheet of resilient material 306, or singly-bonded cut sheet of resilient material 306S) positioned next to a cut sheet of reinforcing material 312, comprised of a plurality of reinforcing elements 311 embedded into a lattice of reinforcing material 314. In a more preferred embodiment of the invention, cut sheet of resilient material is stacked against the cut sheet of reinforcing material 312.

Figure 103:
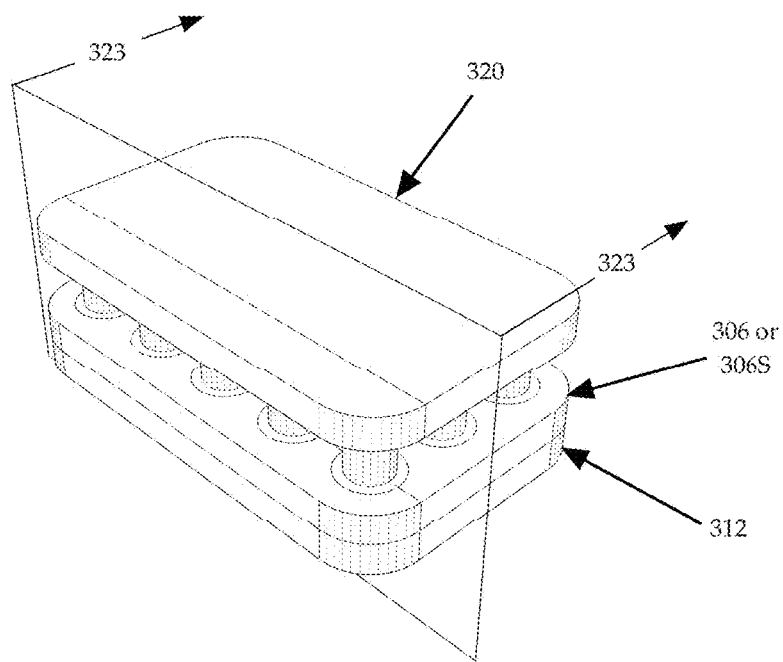
FIG. 103 is a perspective view of a pusher brought into contact with a cut sheet of resilient material next to a cut sheet of reinforcing material, where the reinforcing elements have not yet been removed, such that individual push elements of the pusher are aligned with the resilient elements.
Figure 104:
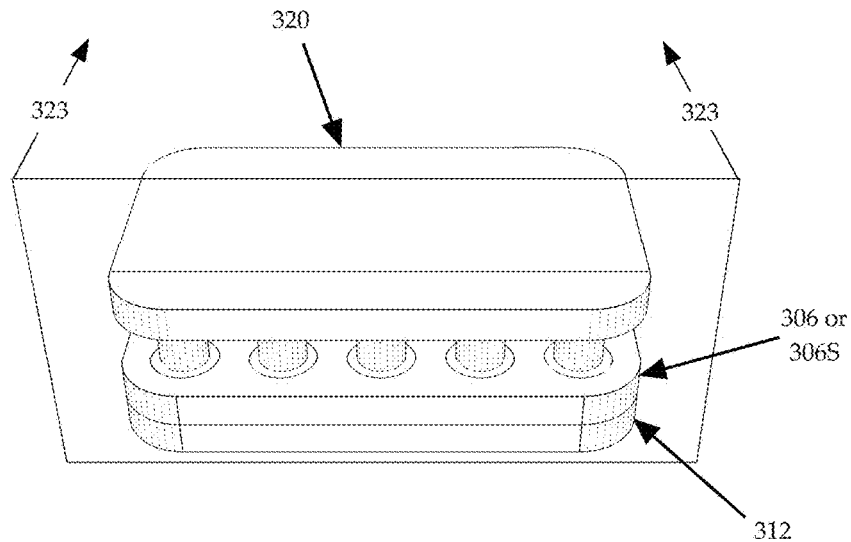
FIG. 104 is a side view of a pusher brought into contact with a cut sheet of resilient material next to a cut sheet of reinforcing material, where the reinforcing elements have not yet been removed, such that individual push elements of the pusher are aligned with the resilient elements.

It is understood that FIG. 105 depicts a partial cutaway view of the arranged components, and that directional arrows 323 in FIGS. 103-104 indicate the direction of sight.

FIGS. 97A, 98A, and 105 also depict pusher 320, comprised of a plurality of spaced apart push elements 322 attached to a pusher base 321. Pusher 320 is positioned next to the cut sheet of resilient material (such as cut sheet of resilient material 306, or singly-bonded cut sheet of resilient material 306S), so that pushing surfaces 322B of the push elements 322 face first side 302A of the cut sheet of resilient material, as shown with greater clarity in the partial cutaway view in FIG. 105.

As depicted in FIGS. 97B and 98B, and FIGS. 98C and 106, pusher 320 is moved towards the cut sheet of resilient material (such as cut sheet of resilient material 306, or singly-bonded cut sheet of resilient material 306S), so that pushing surfaces 322B of the push elements 322 contact the surfaces of the corresponding resilient elements (such as resilient elements 305, or resilient elements 305S) and push against the same.

Figure 98C:
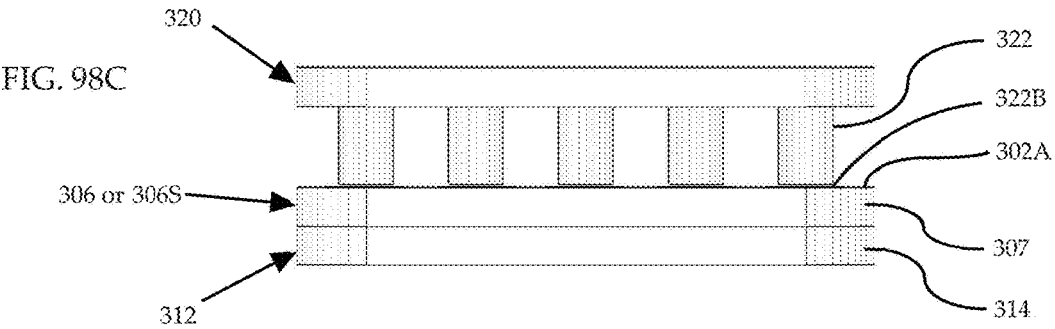
FIG. 98C is a side view of a pusher brought into contact with a cut sheet of resilient material next to a cut sheet of reinforcing material, where the reinforcing elements have not yet been removed, such that individual push elements of the pusher are aligned with the resilient elements

FIG. 98C depicts a side view of pusher 320 positioned adjacent to a stack of components comprised of a cut sheet of resilient material (such as cut sheet of resilient material 306, or singly-bonded cut sheet of resilient material 306S) and cut sheet of reinforcing material 312.

Figure 99:
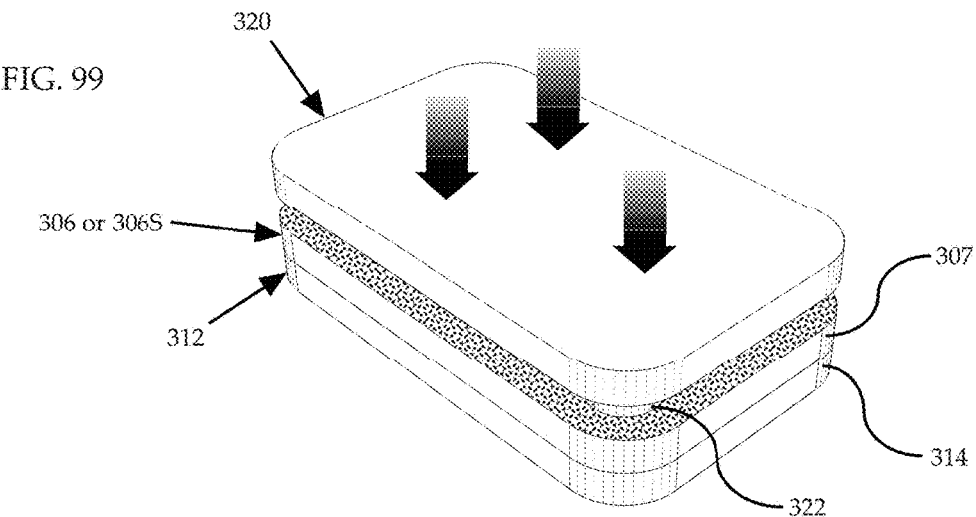
FIG. 99 is a perspective view of the pusher being pressed against a cut sheet of resilient material next to a cut sheet of reinforcing material, such that the resilient elements begin to dislodge and replace the reinforcing elements.

As depicted in FIG. 99, pusher 320 is pressed in the direction of the dashed arrows, against the stack of components comprised of a cut sheet of resilient material placed over the cut sheet of reinforcing material 312.

Figure 100:
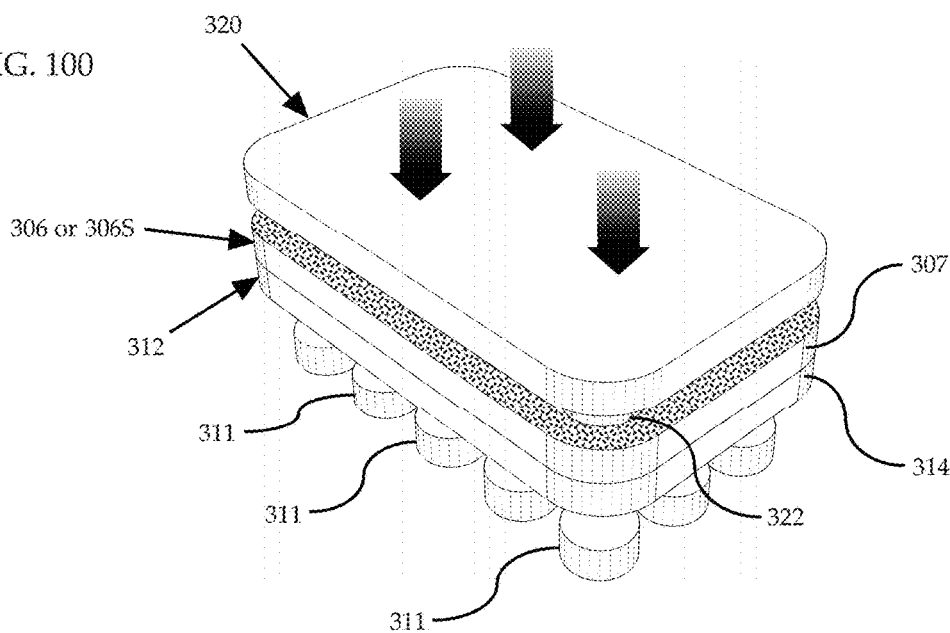
FIG. 100 is a perspective view of the pusher as it presses against a cut sheet of resilient material next to a cut sheet of reinforcing material, such that the resilient elements dislodge and replace the reinforcing elements.
Figure 101:
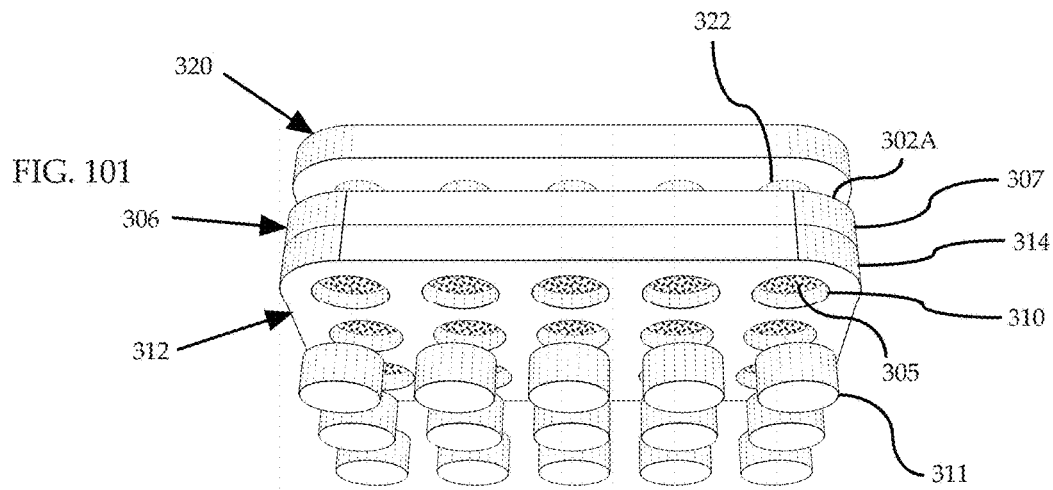
FIG. 101 is a side perspective view of the pusher as it presses against a cut sheet of resilient material next to a cut sheet of reinforcing material, such that the resilient elements dislodge and replace the reinforcing elements.

As depicted in FIGS. 100-101, and in the partial cutaway view in FIG. 107, as pusher 320 travels in the direction of the dashed arrows, push elements 322 press against the plurality of spaced apart resilient elements (such as resilient element 305, or resilient element 305S) embedded in the cut sheet of resilient material (such as cut sheet of resilient material 306, or singly-bonded cut sheet of resilient material 306S). Push elements 322 dislodge and displace the resilient elements, causing them to move in the direction of the dashed arrows, towards the cut sheet of reinforcing material 312.

It is understood that the cut sheet of resilient material (such as cut sheet of resilient material 306, or singly-bonded cut sheet of resilient material 306S) and the cut sheet of reinforcing material 312 are positioned in relation to each other in such a manner that the individual resilient elements (such as resilient element 305, or resilient element 305S) embedded in the cut sheet of resilient material are aligned with the apertures in the reinforcing material 312 defined by cutting lines 310, as depicted in the cutaway views in FIGS. 105-107.

Therefore, as the resilient elements (such as resilient element 305, or resilient element 305S) are pushed and dislodged from the cut sheet of resilient material (such as cut sheet of resilient material 306, or singly-bonded cut sheet of resilient material 306S), and travel towards the cut sheet of reinforcing material 312, the resilient elements in turn push and dislodge the plurality of reinforcing elements 311 (defined by cutting lines 310) that are embedded in the cut sheet of reinforcing material 312.

Figure 108:
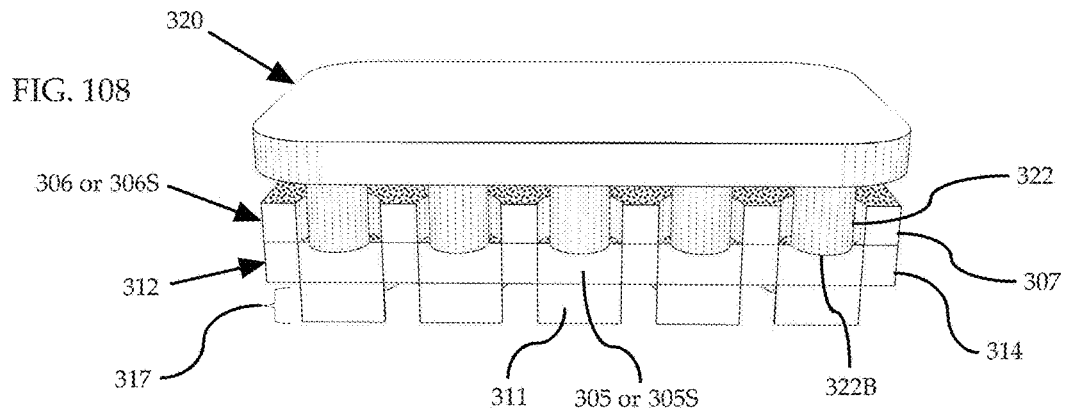
FIG. 108 is a side partial cutaway view of the pusher as it continues to press against a cut sheet of resilient material next to a cut sheet of reinforcing material, such that the resilient elements dislodge and replace the reinforcing elements.

As depicted in FIGS. 107-108, as a plurality of reinforcing elements 311 are dislodged from the cut sheet of reinforcing material 312 and displaced by the resilient elements (such as resilient element 305, or resilient element 305S), reinforcing elements 311 are pushed out of the cut sheet of reinforcing material, exposing their side 317, and leaving behind a lattice of reinforcing material 314 filled with resilient elements.

Figure 102:
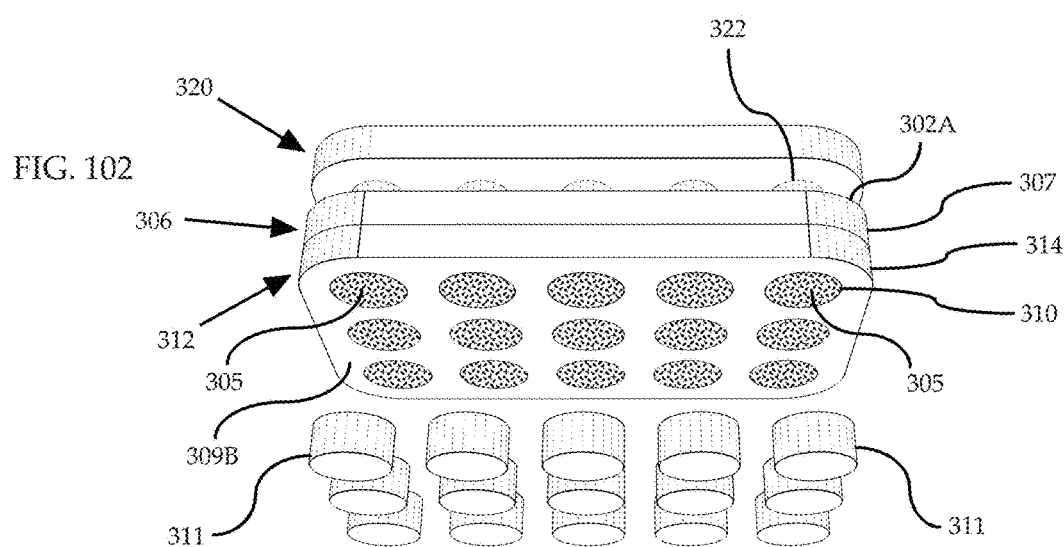
FIG. 102 is a side perspective view of a pusher pressed against a cut sheet of resilient material next to a lattice of reinforcing material, where the resilient elements have been pressed, pushed, or punched, dislodging and replacing the reinforcing elements, forming a resilient material assembly.
Figure 109A:
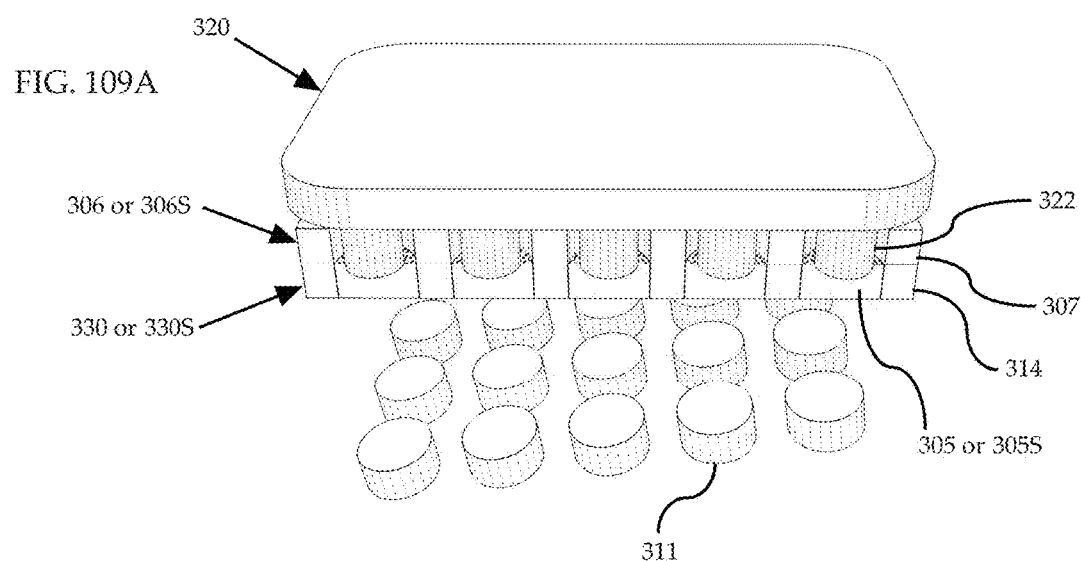
FIG. 109A is a side partial cutaway view of the pusher pressed against a cut sheet of resilient material next to a lattice of reinforcing material, where the resilient elements have been pressed, pushed, or punched, dislodging and replacing the reinforcing elements, forming a resilient material assembly.

FIGS. 102 and 109A depict resilient elements (such as resilient element 305, or resilient element 305S) completely "transferred" to the cut sheet of reinforcing material 312, and occupying the hole or space in the lattice of reinforcing material 314 previously occupied by reinforcing elements 311, forming a resilient material assembly (namely, resilient material assembly 330, or resilient material assembly 330S). It is understood that the reinforcing elements 311 may optionally be discarded as waste.

Figure 109B:
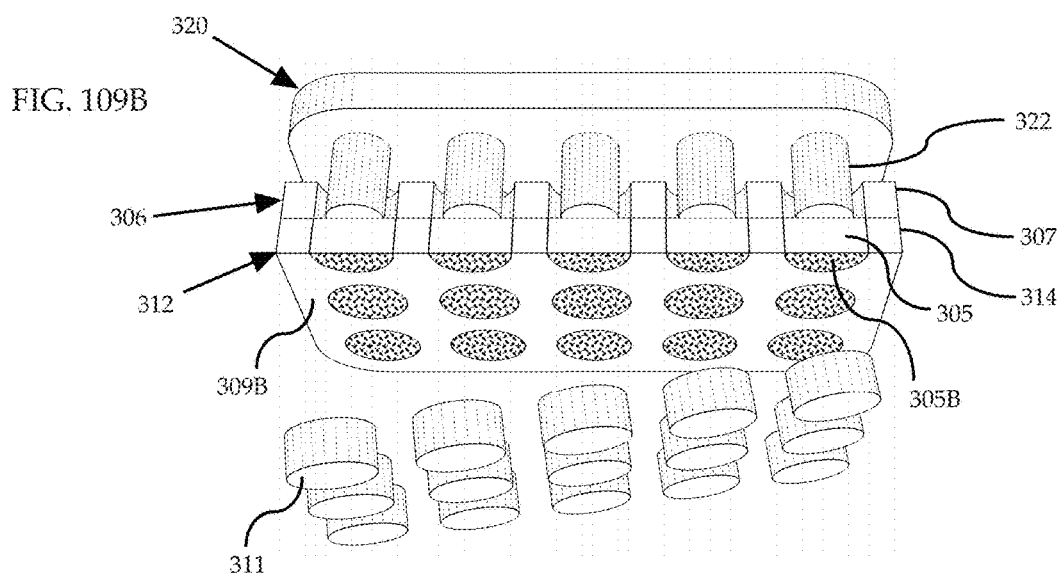
FIG. 109B is a side partial cutaway view of the pusher having completely pressed the resilient elements into the lattice of reinforcing material, dislodging and replacing the reinforcing elements, forming a resilient material assembly, where both the first and second sides are covered with adhesive.

FIG. 109B depict a partial cutaway view of resilient material assembly 330, it being understood that resilient material assembly 330 is comprised of a lattice of reinforcing material 314 filled with resilient elements 305, wherein both first side 305A (not shown in FIG. 109B) and second side 305B (shown in FIG. 109B) of the resilient elements 305 are covered with adhesive.

In yet another aspect of the invention, depicted in FIG. 97A, a cut sheet of resilient material (such as cut sheet of resilient material 306, or singly-bonded cut sheet of resilient material 306S) is optionally stacked over a cut sheet of reinforcing material 312. The entire assembly is optionally placed flat over or against holding tray 325. Holding tray 325 includes a plurality of apertures 326 in locations that match the locations of the reinforcing elements 311 in the cut sheet of reinforcing material 312.

Figure 110:
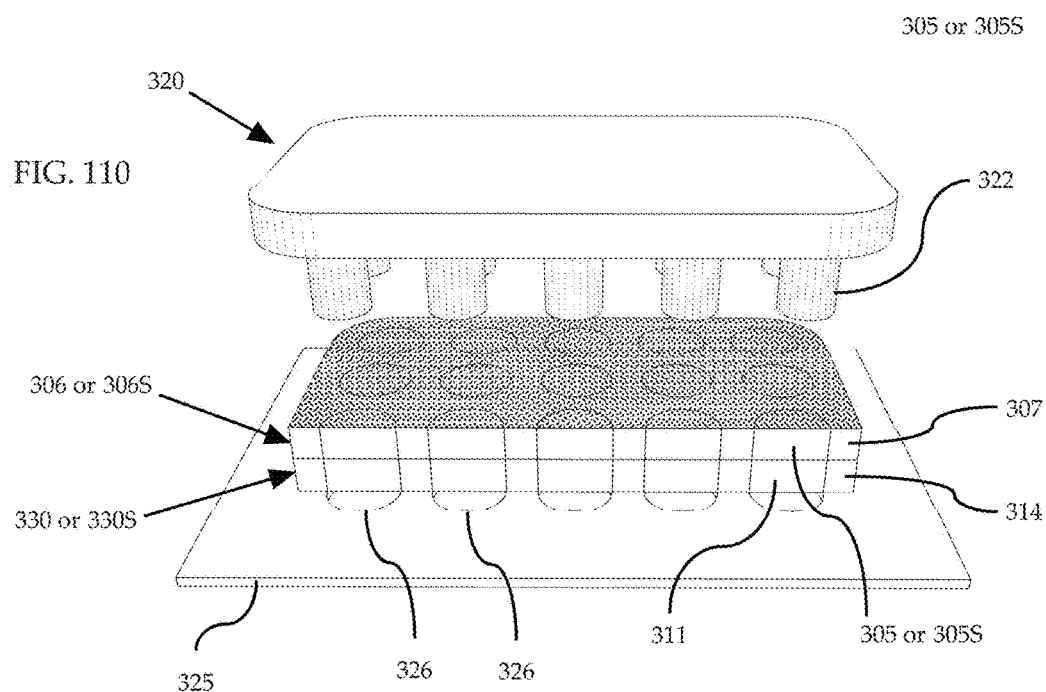
FIG. 110 is a side partial cutaway view of the pusher being positioned above a cut sheet of resilient material, where a holding tray supports, holds, and stabilizes the assembly.
Figure 111:
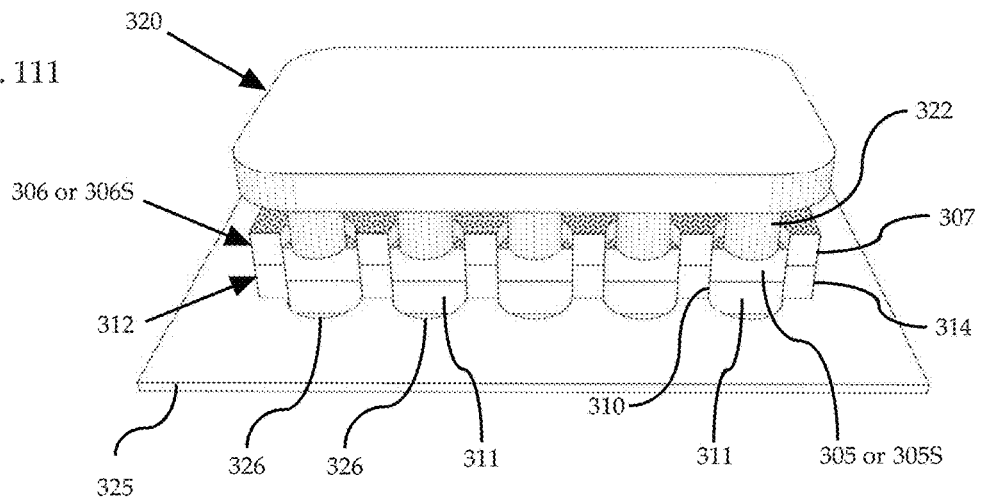
FIG. 111 is a side partial cutaway view of the pusher as it presses against a cut sheet of resilient material next to a cut sheet of reinforcing material, such that the resilient elements dislodge and replace the reinforcing elements, where a holding tray supports, holds, and stabilizes the assembly

As depicted in FIGS. 110-111, pusher 320 is positioned next to the cut sheet of resilient material (such as cut sheet of resilient material 306, or singly-bonded cut sheet of resilient material 306S), so that pushing surfaces 322B of the push elements 322 face the cut sheet of resilient material, as shown in the partial cutaway views in FIG. 110.

Figure 112A:
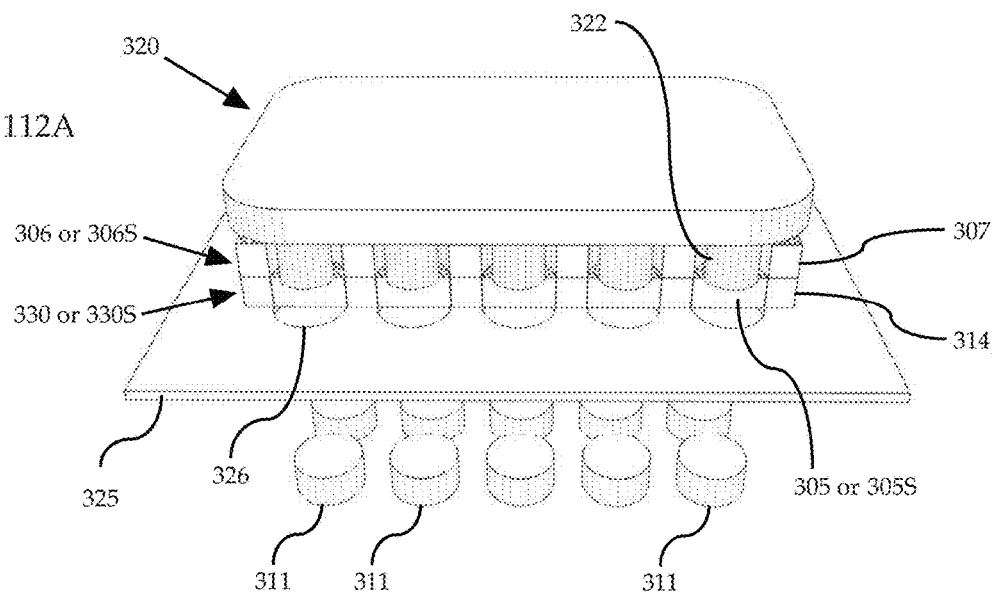
FIG. 112A is a side partial cutaway view of the pusher having completely pressed the resilient elements into the lattice of reinforcing material, dislodging and replacing the reinforcing elements, forming a resilient material assembly, where a holding tray supports, holds, and stabilizes the assembly.

As depicted in FIGS. 111-112A, pusher 320 is pushed against the cut sheet of resilient material (such as cut sheet of resilient material 306, or singly-bonded cut sheet of resilient material 306S), so that push elements 322 in pusher 320 contact the corresponding resilient elements (such as resilient elements 305, or resilient elements 305S) embedded in the cut sheet of resilient material. It is understood that holding tray 325 supports and holds, and stabilizes, the assembly during the pressing operation by means of pusher 320.

Figure 112B:
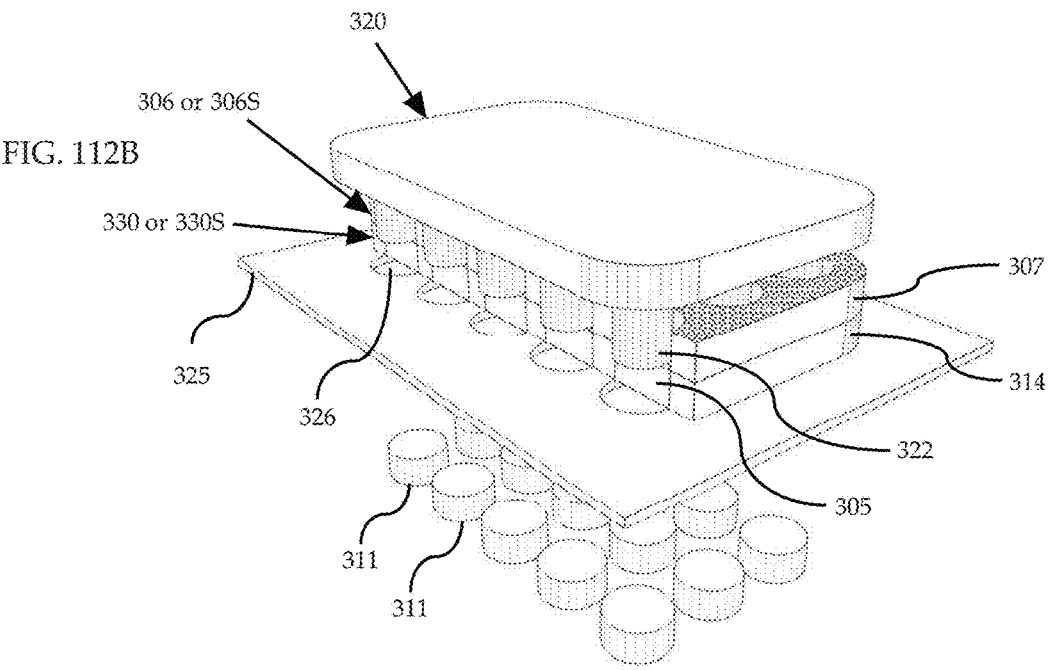
FIG. 112B is a perspective partial cutaway view of the pusher having completely pressed the resilient elements into the lattice of reinforcing material, dislodging and replacing the reinforcing elements, forming a resilient material assembly, where a holding tray supports, holds, and stabilizes the assembly.

As depicted in the partial cutaway views in FIGS. 112A-112B, as the push elements 322 press against the plurality of spaced apart resilient elements (such as resilient element 305, or resilient element 305S) embedded in the cut sheet of resilient material (such as cut sheet of resilient material 306, or singly-bonded cut sheet of resilient material 306S), the push elements 322 dislodge and push the resilient elements out of the cut sheet of resilient material, causing them to move towards the cut sheet of reinforcing material 312.

It is understood that the cut sheet of resilient material and the cut sheet of reinforcing material 312 are positioned in relation to each other in such a manner that the individual resilient elements embedded in the cut sheet of resilient material are aligned with the apertures in the reinforcing material 312 defined by cutting lines 310, as depicted in the cutaway views in FIGS. 110-111.

As depicted in FIGS. 111-112A, the resilient elements (such as resilient element 305, or resilient element 305S) are dislodged and pushed out from the cut sheet of resilient material (such as cut sheet of resilient material 306, or singly-bonded cut sheet of resilient material 306S) and travel towards the cut sheet of reinforcing material 312. The same resilient elements in turn push and dislodge the plurality of reinforcing elements 311 (defined by cutting lines 310) that are embedded in the cut sheet of reinforcing material 312.

As depicted in FIGS. 112A-112B, as the plurality of reinforcing elements 311 are dislodged and displaced from the cut sheet of reinforcing material 312 by the resilient elements (such as resilient element 305, or resilient element 305S), the reinforcing elements are pushed out of the cut sheet of reinforcing material, leaving behind a resilient material assembly (such as resilient material assembly 330, or resilient material assembly 330S), comprised of a lattice of reinforcing material 314 filled with resilient elements.

Upon completion of the pressing operation by means of pusher 320, reinforcing elements 311 are separated from the cut sheet of reinforcing material 312, and may fall or slide through, or be pressed through, the apertures 326 in the holding tray 325, as depicted in FIGS. 112A-112B. The reinforcing elements may optionally be discarded thereafter.

By way of clarification, it is understood that resilient material assembly 330 and resilient material assembly 330S are non-limiting examples of resilient material assembly 70. Resilient material assembly 330 and resilient material assembly 330S may optionally be processed further as described herein.

Third Non-Limiting Example of the First Process for Assembling Composite Pads, without Using a Jig or Die FIGS. 113-117 depict yet another optional and alternative non-limiting example of the process for making resilient material assembly (such as resilient material assembly 330, or resilient material assembly 330S) without using a die, a jig, or a holding tray.

As depicted in FIG. 113, cut sheet of reinforcing material 312 is stacked above a cut sheet of resilient material (such as cut sheet of resilient material 306, or singly-bonded cut sheet of resilient material 306S). Pusher 320 is positioned with the push elements 322 facing the stack of assembled components. The stacked assembly, comprised of the cut sheet of reinforcing material and the cut sheet of resilient material, is positioned in relation to pusher 320, so that individual push elements 322 in pusher 320 are facing the individual cut resilient elements (such as resilient element 305, or resilient element 305S) embedded in the cut sheet of resilient material.

As depicted in FIGS. 114A and 116A, push elements 322 in pusher 320 is made to push out the resilient elements (such as resilient element 305, or resilient element 305S) and "transfer" them from the cut sheet of resilient material (such as cut sheet of resilient material 306, or singly-bonded cut sheet of resilient material 306S) into the cut sheet of reinforcing material 312, to form resilient material assembly 330.

In this embodiment of the invention, pusher 320 may optionally be pressed against the stack of assembled components (comprised of the cut sheet of reinforcing material stacked above the cut sheet of resilient material) while the lattice of reinforcing material 314 and excess resilient material 307 are held immobile, such that push elements 322 in pusher 320 dislodge and push out the resilient elements into the cut sheet of reinforcing material 312; or, alternatively, the stack of assembled components may optionally be pressed against pusher 320 while pusher 320 is held immobile, such that push elements 322 in pusher 320 dislodge and push out the resilient elements into the cut sheet of reinforcing material 312.

In a more preferred embodiment of the invention, the stack of assembled components is pressed against pusher 320, by applying pressure to the surface of the lattice of reinforcing material 314 in the direction of pusher 320. This is done without pressing or blocking the reinforcing elements 311, so that they may be displaced by the resilient elements (such as resilient element 305, or resilient element 305S) and pushed out of the lattice of reinforcing material 314, as depicted in FIGS. 116A-116B.

Figure 117:
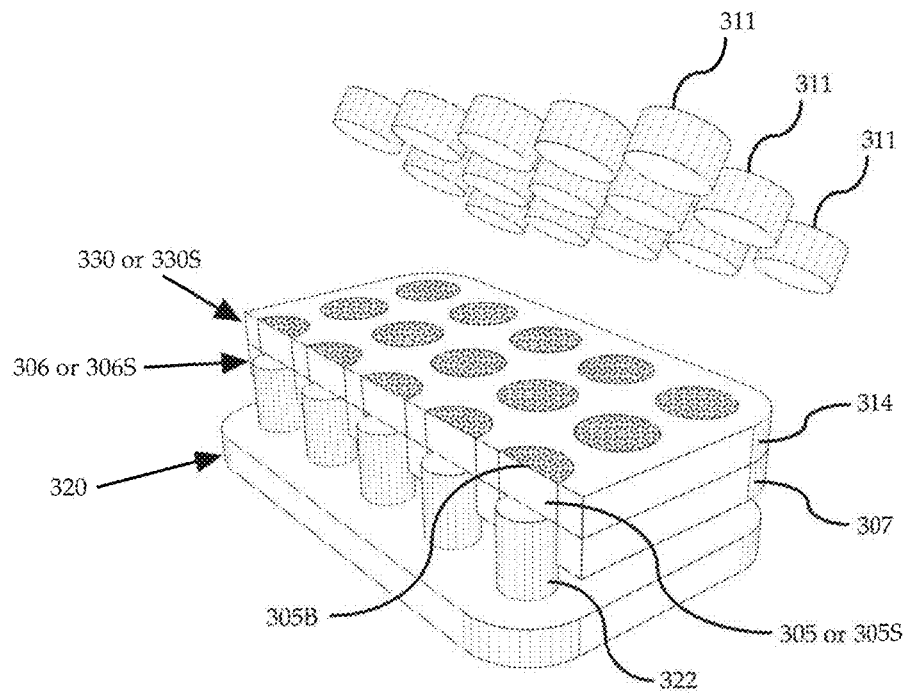
FIG. 117 is a perspective partial cutaway view of the pusher after it has completely pressed against a cut sheet of resilient material next to a cut sheet of reinforcing material, such that the resilient elements have dislodged and replaced the reinforcing elements, so that the reinforcing elements might be removed and optionally discarded.

Once the resilient elements (such as resilient element 305, or resilient element 305S) have dislodged and displaced the reinforcing elements 311, as depicted in FIGS. 115 and 117, and the reinforcing elements 311 have fully separated from the lattice of reinforcing material 314, the reinforcing elements 311 may be removed and optionally discarded.

These steps may be employed to make resilient material assembly, such as resilient material assembly 330 depicted in FIGS. 118-120, or resilient material assembly 330S. It is understood that resilient material assembly 330 is comprised of a plurality of spaced apart resilient elements 305, embedded or contained within the lattice of reinforcing material 314, as depicted in FIGS. 118-119. It is also understood that the opposing surfaces of the resilient elements 305 (namely, first side 305A and second side 305B) are covered with adhesive 303, while the opposing surfaces of the lattice of reinforcing material 314 (namely, first side 309A and second side 309B) are not covered with adhesive 303.

It is further understood that resilient material assembly 330S is identical or equivalent to resilient material assembly 330, except that resilient elements 305S in resilient material assembly 330S are coated with adhesive 303 only on one side, while resilient elements 305 in resilient material assembly 330 are coated with adhesive 303 on two opposing sides.

It is understood that resilient material assembly 330 and resilient material assembly 330S are non-limiting examples of resilient material assembly 70. Resilient material assembly 330 and resilient material assembly 330S may optionally be processed further as described herein.

Non-Limiting Examples of the Process of Lamination of Fabric or Mesh Substrate Material, and Resulting Composite Pads and Pad Materials FIGS. 121-151B depict optional, non-limiting examples of another aspect of the first process for making composite pads, comprised of the step of laminating or bonding one or two sheets of fabric or mesh material to a plurality of resilient elements using a resilient material assembly, and various optional and alternative examples of resulting composite pads, with no reinforcement and full reinforcement.

Non-Limiting Examples of Composite Materials without Reinforcing Frame

FIG. 121 depicts a resilient material assembly (such as resilient material assembly 330 depicted in FIG. 121, or resilient material assembly 330S) being positioned next to a substrate, such as first substrate 331.

It is understood that first substrate 331 is a non-limiting example of the first sheet of fabric or mesh material 78. In a more preferred embodiment of the invention, first substrate 331 is optionally comprised of a sheet of synthetic, non-woven fabric such as polyester or nylon. However, it is understood that, optionally, first substrate 331 may be comprised of a sheet or layer of any other suitable material, including, without limitation, natural or synthetic fabric, mesh, flexible or pliable plastic, neoprene, natural leather, synthetic leather, or a sheet of synthetic fiber, or a combination of such materials. Furthermore, first substrate 331 may also be optionally made of foam, plastic, latex, silicone, rubber, other rubber-like materials, elastomer, and so forth, including any combination of such materials. By way of example only, and without limitations, first substrate 331 may optionally be comprised of sheets of any such materials encased in, or "sandwiched" between, sheets of natural or synthetic fabric bonded to one another.

Figure 122:
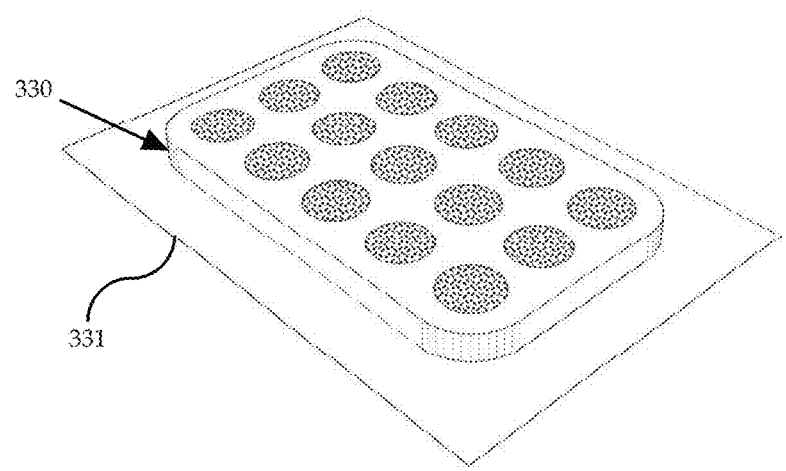
FIG. 122 is a perspective view of resilient material assembly positioned next to, and in contact with, first substrate.

FIGS. 121-122 depict the resilient material assembly 330 placed next to first substrate 331 and made to contact the same. Resilient material assembly 330 is positioned so that one of the sides of each resilient element 305 covered with adhesive 303 makes contact with first substrate 331. It is understood that first substrate 331 may be laid out, optionally, over or under resilient material assembly 330.

The assembled components comprised of resilient material assembly 330 laid out over or under first substrate 331 is placed between a resilient work surface (such as, by way of example only, work surface 114, or the surfaces depicted in FIGS. 28, 32, and 35) and heat platen 76, so that first substrate 331 faces heat platen 76, and resilient material assembly 330 faces the resilient work surface.

It is understood that if adhesive 303 applied over the resilient elements 305 is not heat-activated, the heat platen 76 is not necessary and may be substituted with a pressure plate.

The assembled components are pressed or heat-pressed by compressing them between the work surface and heat platen 76, until the surfaces of the individual resilient elements 305 and the surface of the lattice of reinforcing material 314 that face the first substrate 331 make contact with first substrate 331.

As depicted in FIG. 122, pressure (if adhesive 303 is not heat-activated), or heat and pressure (if adhesive 303 is heat-activated), applied to the assembly cause the resilient elements 305 embedded in the resilient material assembly 330 to bond or adhere to first substrate 331.

By way of clarification, it is understood that during this pressing or heat-pressing operation, resilient material assembly 330 is compressed along with all of its components (namely, a plurality of resilient elements 305 and the lattice of reinforcing material 314), and that no portion of the resilient elements 305, or the combination of resilient elements 305 and adhesive 303, stands proud above the surface of the lattice of reinforcing material 314 during the pressing or heat-pressing operation, when the lamination of the first substrate 331 to the resilient elements 305 takes place, and the resilient elements 305 bond to the first substrate 331.

Figure 123:
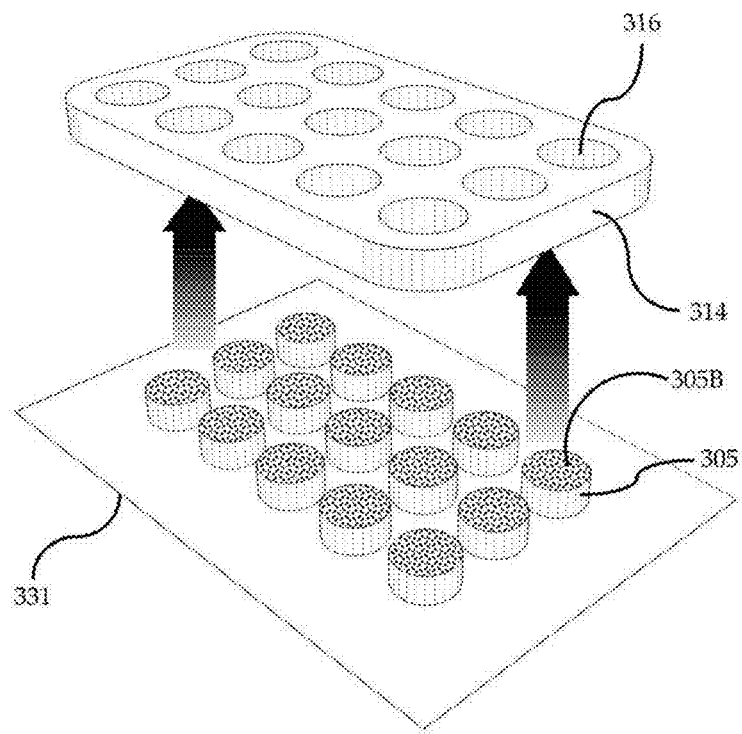

As depicted in FIG. 123, after resilient elements 305 have bonded or adhered to first substrate 331, the lattice of reinforcing material 314 is extracted and removed from the assembly, leaving behind a plurality of spaced apart resilient elements 305 bonded to first substrate 331. The lattice of reinforcing material 314, which includes holes 316 previously occupied by the resilient elements 305, may be reused or, optionally, discarded as waste material.

It is understood that resilient elements 305 bond to first substrate 331, because the resilient elements have adhesive 303 applied to one or more of its opposing sides, such as first side 305A (not shown in FIG. 123), and second side 305B (shown in FIG. 123). In contrast, the lattice of reinforcing material 314 does not bond to first substrate 331, because the lattice of reinforcing material does not have adhesive 303 applied to its sides.

Figure 124A:
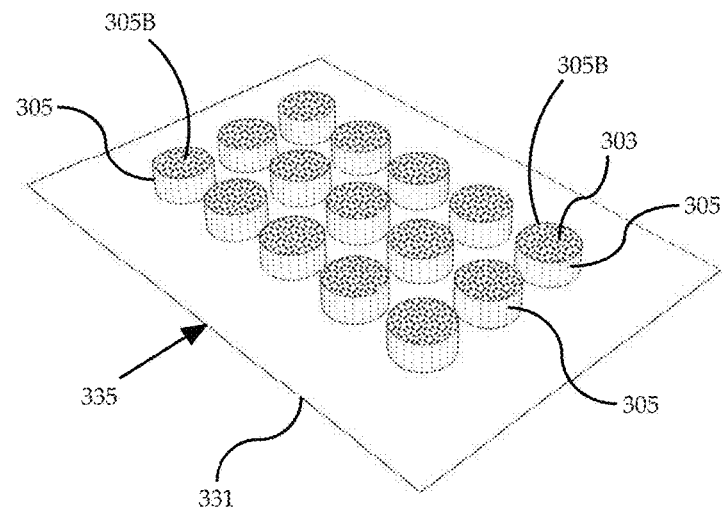
Figure 134:
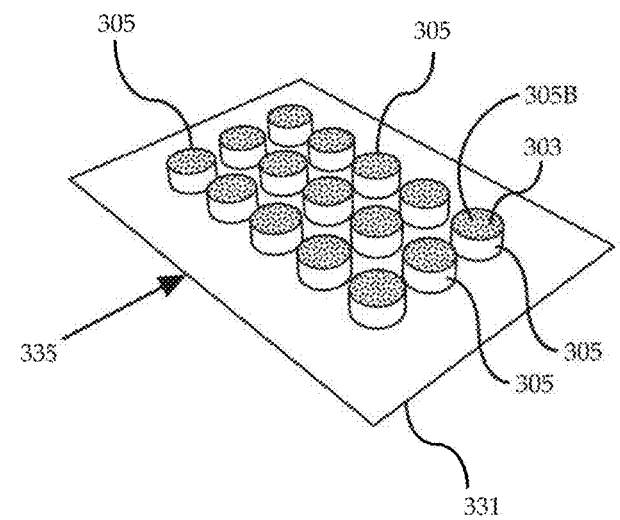

The resulting composite material shown in FIGS. 124A and 134, comprised of a plurality of spaced apart resilient elements 305 adhered or bonded to first substrate 331, is single substrate layer composite material 335. It is understood that single substrate layer composite material 335 is a non-limiting example of the second composite material 82.

Figure 124B:
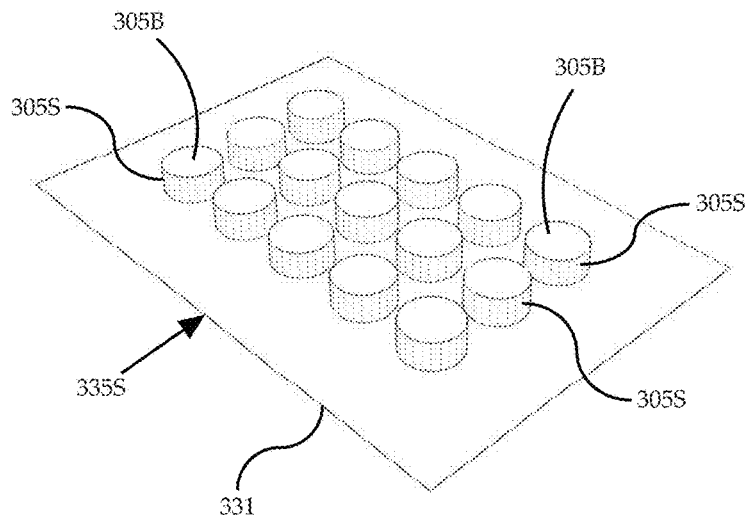
Figure 125:
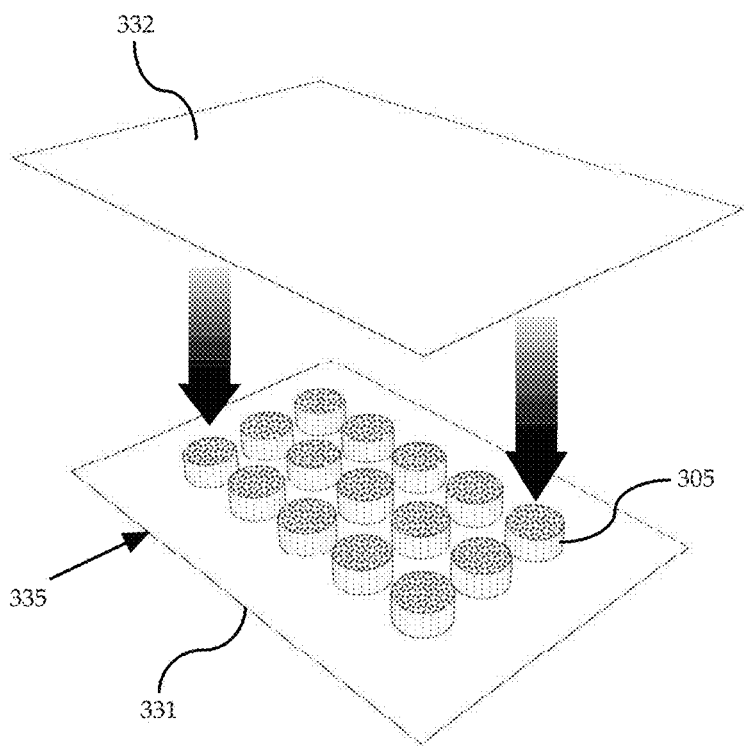

In another optional aspect of the invention, resilient material assembly 330S may be employed in place of resilient material assembly 330, to make alternative single substrate layer composite material 335S, depicted in FIG. 124B. It is understood that in alternative single substrate layer composite material 335S, the resilient elements 305S are covered with adhesive 303 on only one of its opposing sides (such as first side 305A), and that adhesive 303 is not applied to the other side (such as second side 305B), as shown in FIG. 124B.

Single substrate layer composite material 335 and alternative single substrate layer composite material 335S may be used as a protective cushioning pad. Optionally, composite material 335 and composite material 335S may be cut into different shapes and dimensions, for use as padding components or cushioning material, or attached to or incorporated into cushioning gear, protective equipment, clothing, or footwear.

Figure 126:
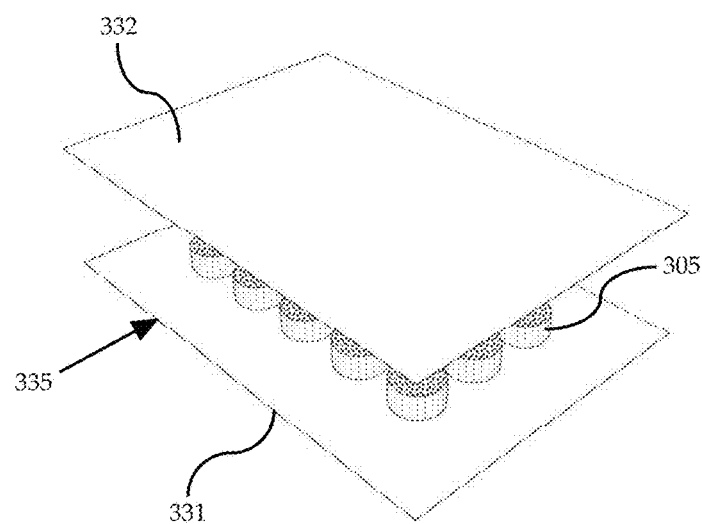
Figure 127:
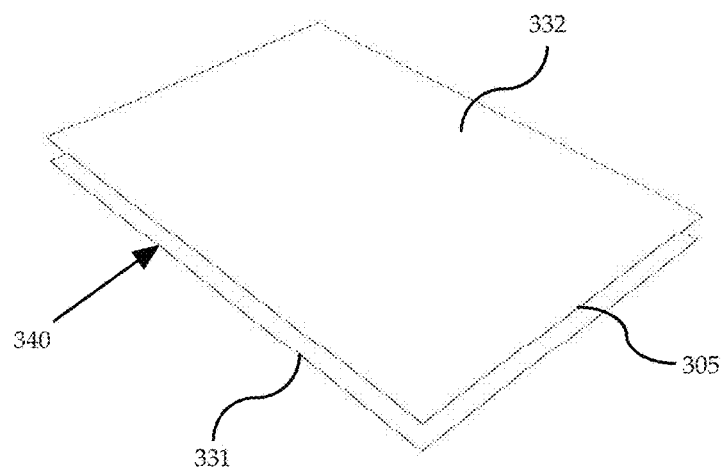
Figure 128:
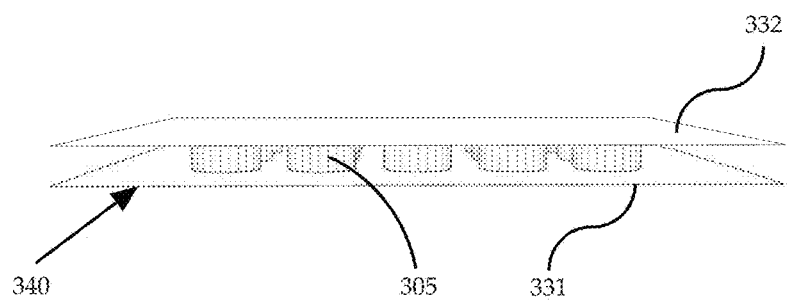
Figure 129:
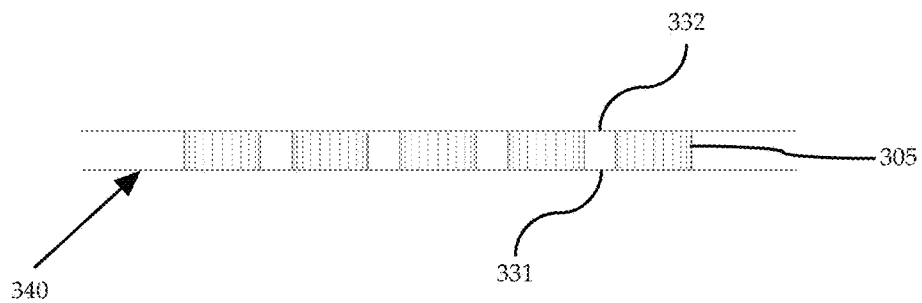

Alternatively, and optionally, single substrate layer composite material 335 may be laminated with or bonded to a second substrate, such as second substrate 332 depicted in FIGS. 126 and 135, using the same pressing or heat-pressing process, to make dual substrate layer composite material 340 depicted in FIGS. 127-128 and 136A-137B. It is understood that the resulting dual substrate layer composite material 340 is a non-limiting example of the third composite material 84.

With respect to this embodiment of the invention, it is understood that second substrate 332 is a non-limiting example of the second sheet of fabric or mesh material 86. In a more preferred embodiment of the invention, second substrate 332 is optionally comprised of a sheet of synthetic, non-woven fabric such as polyester or nylon. However, it is understood that, optionally, second substrate 332 may be comprised of a sheet or layer of any suitable material, including, without limitation, natural or synthetic fabric, mesh, flexible or pliable plastic, neoprene, natural leather, synthetic leather, or a sheet of synthetic fiber, or a combination of such materials. Furthermore, second substrate 332 may also be optionally made of foam, plastic, latex, silicone, rubber, other rubber-like materials, elastomer, and so forth, including any combination of such materials. By way of example only, and without limitations, second substrate 332 may optionally be comprised of sheets of any such materials encased in, or "sandwiched" between, sheets of natural or synthetic fabric bonded to one another.

It is also understood that the composition of second substrate 332 may be comprised of the same or different materials as first substrate 331, and may have different thickness, shape, or dimension in relation to first substrate 331.

FIGS. 126 and 135 depicts second substrate 332 laid out over or under single substrate layer composite material 335, so that the plurality of spaced apart resilient elements 305 (which are bound to first substrate 331) are "sandwiched" between first substrate 331 and second substrate 332. The assembled components are placed between a resilient work surface and heat platen 76, so that second substrate 332 faces heat platen 76.

The assembled components are pressed or heat-pressed by compressing them between the work surface and heat platen 76, so that the exposed surfaces of the resilient elements 305 contact with second substrate 332. Pressure (if adhesive 303 is not heat-activated), or heat and pressure (if adhesive 303 is heat-activated) applied to the assembly cause the resilient elements 305 to bond or adhere to second substrate 332, forming dual substrate layer composite material 340, depicted in FIGS. 127-129 and FIGS. 136A-137B.

Dual substrate layer composite material 340 may be used as a protective cushioning pad, or optionally be cut into different shapes and dimensions, for use as padding components or cushioning material, or attached to or incorporated into cushioning gear, or protective equipment or clothing.

Figure 130:
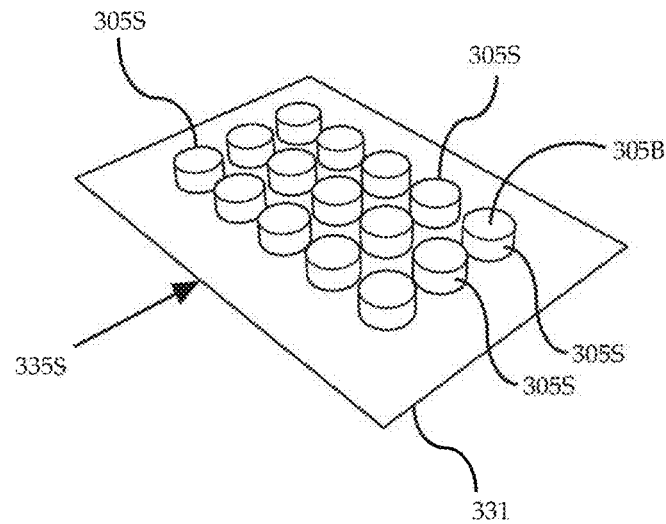
Figure 131:
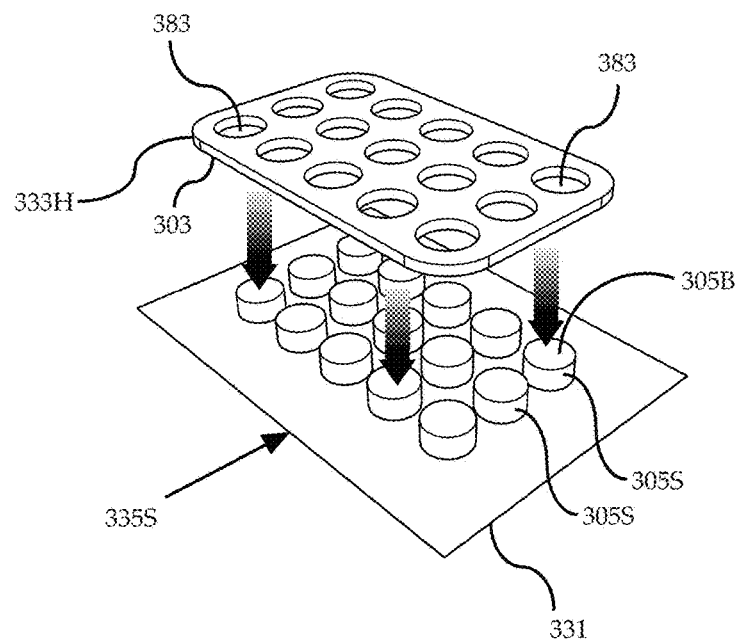
Figure 132:
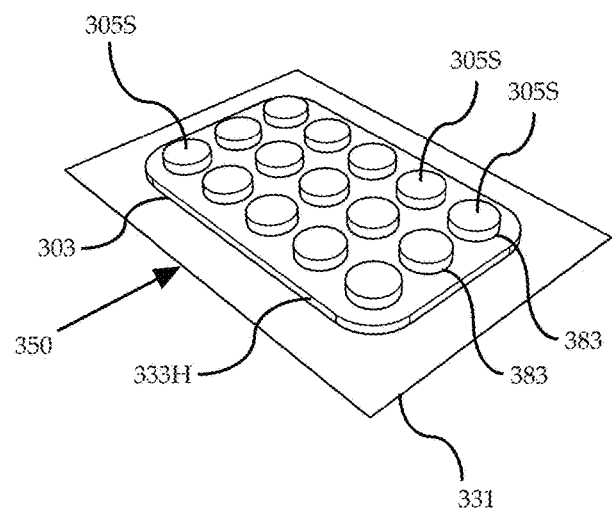
Figure 133:
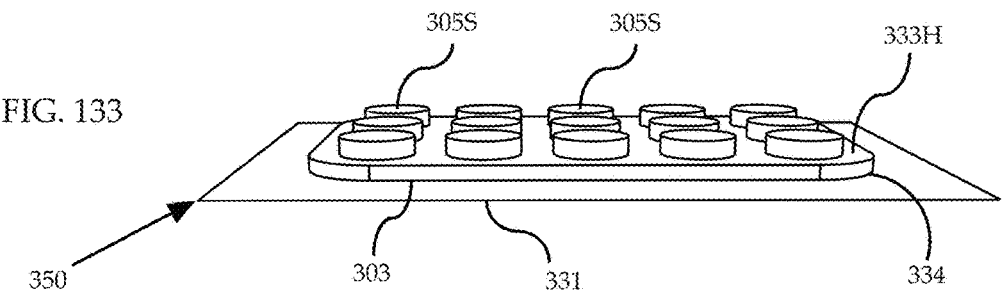

Non-Limiting Example of Composite Materials with Reinforcing Lattice Material and Single Substrate Layer Additionally, and optionally, alternative single substrate layer composite material 335S may be processed further, as depicted in FIGS. 130-133, using the same pressing or heat-pressing process, to make seventh composite material 350 depicted in FIGS. 132-133. It is understood that seventh composite material 350 is an alternative embodiment of the invention and a variation of the first composite material 80.

FIG. 130 depicts alternative single substrate layer composite material 335S, comprised of a plurality of spaced apart resilient elements 305S bonded to first substrate 331. It is understood that resilient elements 305S are covered with adhesive 303 on only one of its opposing sides. By way of example only, and as depicted in FIGS. 124B and 130, adhesive 303 is not applied to second side 305B of the resilient elements.

As depicted in FIG. 131, a reinforcing material lattice 333H is positioned next to alternative single substrate layer composite material 335S, so that reinforcing material lattice 333H faces the resilient elements 305S bonded to first substrate 331. Reinforcing material lattice 333H includes a plurality of apertures or holes 383. Holes 383 are positioned in relation to each other, and in relation to the plurality of resilient elements 305S, so that each hole is aligned with a corresponding resilient element bonded to first substrate 331. Holes 383 are sized so that they may accept the corresponding resilient elements 305S, and so that the resilient elements may be inserted into the holes.

As depicted in FIGS. 131-132, reinforcing material lattice 333H is pressed in the direction of the dashed arrows, against alternative single substrate layer composite material 335S, until resilient elements 305S (which are bonded to first substrate 331) engage the corresponding holes 383 in the reinforcing material lattice 333H, and reinforcing material lattice 333H makes contact with first substrate 331.

It is understood that reinforcing material lattice 333H is coated with an adhesive (such as, by way of example only and without limitations, adhesive 303) on at least one of its sides. In this optional embodiment of the invention, it is understood that the surface of reinforcing material lattice 333H that faces and contacts the first substrate 331, as depicted in FIG. 132, is coated with an adhesive.

The assembled components are placed on a work surface and pressed or heat-pressed by compressing them between the work surface and heat platen 76, until the surface of the reinforcing material lattice 333H that faces the first substrate 331 contacts the first substrate 331 and is pressed against the same. As depicted in FIG. 133, in this embodiment of the invention there is no space 334 between reinforcing material lattice 333H and first substrate 331.

Depending on the adhesive coating the reinforcing material lattice 333H, pressure (if the adhesive is not heat-activated), or heat and pressure (if the adhesive is heat-activated) applied to the assembly cause reinforcing material lattice 333H to bond or adhere to first substrate 331, forming seventh composite material 350 depicted in FIGS. 132-133.

It is understood that seventh composite material 350 may be used as a protective cushioning pad, or optionally be cut into different shapes and dimensions, for use as padding components or cushioning material, or attached to or incorporated into cushioning gear, or protective equipment or clothing.

Reinforcing material lattice 333H may be fabricated from scratch according to the general steps for cutting and marking the lattice of reinforcing material 314, or the first lattice of reinforcing material 52.

Optionally, and alternatively, the steps for making the reinforcing material lattice 333H may include the following steps: A suitable sheet of base reinforcing material 380 may be selected, as depicted in FIG. 148. It is understood that base reinforcing material 380 is another non-limiting example of reinforcing material 47.

It is also understood that, optionally, the composition of the base reinforcing material 380 (and reinforcing material 47) may include, without limitation, foam, neoprene, natural leather, synthetic leather, plastic, or rubber (including without limitation, latex and silicone, synthetic fabric, and so forth and any combination of such materials).

By way of example only, and without limitations, base reinforcing material 380 (and reinforcing material 47) may optionally be comprised of a sheet of EVA foam, PU foam, olefin or polyolefin based foam, or thermoplastic Optionally, base reinforcing material 380 (and reinforcing material 47) may alternatively be comprised of a sheet of one type of material glued to another sheet of a different type of material. For example, base reinforcing material 380 may be comprised of a sheet of a EVA foam glued to a sheet of synthetic fabric, or a sheet of rubber or elastomer glued to one or more sheets of synthetic or natural leather. The invention is intended to include all conceivable variations, combinations, and permutations on the composition of the sheeting materials, the number of sheets or layers, and the order or sequence of the sheets or layers included in the base reinforcing material 380 (and reinforcing material 47), without limitations.

It is further understood that the composition of the base reinforcing material 380 (and reinforcing material 47) may optionally be comprised of the same or different material from resilient material 301, may have a different thickness from the sheet of resilient material, may include the same or different material from the resilient material, and may have the same or different functional properties from the resilient material.

As depicted in FIG. 149, base reinforcing material 380 is cut along cutting lines 381.

As depicted in FIGS. 149-150, cutting lines 381 define and separate a plurality of spaced apart reinforcing elements 382 from an uncoated reinforcing material lattice 333.

As depicted in FIGS. 150-151A, reinforcing elements 382 are extracted and removed from base reinforcing material 380, leaving behind uncoated reinforcing material lattice 333 with a plurality of spaced apart apertures or holes 383, where the reinforcing elements used to be located.

FIG. 151A depicts the resulting uncoated reinforcing material lattice 333. It is understood that the uncoated reinforcing material lattice 333 depicted in FIG. 151A is not covered by adhesive on its sides.

In another aspect of the invention, a suitable adhesive (such as adhesive 303) may be applied to one or more sides of the base reinforcing material 380 prior to the cutting, to make reinforcing material lattice 333H depicted in FIG. 151B. It is understood that the resulting reinforcing material lattice 333H is coated on one or more of its sides with an adhesive.

Alternatively, and optionally, uncoated reinforcing material lattice 333 may be coated with a suitable adhesive before or after the extraction or removal of reinforcing elements 382, to make the reinforcing material lattice 333H.

Non-Limiting Example of Composite Materials with ReInforcing Lattice Material and Dual Substrate Layer In another aspect of the invention, single substrate layer composite material 335 may optionally be processed further, as depicted in FIG. 134 and FIGS. 138-141, using the pressing or heat-pressing processes disclosed herein, to make a composite material including two substrate layers and a lattice, or "frame," of reinforcing material, namely eighth composite material 360 depicted in FIGS. 142A-143B. It is understood that eighth composite material 360 is an alternative embodiment of the invention and a variation of the fifth composite material 92.

FIG. 134 depicts single substrate layer composite material 335, comprised of a plurality of spaced apart resilient elements 305 bonded to first substrate 331. It is understood that resilient elements 305 are covered with adhesive 303 on its opposing sides. By way of example only, and as depicted in FIG. 134, adhesive 303 is applied to first side 305A (obscured in FIG. 134) of the resilient elements that contacts first substrate 331, and to second side 305B (shown in FIG. 134).

It is understood that, single substrate layer composite material 335 may be laminated with second substrate 332, so that resilient elements are "sandwiched" between two substrate layers without a lattice of reinforcing material, as depicted in FIG. 135-137B.

However, in an alternative and optional embodiment of the invention, reinforcing material lattice 333H is positioned next to single substrate layer composite material 335, so that reinforcing material lattice 333H faces the resilient elements 305 bonded to first substrate 331. Reinforcing material lattice 333H includes a plurality of apertures or holes 383. Holes 383 are positioned in relation to each other, and in relation to the plurality of resilient elements 305, so that each hole is aligned with a corresponding resilient element bonded to first substrate 331. Holes 383 are sized so that they may accept the corresponding resilient elements 305, and so that the resilient elements may be inserted into the holes.

As depicted in FIGS. 138-139, reinforcing material lattice 333H is pressed in the direction of the dashed arrows, against single substrate layer composite material 335, until resilient elements 305 (which are bonded to first substrate 331) engage the corresponding holes 383 in the reinforcing material lattice 333H, and reinforcing material lattice 333H makes contact with first substrate 331.

It is understood that reinforcing material lattice 333H is coated with an adhesive (such as, by way of example only and without limitations, adhesive 303) on at least one of its sides. It is also understood that, in this embodiment of the invention, the surface of reinforcing material lattice 333H that faces and contacts the first substrate 331, as depicted in FIG. 139, is coated with the adhesive. It is further understood that, optionally, the opposite side of the reinforcing material lattice 333H (that may face and contact a second substrate, such as second substrate 332) may also be coated with an adhesive.

The assembled components shown in FIG. 140 are placed on a work surface and pressed or heat-pressed by compressing them between the work surface and heat platen 76, until the surface of the reinforcing material lattice 333H that faces the first substrate 331 contacts the first substrate 331 and is pressed against the same. As depicted in FIG. 140, in this embodiment of the invention there is no space 334 between reinforcing material lattice 333H and first substrate 331.

As depicted in FIG. 141, second substrate 332 is laid out over or under single substrate layer composite material 335, so that the plurality of spaced apart resilient elements 305

(which are bound to first substrate 331) are "sandwiched" between first substrate 331 and second substrate 332. The assembled components are placed between a resilient work surface and heat platen 76, so that the outer surface of second substrate 332 faces heat platen 76.

The assembled components shown in FIG. 141 are pressed or heat-pressed by compressing them between the work surface and heat platen 76, so that the exposed surfaces of the resilient elements 305 (coated with adhesive 303) contact second substrate 332. Pressure (if adhesive 303 is not heat-activated), or heat and pressure (if adhesive 303 is heat-activated) applied to the assembly cause the resilient elements 305 to bond or adhere to second substrate 332, forming eighth composite material 360, depicted in FIGS. 142A-143B. As depicted in the partial lateral cutaway view in FIG. 143B, in this embodiment of the invention there is no space 334 between reinforcing material lattice 333H and the first substrate 331, as reinforcing material lattice 333H is bonded to the first substrate 331.

It is understood that, alternatively and optionally, second substrate 332 may be laid out over or under the assembled components shown in FIGS. 138-139, comprised of single substrate layer composite material 335, and the reinforcing material lattice 333H engaged to the resilient elements 305 but not yet bonded to the first substrate 331. It is understood that in this aspect of the invention, reinforcing material lattice 333H is positioned so that the surface of the reinforcing material lattice facing second substrate 332 is coated with an adhesive (such as adhesive 303). Optionally, the entire assembly may be placed on a work surface and pressed or heat-pressed in a single step operation, by compressing the assembly between the work surface and heat platen 76, until the surface of the reinforcing material lattice 333H that faces the second substrate 332 contacts the second substrate 332 and is pressed against the same, and the second substrate 332 contacts the resilient elements 305 and is pressed against the same.

Pressure, or heat and pressure, is applied to the assembly, causing the reinforcing material lattice 333H to bond or adhere to second substrate 332, and causing the second substrate 332 to bond to the resilient elements 305 in a single step operation, forming eighth composite material 360, depicted in FIGS. 142A-143B.

It is understood that eighth composite material 360 may be used as a protective cushioning pad, or optionally be cut into different shapes and dimensions, for use as padding components or cushioning material, or attached to or incorporated into cushioning gear, or protective equipment or clothing.

Non-Limiting Example of Composite Materials with a Floating Reinforcing Lattice Material and Single Substrate Layer In yet another aspect of the invention, single substrate layer composite material 335 may be processed as depicted in FIGS. 144-146, using the same pressing or heat-pressing processes disclosed herein, to make single substrate layer composite material with frame 365 depicted in FIGS. 145-146, incorporating an uncoated reinforcing material lattice 333 that is not bonded to a substrate. It is understood that single substrate layer composite material with frame 365 is a non-limiting example of the first composite material 80.

FIG. 144 depicts single substrate layer composite material 335, comprised of a plurality of spaced apart resilient elements 305 bonded to first substrate 331. It is understood that in this embodiment of the invention, resilient elements 305 are optionally covered with adhesive 303 on its opposing sides.

As depicted in FIG. 114, uncoated reinforcing material lattice 333 is positioned next to single substrate layer composite material 335, so that uncoated reinforcing material lattice 333 faces the resilient elements 305 bonded to first substrate 331. Uncoated reinforcing material lattice 333 includes a plurality of apertures or holes 383. Holes 383 are positioned in relation to each other, and in relation to the plurality of resilient elements 305, so that each hole is aligned with a corresponding resilient element bonded to first substrate 331. Holes 383 are sized so that they may accept the corresponding resilient elements 305, and so that the resilient elements may be inserted into the holes.

As depicted in FIGS. 144-145, uncoated reinforcing material lattice 333 is pressed in the direction of the dashed arrows, against single substrate layer composite material 335, until resilient elements 305 (which are bonded to first substrate 331) engage the corresponding holes 383 in the uncoated reinforcing material lattice 333.

It is understood that uncoated reinforcing material lattice 333 is not coated with an adhesive, and that in this optional embodiment of the invention, the uncoated reinforcing material lattice does not bond to a substrate, as depicted in FIG. 146. Depending on the size of the holes 383 in relation to the diameter, size, or shape of the resilient elements 305, the thickness of the uncoated reinforcing material lattice 333 in comparison to the height of the resilient elements 305, and the friction coefficient between the components, uncoated reinforcing material lattice 333 may optionally "jiggle" or "float" to a varying extent along the axis perpendicular to the plane of the first substrate 331, optionally creating the gap or space 334.

The resulting single substrate layer composite material with frame 365 is depicted in FIG. 146. It is understood that single substrate layer composite material with frame 365 may be used optionally as a protective cushioning pad, or optionally be cut into different shapes and dimensions, for use as padding components or cushioning material, or attached to or incorporated into cushioning gear, or protective equipment or clothing.

It is also understood that because in the single substrate layer composite material with frame 365, the uncoated reinforcing material lattice 333 is not bonded to the single substrate layer composite material 335, either component (that is, the reinforcing material lattice or the base composite material) may be removed and replaced as suitable. By way of example only, and without limitations, single substrate layer composite material with frame 365 may be used to make configurable protective floor mats, wherein the user can adjust the hardness and cushioning performance of the mats by selecting and installing an uncoated reinforcing material lattice 333 of suitable composition and thickness.

Non-Limiting Example of Composite Materials with a Floating Reinforcing Lattice Material and Dual Substrate Layer Additionally, and optionally, single substrate layer composite material 335 may also be processed as depicted in FIGS. 144-146 and 147A-147C, using the same pressing or heat-pressing processes disclosed herein, to make dual substrate layer composite material with frame 370 depicted in FIGS. 147A-147C, incorporating an uncoated reinforcing material lattice 333 that is not bonded to the substrate. It is understood that dual substrate layer composite material with frame 370 is a non-limiting example of the fifth composite material 92.

In this alternative and optional embodiment of the invention, single substrate layer composite material 335 is processed to form single substrate layer composite material with frame 365 depicted in FIG. 146.

Second substrate 332 is laid out over or under single substrate layer composite material with frame 365, so that the plurality of spaced apart resilient elements 305 (which are bound to first substrate 331), and the uncoated reinforcing material lattice 333 engaged to the resilient elements, are "sandwiched" between first substrate 331 and second substrate 332.

The assembled components are placed between a resilient work surface and heat platen 76, so that the outer surface of second substrate 332 faces heat platen 76.

The assembled components are pressed or heat-pressed by compressing them between the work surface and heat platen 76, so that the exposed surfaces of the resilient elements 305 (coated with adhesive 303) contact second substrate 332. Pressure (if adhesive 303 is not heat-activated), or heat and pressure (if adhesive 303 is heat-activated) applied to the assembly cause the resilient elements 305 to bond or adhere to second substrate 332, forming dual substrate layer composite material with frame 370 depicted in FIGS. 147A-147C.

As depicted in the partial cutaway view in FIG. 147B and in the partial lateral cutaway view in FIG. 147C, in this embodiment of the invention the uncoated reinforcing material lattice 333 is not coated with an adhesive and does not bond to a substrate layer. Depending on the size of the holes 383 in the uncoated reinforcing material lattice 333 in relation to the diameter, size, or shape of the resilient elements 305, the thickness of the uncoated reinforcing material lattice 333 in comparison to the height of the resilient elements 305, and the friction coefficient between the components, uncoated reinforcing material lattice 333 may optionally "jiggle" or "float" to a varying extent along the axis perpendicular to the planes of the first substrate 331 and second substrate 332, optionally creating the gap or space 334. However, it is understood that the "jiggle" or "float" of uncoated reinforcing material lattice 333 is constrained to the height of the resilient elements 305, and bounded by first substrate 331 and second substrate 332.

It is understood that dual substrate layer composite material with frame 370 may be used as a protective cushioning pad, or optionally be cut into different shapes and dimensions, for use as padding components or cushioning material, or attached to or incorporated into cushioning gear, or protective equipment or clothing.

Non-Limiting Examples of Articles that May be Fabricated from Various Composite Materials.

FIGS. 152-159 depict optional, non-limiting examples of articles, such a protective cushioning pad components and footwear sockliners, that may be fabricated from various composite materials disclosed herein, such as, by way of example only, seventh composite material 350, or alternative embodiments of first composite material 80.

Example of a Cushioning Pad Component

FIGS. 152-156 depict a non-limiting example of a cushioning pad 375 comprised of an instance of seventh composite material 350, cut into a suitable shape. This aspect of the invention will be more fully understood from the following description of the invention and the drawings referenced below.

FIG. 152 depicts a non-limiting example of seventh composite material 350. It is understood that seventh composite material 350 is comprised of a plurality of resilient elements 305 that are engaged to apertures in reinforcing material lattice 333 and are bound to first substrate 331, by means of adhesive 303 that covers the surfaces of the resilient elements. It is also understood that in this optional embodiment of the invention, the surface of reinforcing material lattice 333 is also covered by adhesive 303, and that reinforcing material lattice 333 is bonded to first substrate 331 by means of adhesive 303. It is further understood that in this embodiment of the invention, one or more resilient elements 305 have greater thickness than reinforcing material lattice 333.

In a more preferred, but optional, embodiment of the invention, first substrate 331 is comprised of a sheet of non-woven fabric (such as, by way of example only, polyester) or mesh; reinforcing material lattice 333 is comprised of a sheet of neoprene or ethyl vinyl acetate ("EVA") foam; and a plurality of resilient elements 305 is comprised of EVA foam. In this embodiment of the invention, resilient elements 305 are made of an EVA foam material harder or denser than the material comprising reinforcing material lattice 333. Also in this embodiment of the invention, adhesive 303 is a hot-melt adhesive ("HMA") film capable of bonding EVA foam to the material comprising reinforcing material lattice 333.

However, it is understood that, optionally and alternatively, resilient elements 305 may be comprised of materials that have the same or lower hardness or density in relation to the material comprising reinforcing material lattice 333.

As depicted in FIG. 153, seventh composite material 350 is cut into a desirable shape suitable for use as a protective cushioning pad, along cutting line 374, and through layers comprised of first substrate 331, reinforcing material lattice 333, and resilient elements 305, defining protective cushioning pad 375.

As depicted in FIG. 154, protective cushioning pad 375 is separated and extracted from seventh composite material 350, leaving behind a cut out space in excess seventh composite material 376.

FIG. 155 depicts an exploded view of seventh composite material 350 cut along cutting line 374, defining and forming protective cushioning pad 375, and leaving behind excess seventh composite material 376 with a cut out space corresponding to the shape of protective cushioning pad 375.

As depicted in FIG. 155, seventh composite material 350 is cut along cutting line 374, and through its component layers, as follows: First substrate 331 is cut along cutting line 374, defining outer lining 331B of protective cushioning pad 375, apart from excess seventh composite material surface 331A; reinforcing material lattice 333 is also cut along cutting line 374, defining reinforcing frame 333B of protective cushioning pad 375, apart from excess reinforcing material lattice 333A; and, depending on the shape of cutting line 374, one or more resilient elements 305 may also be cut along the cutting line.

FIG. 156 depicts an exploded view of protective cushioning pad 375 and its components in greater detail. In this optional embodiment of the invention, a plurality of resilient elements 305, one or more of which may be intersected and cut by cutting line 374, are engaged into apertures in reinforcing frame 333B. Adhesive 303 is made to cover the surfaces of one or more resilient elements 305 facing outer lining 331B. One or more resilient elements 305 covered with adhesive 303 is bonded to outer lining 331B. Adhesive 303 also covers the surface of reinforcing frame 333B facing outer lining 331B. Reinforcing frame 333B is bonded to outer lining 331B, by means of adhesive 303. As depicted in FIG. 156, it is understood that in this embodiment of the invention, reinforcing frame 333B is "thinner" or have a lower height than one or more resilient elements 305, and that on the side opposite to the side of the assembly laminated by outer lining 331B, the surfaces of one or more resilient elements 305 protrude above the surface of reinforcing frame 333B.

It is understood that in this optional embodiment of the invention, outer lining 331B is comprised of a sheet of non-woven fabric (such as, by way of example only, polyester) or mesh; reinforcing frame 333B is comprised of a sheet of neoprene or EVA foam; and a plurality of resilient elements 305 is comprised of EVA foam. In this optional embodiment of the invention, resilient elements 305 are made of an EVA foam material harder or denser than the material comprising reinforcing frame 333B. It is also understood that adhesive 303 is an HMA film capable of bonding EVA foam to the material comprising reinforcing frame 333B.

However, it is also understood that, optionally and alternatively, resilient elements 305 may be comprised of materials that have the same or lower hardness or density in relation to the material comprising reinforcing frame 333B.

It is understood that protective cushioning pad 375 may optionally be used, by way of example only and without limitations, as protective padding or a component thereof, seat cushion or a component thereof, seating mat or a component thereof, or sewn or attached to garments as protective pads. Protective cushioning pad 375 may also be used as a footwear component, and incorporate into shoe uppers, midsoles, and outsoles. It is further understood that the selection of the materials for the components of protective cushioning pad 375 (such as outer lining 331B, reinforcing frame 333B, resilient elements 305, and adhesive 303), and the shape and dimension of protective cushioning pad 375 and its components, may vary, depending on the intended uses and the desired characteristics of the finished product.

In another optional aspect of the invention, protective cushioning pad 375 may also be comprised of an instance of first composite material 80 cut into a suitable shape, wherein the first lattice of reinforcing material 52 is bonded to a suitably cut instance of first sheet of fabric or mesh material 78, and engages a plurality of resilient elements 138 that are also bonded to the first sheet of fabric or mesh material 78.

In yet another alternative and optional aspect of the invention, protective cushioning pad 375 may be comprised of an instance of eighth composite material 360, cut into a suitable shape. Alternatively, protective cushioning pad 375 may be comprised of an instance of fifth composite material 92 cut into a suitable shape, wherein the first lattice of reinforcing material 52 is bonded to a suitably cut instance of first sheet of fabric or mesh material 78, and engages a plurality of resilient elements 138 that are bonded to the first sheet of fabric or mesh material 78 and the second fabric or mesh sheet 86.

Example of a Footwear Sockliner

FIGS. 157A-157C depict a non-limiting example of a footwear sockliner 390 comprised of an upper lining 391 that faces the foot of the user, structural frame 392 that gives structure and rigidity to the assembly, and cushioning pods 393 that provide additional cushioning and shock protection to the sockliner assembly.

FIGS. 158-159 depict the exploded views of footwear sockliner 390. It is understood that footwear sockliner 390 may be comprised of an instance of seventh composite material 350, cut into a suitable shape. This aspect of the invention will be more fully understood from the following description of the invention and the drawings referenced below.

As depicted in FIGS. 158-159, upper lining 391 of footwear sockliner 390 is optionally comprised of an instance of first substrate 331 (or, alternatively, first sheet of fabric or mesh material 78). In a more preferred, but optional, embodiment of the invention, upper lining 391 is comprised of a sheet of non-woven fabric (such as, by way of example only, polyester), cut into a suitable shape.

Structural frame 392 of footwear sockliner 390 is optionally comprised of an instance of reinforcing material lattice 333 (or, alternatively, first lattice of reinforcing material 52). In a more preferred, but optional, embodiment of the invention, the reinforcing material lattice 333 is comprised of a sheet of ethylene vinyl acetate ("EVA") foam, or other resilient material, cut into a suitable shape that substantially matches the shape of upper lining 391.

Cushioning pods 393 of footwear sockliner 390 is optionally comprised of a plurality of resilient elements 305 (or, alternatively, a plurality of resilient elements 138). In a more preferred, but optional, embodiment of the invention, resilient elements 305 are comprised of EVA foam softer or of lower density than the material comprising structural frame 392.

However, it is understood that, optionally and alternatively, resilient elements 305 may be comprised of materials (such as EVA foam) that has the same or greater hardness or density in relation to the material comprising structural frame 392.

FIGS. 158-159 depict discrete resilient elements 305 that are optionally thicker or possessing greater height than structural frame 392. However, it is understood that, optionally, structural frame 392 may be thicker than one or more resilient elements 305, and structural frame 392 may be comprised of EVA foam or other polymer foam material that is softer, less dense, or more compressible than the material comprising the said resilient elements 305. Alternatively, and also optionally, structural frame 392 may have the same thickness or height as one or more resilient elements 305.

As further depicted in FIGS. 158-159, it is understood that at least one resilient element 305, and preferably more than one resilient element 305, may be engaged to the apertures or holes 383 in reinforcing material lattice 333, so that the upper surfaces of resilient elements 305 that are covered with adhesive 303 contact the lower surface of upper lining 391, and become bound to the upper lining. In a more preferred, but optional, embodiment of the invention, a plurality of resilient elements 305 is engaged through holes 383 in reinforcing material lattice 333, and are affixed to upper lining 391.

It is further understood that the upper surface of reinforcing material lattice 333 is also covered with adhesive 303, and that reinforcing material lattice 333 contacts the lower surface of upper lining 391, and becomes bound to the upper lining.

In another optional aspect of the invention, footwear sockliner 390 may also be comprised of an instance of first composite material 80 cut into a suitable shape, wherein the first lattice of reinforcing material 52 is bonded to a suitably cut instance of first sheet of fabric or mesh material 78, and engages a plurality of resilient elements 138 that are also bonded to the first sheet of fabric or mesh material 78.

In yet another alternative and optional aspect of the invention, footwear sockliner 390 may be comprised of an instance of eighth composite material 360, cut into a suitable shape. Alternatively, footwear sockliner 390 may be comprised of an instance of fifth composite material 92 cut into a suitable shape, wherein the first lattice of reinforcing material 52 is bonded to a suitably cut instance of first sheet of fabric or mesh material 78, and engages a plurality of resilient elements 138 that are bonded to the first sheet of fabric or mesh material 78 and the second fabric or mesh sheet 86.

It is understood that in an optional aspect of the invention, the various composite pads described hereinabove and depicted in the figures identified above may be cut into a variety of suitable shapes, to fabricate useful articles (such as, by way of example only, protective pads, shoe insoles, and footwear sockliners), or components for the same (such as, by way of example only, cushioning components or protective padding components in athletic or industrial protective equipment or gear, footwear uppers, midsoles, outsoles, and other footwear components).

The various components of the process disclosed herein may be made of any suitable material and may be any size and shape consistent with their functions. The specific embodiments of the process disclosed and illustrated herein are not to be considered in a limiting sense as numerous variations are possible. Ordinal indicators, such as first, second or third, for identified elements in the specification or the claims are used to distinguish between the elements, and do not indicate a required or limited number of such elements, and do not indicate a particular position or order of such elements unless otherwise specifically indicated. The subject matter of this disclosure includes all novel and non-obvious combinations and subcombinations of the various features, elements, functions and/or properties disclosed herein. No single feature, function, element or property of the disclosed embodiments is essential.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. The following examples are offered by way of illustration of the present invention, and not by way of limitation.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A method of making a composite structure for use as resilient cushion comprising:
   (a) providing on a surface at least one sheet of resilient material of defined thickness having opposing sides;
   (b) applying an adhesive to either or both sides of the sheet of resilient material;
   (c) providing a first cutter having a surface and a plurality of cutting elements extending from the surface in a predetermined pattern;
   (d) pressing the first cutter into the sheet of resilient material, thereby forming a cut sheet of resilient material comprising a plurality of resilient elements having defined height and width;
   (e) withdrawing the cutter from the cut sheet of resilient material;
   (f) providing at least one sheet of reinforcing material having a defined thickness;
   (g) pressing a second cutter into the sheet of reinforcing material, thereby forming a cut sheet of reinforcing material comprising a plurality of reinforcing elements and a lattice of reinforcing material;
   (h) withdrawing the cutter from the cut sheet of reinforcing material;
   (i) separating the lattice of reinforcing material from the reinforcing elements, whereby the lattice of reinforcing material is left with a plurality of holes through the reinforcing material where the reinforcing elements used to be;
   (j) placing the cut sheet of resilient material adjacent to the lattice of reinforcing material, and aligning the cut sheet of resilient material so that the plurality of resilient elements are positioned adjacent to the plurality of holes in the lattice of reinforcing material;
   (k) pushing the resilient elements out of the cut sheet of resilient material, whereby the plurality of resilient elements are pushed into the plurality of holes in the lattice of reinforcing material, thereby forming a resilient material assembly comprising the plurality of resilient elements at least partially surrounded by at least one lattice of reinforcing material;
   (l) placing the resilient material assembly next to a heat platen, if the adhesive in step (b) is heat-activated adhesive material that is applied to a side of the resilient material of step (a);
   (m) placing a first sheet of fabric or mesh substrate onto either side of the resilient material assembly, wherein steps (l) and (m) are optionally reversible in order; and
   (n) pressing the first sheet of fabric or mesh substrate or the resilient assembly with the heat platen to activate the adhesive on the plurality of resilient elements, whereby the first sheet of fabric or mesh substrate adheres to the plurality of resilient elements thereby forming a first composite structure, wherein the height of the plurality of resilient elements is level with or less than the thickness of the lattice of reinforcing material of the resilient material assembly, such that the resilient elements do not stand proud of the lattice of reinforcing material.

2. The method according to claim 1, wherein the height of the plurality of resilient elements is less than the thickness of the lattice of reinforcing material of the resilient material assembly.

3. The method according to claim 2, wherein the lattice of reinforcing material is made of more compressible material than the resilient elements.

4. The method according to claim 1, wherein no spacing is present between the lattice of reinforcing material and the first fabric or mesh sheet substrate.

5. The method according to claim 4, wherein in step (f), the reinforcing material is coated with a heat activatable adhesive on either or both sides, so that the lattice of reinforcing material is adhered to the first fabric or mesh sheet substrate after the pressing in step (n).

6. The method according to claim 1, comprising cutting the first composite structure into a wearable padding.

7. The method according to claim 6, wherein the padding is a footwear, a footwear component, a footwear midsole, a footwear outsole, a footwear sockliner, or a footwear upper.

8. The method according to claim 6, wherein at least one resilient element is cut.

9. The method according to claim 1, comprising:
   (o) placing a second sheet of fabric or mesh substrate onto the opposite side of the resilient material assembly if heat-activated adhesive material is applied to both sides of the resilient material; and
   (p) pressing the second sheet of fabric or mesh substrate with the heat platen to activate the adhesive on the plurality of resilient elements on the opposite side, whereby the second sheet of fabric or mesh substrate adheres to the plurality of resilient elements on the opposite side forming a second composite structure.

10. The method according to claim 9, wherein no spacing is present between the lattice of reinforcing material and the second fabric or mesh sheet substrate.

11. The method according to claim 9, wherein in step (p), the height of the resilient elements are level with or less than the thickness of the lattice of reinforcing material of the resilient material assembly, such that the resilient elements do not stand proud of the lattice of reinforcing material during heating process.

12. The method according to claim 1, wherein in step (f), the reinforcing material is coated with a heat activatable adhesive on either or both sides, so that the lattice of reinforcing material is adhered to the second fabric or mesh sheet substrate after the heating step (p).

13. The method according to claim 9, comprising cutting the first composite structure into a wearable padding.

14. The method according to claim 13, wherein the padding is a footwear, a footwear component, a footwear midsole, a footwear outsole, a footwear sockliner, or a footwear upper.

15. The method according to claim 13, wherein at least one resilient element is cut.

16. The method according to claim 1, wherein steps (i), (j), (k) are replaced with steps (i-1) and (j-1) as follows:
   (i-1) placing the cut sheet of resilient material adjacent to the lattice of reinforcing material, and aligning the cut sheet of resilient material so that the plurality of resilient elements are positioned adjacent to the plurality of reinforcing elements in the lattice of reinforcing material;
   (j-1) pushing the resilient elements out of the cut sheet of resilient material, whereby the plurality of resilient elements are pushed into the plurality of reinforcing elements in the lattice of reinforcing material, thereby dislodging the reinforcing elements and forming a resilient material assembly comprising the plurality of resilient elements at least partially surrounded by at least one lattice of reinforcing material.

17. A method of making a composite structure for use as resilient cushion comprising:
   (a) providing on a surface at least one sheet of resilient material of defined thickness having opposing sides;
   (b) applying an adhesive to either or both sides of the sheet of resilient material;
   (c) providing a first cutter having a surface and a plurality of cutting elements extending from the surface in a predetermined pattern;
   (d) pressing the first cutter into the sheet of resilient material, thereby forming a cut sheet of resilient material comprising a plurality of resilient elements having defined height and width;
   (e) withdrawing the cutter from the cut sheet of resilient material;
   (f) providing at least one sheet of first reinforcing material having a defined thickness;
   (g) pressing a second cutter into the sheet of first reinforcing material, thereby forming a cut sheet of reinforcing material comprising a plurality of reinforcing elements and a first lattice of reinforcing material;
   (h) withdrawing the cutter from the cut sheet of reinforcing material;
   (i) providing at least one sheet of second reinforcing material having a defined thickness;
   (j) pressing a third cutter into the sheet of second reinforcing material, thereby forming a cut sheet of reinforcing material comprising a plurality of reinforcing elements and a second lattice of reinforcing material;
   (k) withdrawing the cutter from the cut sheet of second reinforcing material;
   (l) separating the first lattice of reinforcing material from the reinforcing elements, whereby the first lattice of reinforcing material is left with a plurality of holes through the reinforcing material where the reinforcing elements used to be;
   (m) placing the cut sheet of resilient material adjacent to the first lattice of reinforcing material, and aligning the cut sheet of resilient material so that the plurality of resilient elements are positioned adjacent to the plurality of holes in the first lattice of reinforcing material;
   (n) pushing the resilient elements out of the cut sheet of resilient material, whereby the plurality of resilient elements are pushed into the plurality of holes in the first lattice of reinforcing material, thereby forming a first resilient material assembly comprising the plurality of resilient elements at least partially surrounded by at least one first lattice of reinforcing material;
   (o) placing the first resilient material assembly next to a heat platen, if the adhesive of step (b) is heat-activated adhesive material that is applied to a side of the resilient material of step (a);
   (p) placing a first sheet of fabric or mesh substrate onto either side of the resilient material assembly, wherein steps (o) and (p) are optionally reversible in order; and
   (q) pressing the first fabric or mesh sheet substrate or the resilient material assembly with the heat platen to activate the adhesive on the plurality of resilient elements, whereby the first fabric or mesh sheet substrate adheres to the plurality of resilient elements thereby forming a first composite structure;
   (r) separating the first lattice of reinforcing material from the first composite structure; and
   (s) replacing the first lattice of reinforcing material with the second lattice of reinforcing material to engage at least one resilient element, thereby forming the first composite structure comprising the second lattice of reinforcing material.

18. The method according to claim 17, wherein the height of the plurality of resilient elements is level with or less than the thickness of the first or second lattice of reinforcing material of the resilient material assembly, such that the resilient elements do not stand proud of the first or second lattice of reinforcing material.

* * * * *